(12) United States Patent
Liu et al.

(10) Patent No.: US 12,543,950 B2
(45) Date of Patent: Feb. 10, 2026

(54) SLIT LAMP MICROSCOPE, OPHTHALMIC INFORMATION PROCESSING APPARATUS, OPHTHALMIC SYSTEM, METHOD OF CONTROLLING SLIT LAMP MICROSCOPE, AND RECORDING MEDIUM

(71) Applicant: Topcon Corporation, Tokyo (JP)

(72) Inventors: Jonathan Liu, Tokyo (JP); Hitoshi Shimizu, Tokyo (JP); Hisashi Tsukada, Hachioji (JP)

(73) Assignee: TOPCON CORPORATION, Tokyo (JP)

( * ) Notice: Subject to any disclaimer, the term of this patent is extended or adjusted under 35 U.S.C. 154(b) by 977 days.

(21) Appl. No.: 17/641,440

(22) PCT Filed: Aug. 31, 2020

(86) PCT No.: PCT/JP2020/032818
§ 371 (c)(1),
(2) Date: Mar. 9, 2022

(87) PCT Pub. No.: WO2021/049341
PCT Pub. Date: Mar. 18, 2021

(65) Prior Publication Data
US 2023/0000346 A1    Jan. 5, 2023

(30) Foreign Application Priority Data

Sep. 10, 2019    (JP) .................. 2019-164282

(51) Int. Cl.
*A61B 3/117* (2006.01)
*A61B 3/00* (2006.01)
(Continued)

(52) U.S. Cl.
CPC .......... *A61B 3/1176* (2013.01); *A61B 3/0025* (2013.01); *A61B 3/135* (2013.01);
(Continued)

(58) Field of Classification Search
CPC .... A61B 3/14; A61B 3/10; A61B 3/12; A61B 3/13; A61B 3/0008; A61B 3/1176;
(Continued)

(56) References Cited

U.S. PATENT DOCUMENTS 5,751,396 A      5/1998  Masuda et al.
6,761,455 B2 *   7/2004  Sumiya ................ A61B 3/1176
                                                        351/221
(Continued)

FOREIGN PATENT DOCUMENTS

CN      2595320 Y    12/2003
EP      3434175 A1    1/2019
(Continued)

OTHER PUBLICATIONS

Wada, M., "Three-Dimensional Reconstruction from Serial Sections using DeltaViewer" (2007), Comparative Physiology and Biochemistry, vol. 24, No. 4 (Year: 2007).*

(Continued)

*Primary Examiner* — Andrew W Bee
*Assistant Examiner* — Emma E Dryden
(74) *Attorney, Agent, or Firm* — XSENSUS LLP

(57) ABSTRACT

A slit lamp microscope of an aspect example includes a scanner and a data processor. The scanner is configured to scan an anterior segment of a subject's eye with slit light to collect a plurality of cross sectional images. The data processor is configured to generate opacity distribution information that represents a distribution of an opaque area in a crystalline lens, based on the plurality of cross sectional images collected by the scanner.

31 Claims, 35 Drawing Sheets

(51) Int. Cl.
  *A61B 3/135*  (2006.01)
  *A61B 3/14*   (2006.01)
  *G06T 7/00*   (2017.01)
  *G06T 7/11*   (2017.01)

(52) U.S. Cl.
  CPC .............. *A61B 3/14* (2013.01); *G06T 7/0012* (2013.01); *G06T 7/0016* (2013.01); *G06T 7/11* (2017.01); *G06T 2207/10028* (2013.01); *G06T 2207/10056* (2013.01); *G06T 2207/30041* (2013.01)

(58) Field of Classification Search
  CPC ....... A61B 3/117; A61B 3/1173; A61B 3/135; A61B 3/0075; A61B 3/0083; A61B 3/15; A61B 5/0059; G06T 2207/10056; G06T 2207/10028; G06T 2207/30041; G06T 15/00; G06T 15/005; G06T 15/08; G06T 7/11; G06T 7/10; G06T 7/12; G06T 7/174; G06T 7/194; G02B 21/361; G02B 21/365
  See application file for complete search history.

(56) References Cited

U.S. PATENT DOCUMENTS

| | | | |
|---|---|---|---|
| 10,362,935 B2* | 7/2019 | Dastmalchi | .......... A61B 3/0025 |
| 11,141,056 B2* | 10/2021 | Okamoto | .............. G06T 7/0012 |
| 2002/0102023 A1 | 8/2002 | Yamauchi | |
| 2003/0063258 A1* | 4/2003 | Torii | ....................... A61B 3/117 351/214 |
| 2008/0168569 A1* | 7/2008 | Muchowski | ....... C07K 14/4747 800/13 |
| 2015/0085252 A1 | 3/2015 | Fujimura et al. | |
| 2016/0345822 A1 | 12/2016 | Fujimura et al. | |
| 2017/0258321 A1 | 9/2017 | Dastmalchi et al. | |
| 2017/0273558 A1* | 9/2017 | Tamura | ................... G16H 30/20 |
| 2019/0029514 A1 | 1/2019 | Tsukada et al. | |
| 2019/0180438 A1* | 6/2019 | Buckler | ............... G06T 7/0012 |

FOREIGN PATENT DOCUMENTS

| | | | | |
|---|---|---|---|---|
| JP | 6-142044 A | 5/1994 | | |
| JP | 2002-224116 A | 8/2002 | | |
| JP | 2003-111731 A | 4/2003 | | |
| JP | 2006-55547 A | 3/2006 | | |
| JP | 2009-56149 A | 3/2009 | | |
| JP | 2012100822 A | * | 5/2012 | |
| JP | 2013-248376 A | 12/2013 | | |
| JP | 2016-54854 A | 4/2016 | | |
| JP | 2016-159073 A | 9/2016 | | |
| JP | 2016-179004 A | 10/2016 | | |
| JP | 2019-24618 A | 2/2019 | | |
| JP | 2019042172 A | * | 3/2019 | |
| WO | WO-2010117386 A1 | * | 10/2010 | ............. A61B 3/032 |
| WO | 2019021512 A1 | 1/2019 | | |

OTHER PUBLICATIONS

Slifstein, M., Hwang, D. R., Martinez, D., Ekelund, J., Huang, Y., Hackett, E., . . . & Laruelle, M., Biodistribution and radiation dosimetry of the dopamine D2 ligand 11C-raclopride determined from human whole-body PET, 2006, Journal of Nuclear Medicine, 47(2), 313-319. (Year: 2006).*
Indaram, M., Agrón, E., Clemons, T. E., Sperduto, R. D., Wong, W. T., Ferris, F. L., 3rd, Chew, E. Y., Changes in lens opacities on the age-related eye disease study grading scale predict progression to cataract surgery and vision loss, 2015, Ophthalmology, 122(5), 888-896. (Year: 2015).*
International Search Report and Written Opinion mailed on Oct. 20, 2020, received for PCT Application PCT/JP2020/032818, Filed on Aug. 31, 2020, 11 pages including English Translation.
Wada, "Three-Dimensional Reconstruction from Serial Sections using DeltaViewer", Comparative Physiology and Biochemistry, vol. 24, No. 4, pp. 160-165 (6 pages including English Abstract).
Matsui et al., "Aging and Eye Diseases", Dokkyo Journal of Medical Sciences, vol. 35, No. 3, 2008, pp. 251-258 (8 pages including Partial English Translation).
M. Wada, "3D construction from serial sections with Delta Viewer", Hikaku seiri seikagaku(Comparative Physiology and Biochemistry), 2007, vol. 24, No. 4, pp. 160-165, with Machine Translation by Google.
E. Matsui et al., "Aging and eye diseases", Dokkyo Journal of Medical Sciences, 2008, vol. 35(3), pp. 251-258, with Machine Translation by Google.
Office Action issued May 30, 2023 in Japanese Patent Application No. 2019-164282 with Machine Translation, 11 pages.
Extended European Search Report issued Jun. 29, 2023 in European Patent Application No. 20862734.9, 8 pages.
Chinese Office Action issued Feb. 24, 2025, in corresponding Chinese Patent Application No. 202080062671.4, 21pp.

* cited by examiner

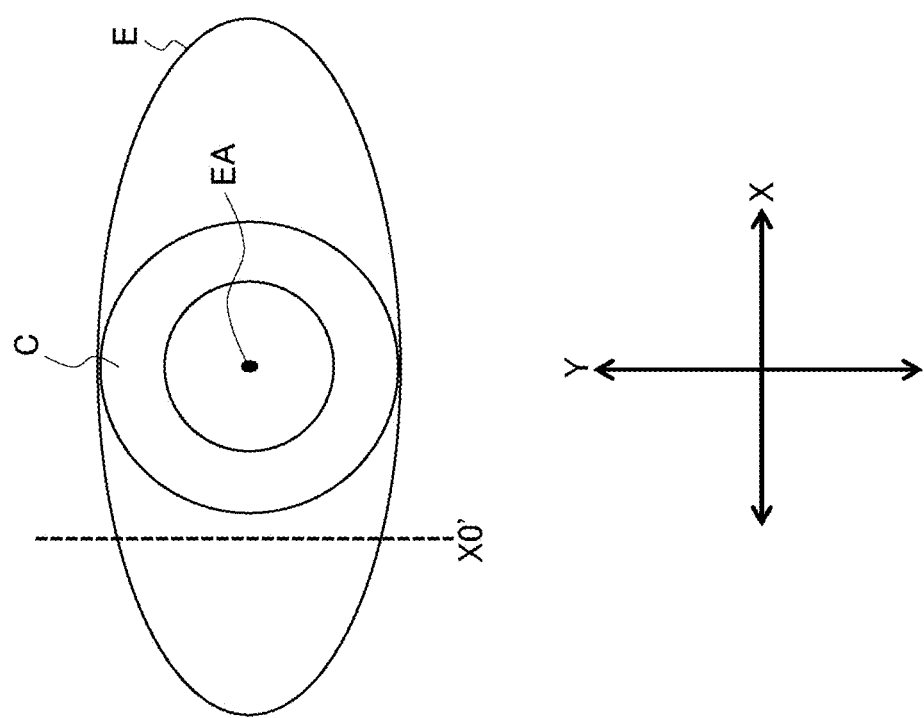

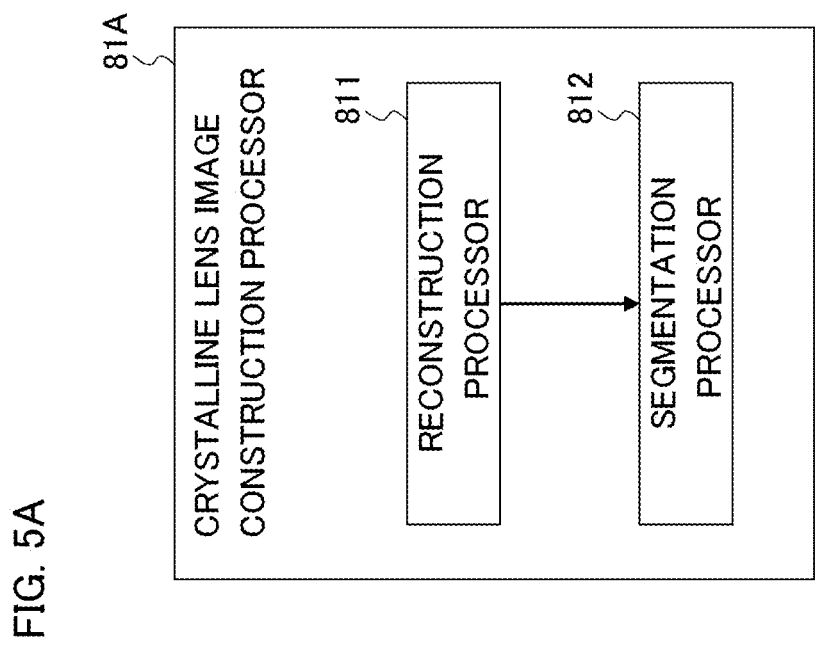

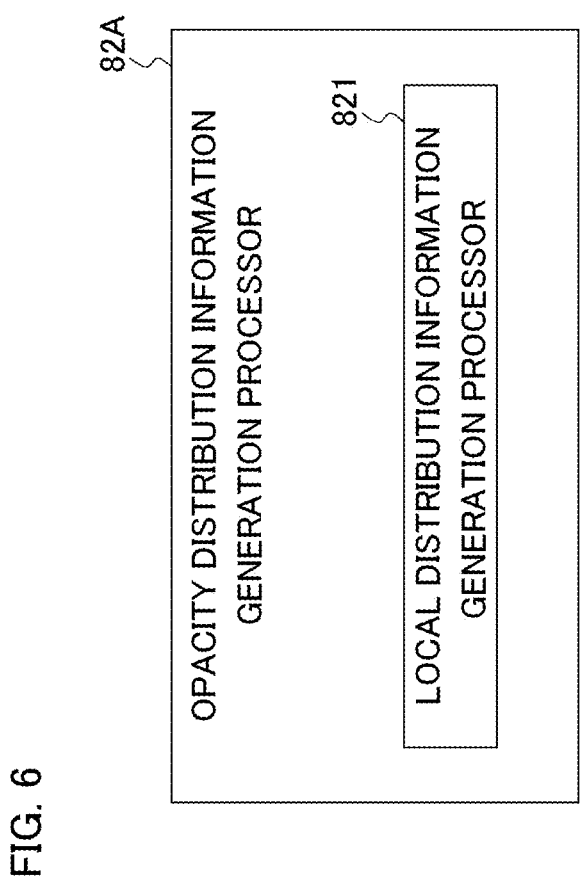

SLIT LAMP MICROSCOPE, OPHTHALMIC INFORMATION PROCESSING APPARATUS, OPHTHALMIC SYSTEM, METHOD OF CONTROLLING SLIT LAMP MICROSCOPE, AND RECORDING MEDIUM

CROSS-REFERENCE TO RELATED APPLICATIONS

This application is a national stage (under 35 U.S.C. 371) of International Patent Application No. PCT/JP2020/032818, filed Aug. 31, 2020, claiming priority to Japanese Patent Application No. 2019-164282, filed Sep. 10, 2019, both of which are herein incorporated by reference in their entirety.

FIELD

The present disclosure relates generally to a slit lamp microscope, an ophthalmic information processing apparatus, an ophthalmic system, a method of controlling a slit lamp microscope, and a recording medium.

BACKGROUND

Diagnostic imaging serves an important role in the field of ophthalmology. Diagnostic imaging uses various kinds of ophthalmic imaging apparatuses. Types of examples of ophthalmic imaging apparatuses include a slit lamp microscope, a fundus camera, a scanning laser ophthalmoscope (SLO), an optical coherence tomography (OCT) apparatus, and the like.

A slit lamp microscope is the most widely and frequently utilized apparatuses among such various kinds of ophthalmic apparatuses. A slit lamp microscope is used for illuminating a subject's eye with slit light and observing and/or photographing the illuminated cross section from an oblique or side position with a microscope (see, for example, following Patent Documents 1 to 3).

One of the main uses of a slit lamp microscope is observation of anterior eye segments. When observing an anterior eye segment, a doctor observes an entire anterior eye segment while moving the focal position and the area illuminated by slit light, thereby determining the presence or absence of abnormality. Further, a slit lamp microscope may also be used for prescription of vision correction devices such as for checking of a fitting state of a contact lens.

Diaphanoscopy (or red reflection technique) may be used for anterior eye segment observation (see, for example, following Patent Document 3). Diaphanoscopy is an observation technique that uses retinal reflection of illumination light to depict intraocular conditions, and is typically a technique of depicting an opaque area (or, opacity area, clouding area, haze area, turbidity area, or the like) of the crystalline lens as a shadow formed by the light beam reverting from the retina. An image obtained by diaphanoscopy is referred to as a transillumination image (diaphanoscopic image, red reflex image). While diaphanoscopy is a common technique widely used in the observation of cataract eyes, it has the following problems.

First, it is difficult to manage or control the brightness of transillumination images because diaphanoscopy uses the reflected light coming from the retina, and it is also difficult to manage (control, adjust) its image quality. These difficulties make diaphanoscopy unsuitable for quantitative diagnosis. Therefore, diagnosis using diaphanoscopy is highly dependent on the subjectivity of a person who conducts image interpretation, and for example, grade of cataract cannot be objectively evaluated. In addition, although automatic image analysis techniques using analysis programs or machine learning have been rapidly developing in recent years, the difficulty in image quality management is still one of the factors that prevent the application of automatic image analysis to transillumination images.

Second, a transillumination image is a planar image (projection image) with the eye fundus as a secondary light source, and has no information in the depth direction (axial direction, Z direction), which makes it impossible to provide opacity distribution in a three dimensional manner. In other words, a transillumination image only provides opacity distribution in the XY plane perpendicular to the Z direction, and cannot provide opacity distribution in the Z direction.

[PATENT DOCUMENT 1] Japanese Unexamined Patent Application Publication No. 2016-159073

[PATENT DOCUMENT 2] Japanese Unexamined Patent Application Publication No. 2016-179004

[PATENT DOCUMENT 3] Japanese Unexamined Patent Application Publication No. 2009-56149

BRIEF SUMMARY

An object of embodiments according to the present disclosure is to provide a novel ophthalmic observation technique without the drawbacks of diaphanoscopy.

A slit lamp microscope of some aspect examples according to the present disclosure includes a scanner configured to scan an anterior segment of a subject's eye with slit light to collect a plurality of cross sectional images, and a data processor configured to generate opacity distribution information that represents a distribution of an opaque area in a crystalline lens, based on the plurality of cross sectional images.

In the slit lamp microscope of some aspect examples according to the present disclosure, the data processor includes a crystalline lens image construction processor configured to construct a three dimensional crystalline lens image from the plurality of cross sectional images, and an opacity distribution information generation processor configured to analyze the three dimensional crystalline lens image to generate the opacity distribution information.

In the slit lamp microscope of some aspect examples according to the present disclosure, the crystalline lens image construction processor includes a first reconstruction processor configured to apply three dimensional reconstruction to the plurality of cross sectional images collected by the scanner, and a first segmentation processor configured to apply segmentation to a three dimensional reconstructed image constructed by the first reconstruction processor to identify the three dimensional crystalline lens image.

In the slit lamp microscope of some aspect examples according to the present disclosure, the crystalline lens image construction processor includes a second segmentation processor configured to apply segmentation to each of the plurality of cross sectional images collected by the scanner to identify a two dimensional crystalline lens image, and a second reconstruction processor configured to apply three dimensional reconstruction to a plurality of two dimensional crystalline lens images identified by the second segmentation processor to construct the three dimensional crystalline lens image.

In the slit lamp microscope of some aspect examples according to the present disclosure, the opacity distribution information generation processor includes a local distribution information generation processor configured to generate local distribution information that represents a distribution of an opaque area in a three dimensional partial region for each of a plurality of three dimensional partial regions in the three dimensional crystalline lens image.

In the slit lamp microscope of some aspect examples according to the present disclosure, the data processor includes an opacity distribution map creation processor configured to create an opacity distribution map based on a plurality of pieces of local distribution information generated by the local distribution information generation processor.

In the slit lamp microscope of some aspect examples according to the present disclosure, the opacity distribution map represents a depth position of an opaque area in each of the plurality of three dimensional partial regions.

In the slit lamp microscope of some aspect examples according to the present disclosure, the opacity distribution map is represented using a two dimensional coordinate system in which a first coordinate axis represents a depth direction and a second coordinate axis represents a direction perpendicular to the depth direction.

In the slit lamp microscope of some aspect examples according to the present disclosure, the plurality of three dimensional partial regions is determined by applying equal angle division to the three dimensional crystalline lens image in a plane perpendicular to the depth direction, and the second coordinate axis represents an angle direction of the equal angle division.

In the slit lamp microscope of some aspect examples according to the present disclosure, the data processor includes a first transmissivity distribution information generation processor configured to generate transmissivity distribution information that represents a distribution of light transmissivity of the crystalline lens based on a plurality of pieces of local distribution information generated by the local distribution information generation processor.

In the slit lamp microscope of some aspect examples according to the present disclosure, the data processor includes a first transmissivity distribution map creation processor configured to create a transmissivity distribution map based on the transmissivity distribution information generated by the first transmissivity distribution information generation processor.

In the slit lamp microscope of some aspect examples according to the present disclosure, the data processor includes a second transmissivity distribution map creation processor configured to create a transmissivity distribution map that represents a distribution of light transmissivity of the crystalline lens based on the opacity distribution map created by the opacity distribution map creation processor.

In the slit lamp microscope of some aspect examples according to the present disclosure, the data processor includes a second transmissivity distribution information generation processor configured to generate transmissivity distribution information that represents a distribution of light transmissivity of the crystalline lens by calculating, for each of the plurality of three dimensional partial regions, a quotient of a size of an opaque area in a three dimensional partial region defined by the two dimensional coordinate system over a size of this three dimensional partial region.

In the slit lamp microscope of some aspect examples according to the present disclosure, the data processor includes a third transmissivity distribution map creation processor configured to create a transmissivity distribution map based on the transmissivity distribution information generated by the second transmissivity distribution information generation processor.

In the slit lamp microscope of some aspect examples according to the present disclosure, the data processor includes a rendering processor configured to apply rendering to a three dimensional image that includes the three dimensional crystalline lens image.

In the slit lamp microscope of some aspect examples according to the present disclosure, the rendering processor is configured to apply projection onto a predetermined plane to the three dimensional image.

In the slit lamp microscope of some aspect examples according to the present disclosure, the predetermined plane is perpendicular to a depth direction.

The slit lamp microscope of some aspect examples according to the present disclosure further includes a first display controller configured to display a rendered image constructed by the rendering processor and information based on the opacity distribution information on a first display device in such a manner that one of the rendered image and the information based on the opacity distribution information is displayed on the other.

The slit lamp microscope of some aspect examples according to the present disclosure further includes a second display controller configured to display a two dimensional image constructed by the projection and a distribution image based on the opacity distribution information on a second display device in such a manner that one of the two dimensional image and the distribution image is displayed on the other.

In the slit lamp microscope of some aspect examples according to the present disclosure, the data processor includes a first time dependent change information generation processor configured to generate first time dependent change information that represents a time dependent change in a distribution of an opaque area of the crystalline lens based on a plurality of pieces of opacity distribution information obtained for the anterior segment.

In the slit lamp microscope of some aspect examples according to the present disclosure, the data processor includes a second time dependent change information generation processor configured to generate second time dependent change information that represents a time dependent change in a distribution of light transmissivity of the crystalline lens based on the transmissivity distribution information.

The slit lamp microscope of some aspect examples according to the present disclosure further includes a third display controller configured to display a graph that represents a time dependent change in light transmissivity of each of the plurality of three dimensional partial regions based on the second time dependent change information on a third display device.

In the slit lamp microscope of some aspect examples according to the present disclosure, the data processor includes a normalization processor configured to apply normalization to the plurality of cross sectional images collected by the scanner, and the data processor is configured to perform generation of the opacity distribution information based on the plurality of cross sectional images with the normalization applied.

In the slit lamp microscope of some aspect examples according to the present disclosure, the normalization processor is configured to apply brightness normalization to the plurality of cross sectional images.

In the slit lamp microscope of some aspect examples according to the present disclosure, the normalization processor is configured to apply the brightness normalization to the plurality of cross sectional images based on brightness of an image corresponding to a posterior surface of cornea of the anterior segment.

In the slit lamp microscope of some aspect examples according to the present disclosure, the slit light includes visible light, and the normalization processor is configured to apply color normalization to the plurality of cross sectional images.

In the slit lamp microscope of some aspect examples according to the present disclosure, the data processor includes an evaluation processor configured to perform evaluation of a predetermined cataract score based on one or both of the opacity distribution information and the plurality of cross sectional images.

In the slit lamp microscope of some aspect examples according to the present disclosure, the slit light includes white light, and the evaluation processor is configured to perform evaluation of hardness of crystalline lens nucleus based on color information of the plurality of cross sectional images.

In the slit lamp microscope of some aspect examples according to the present disclosure, the evaluation processor is configured to perform cataract type inference based on the opacity distribution information.

In the slit lamp microscope of some aspect examples according to the present disclosure, the data processor includes a simulation processor configured to perform vision condition simulation of the subject's eye based on the opacity distribution information.

In the slit lamp microscope of some aspect examples according to the present disclosure, the data processor includes a measurement processor configured to perform measurement of a predetermined anterior segment parameter based on the plurality of cross sectional images.

In the slit lamp microscope of some aspect examples according to the present disclosure, the anterior segment parameter includes one or more of corneal thickness, corneal curvature, anterior chamber depth, crystalline lens thickness, crystalline lens curvature, crystalline lens diameter, crystalline lens tilt angle, and positional difference between corneal center and crystalline lens center.

In the slit lamp microscope of some aspect examples according to the present disclosure, the scanner includes an illumination system configured to project the slit light onto the anterior segment, a photography system configured to perform photography of the anterior segment from a direction different from the illumination system, and a movement mechanism configured to move the illumination system and the photography system.

In the slit lamp microscope of some aspect examples according to the present disclosure, the photography system includes an optical system configured to direct light coming from the anterior segment onto which the slit light is projected, and an image sensor including a light detecting plane configured to receive the light directed by the optical system. In addition, a subject plane along an optical axis of the illumination system, the optical system, and the light detecting plane satisfy a Scheimpflug condition.

The slit lamp microscope of some aspect examples according to the present disclosure further includes a fourth display controller configured to display information on a fourth display device based on an output from the data processor.

An ophthalmic information processing apparatus of some aspect examples according to the present disclosure includes a reception device that receives a plurality of cross sectional images collected by scanning an anterior segment of a subject's eye with slit light, and a data processor configured to generate opacity distribution information that represents a distribution of an opaque area in a crystalline lens, based on the plurality of cross sectional images.

An ophthalmic system of some aspect examples according to the present disclosure includes a slit lamp microscope and an information processing apparatus. The slit lamp microscope includes a scanner configured to scan an anterior segment of a subject's eye with slit light to collect a plurality of cross sectional images, and a transmission device that transmits the plurality of cross sectional images collected by the scanner to the information processing apparatus via a communication line. The information processing apparatus includes a reception device that receives the plurality of cross sectional images, and a data processor configured to generate opacity distribution information that represents a distribution of an opaque area in a crystalline lens, based on the plurality of cross sectional images.

A method of some aspect examples according to the present disclosure is a method of controlling a slit lamp microscope that includes a processor, and a scanner that scans an anterior segment of a subject's eye with slit light to collect a plurality of cross sectional images. The method is configured to cause the processor to execute a process of generating opacity distribution information that represents a distribution of an opaque area in a crystalline lens based on the plurality of cross sectional images collected by the scanner.

A program of some aspect examples according to the present disclosure is configured to cause a computer to execute the method of any aspect example.

A recording medium of some aspect examples according to the present disclosure is a computer-readable non-transitory recording medium that retains the program of any aspect example.

The ophthalmic observation technique provided by the aspect examples according to the present disclosure is capable of managing or controlling the brightness of images and providing three dimensional information.

BRIEF DESCRIPTION OF THE SEVERAL VIEWS OF THE DRAWING

FIG. 2B is a schematic diagram for describing the operation of the slit lamp microscope of the aspect example.

FIG. 5A is a schematic diagram illustrating the configuration of the slit lamp microscope of the aspect example.

FIG. 6 is a schematic diagram illustrating the configuration of the slit lamp microscope of the aspect example.

DETAILED DESCRIPTION

Figure 1:
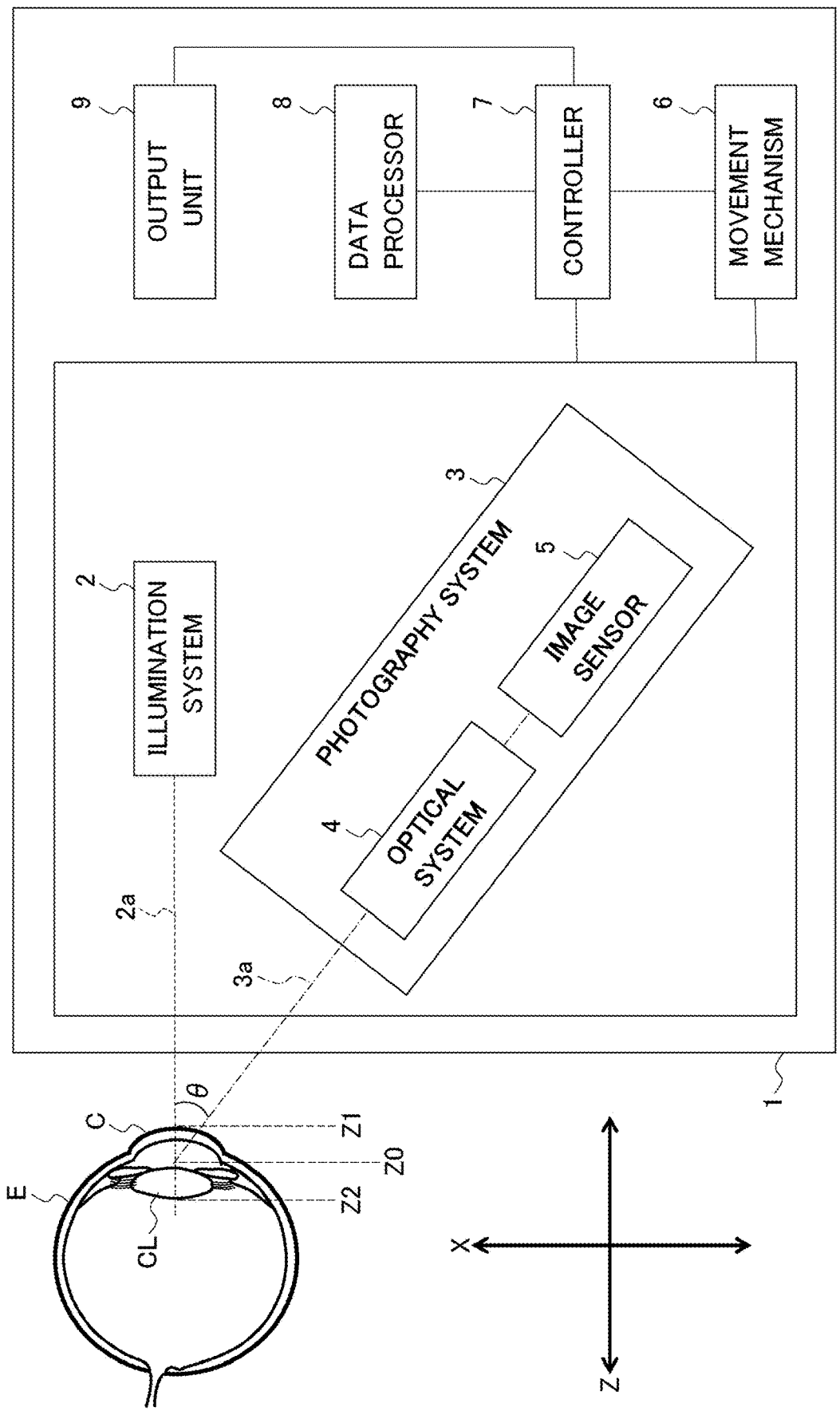
FIG. 1 is a schematic diagram illustrating the configuration of the slit lamp microscope of the aspect example.

Some aspect examples will be described in detail with referring to the drawings. It should be noted that any known techniques or technologies such as any of the matters or items disclosed in the documents cited herein may be combined with or incorporated in the aspect examples.

The slit lamp microscope of some aspect examples may be a stationary type or a portable type. The slit lamp microscope of some aspect examples has an (automatic) scanning function of scanning an anterior eye segment with slit light to acquire a plurality of cross sectional images, and is typically used in situations and/or environments where no technical experts (skilled persons) relating to the apparatus is present nearby. Note that the slit lamp microscope of some aspect examples may be used in situations and/or environments where a skilled person is present, or in situations and/or environments where a skilled person can provide monitoring, give instructions, and/or conduct an apparatus operation, from a remote place.

Examples of the facility in which the slit lamp microscope is disposed include an optician's store, an optometrist's office, a health facility, a medical institution, a health check and screening venue, a patient's home, a welfare facility, a public facility, a medical examination vehicle, and the like.

The slit lamp microscope of some aspect examples is an ophthalmic imaging apparatus having at least the function of a slit lamp microscope, and may be further provided with any other photographing or imaging functions performed by other modality apparatuses. Examples of such other modality apparatuses include an anterior segment camera, a fundus camera (retinal camera), an SLO, an OCT apparatus, and the like. The slit lamp microscope of some aspect examples may further have any of the functions of measuring characteristics of eyes. Examples of such measurement functions include visual acuity measurement, refraction measurement, intraocular pressure measurement, corneal endothelial cell measurement, aberration measurement, visual field measurement, and the like. The slit lamp microscope of some aspect examples may further include application software for analyzing photographed images, measurement data, or the like. The slit lamp microscope of some aspect examples may further include any of the functions for treatment or surgery. Examples of such treatment or surgery includes photocoagulation treatment and photodynamic therapy.

The ophthalmic information processing apparatus of some aspect examples includes a processor (circuit, circuitry) that processes a plurality of cross sectional images collected by a slit lamp microscope having the scanning function described above. The ophthalmic information processing apparatus of some aspect examples may be a peripheral device of the slit lamp microscope, may be connected to the slit lamp microscope through a local area network (LAN), or may be connected to the slit lamp microscope through a wide area network. Alternatively, the ophthalmic information processing apparatus of some aspect examples may have a function of accepting (receiving) input of a plurality of cross sectional images stored in a recording medium.

The ophthalmic system of some aspect examples may include one or more slit lamp microscopes and one or more information processing apparatuses, and may be used for telemedicine, for example. The slit lamp microscope may be a slit lamp microscope of any aspect example, or may be a slit lamp microscope including at least part of a slit lamp microscope of any aspect example.

The information processing apparatus has a function of receiving an image acquired by the slit lamp microscope and processing this image. The information processing apparatus of some examples may be a computer terminal or a server on a network. The computer terminal may be an image interpretation computer terminal and/or an image interpretation apparatus, for example. In the case where the information processing apparatus is an image interpretation computer terminal and/or an image interpretation apparatus, the ophthalmic system may include another information processing apparatus (such as a server) that receives an image acquired by the slit lamp microscope and transfers this image to the image interpretation computer terminal and/or the image interpretation apparatus. The architecture of the ophthalmic system is not limited to a client-server system, and may be a peer-to-peer system. While the aspect examples below will mainly describe an ophthalmic system of a client-server type, any of the functions, configurations, elements, operations, processes, and any other matters and items of such client-server systems may be applied to an ophthalmic system of a peer-to-peer type.

The image interpretation computer terminal is a computer used by a doctor (typically, a specialist such as an ophthalmologist or a medical image interpreter) to conduct interpretation of an image acquired by the slit lamp microscope. Here, the interpretation is an act of observing an image to obtain medical findings. Information entered into the image interpretation computer terminal by the person who has conducted the image interpretation may, for example, be converted by the image interpretation computer terminal or another computer into an image interpretation report or electronic medical record information and then transmitted to the server. In some other examples, information entered into the image interpretation computer terminal by a person who conducts image interpretation may be transmitted to the server. In this case, the server or another computer may perform conversion of the information entered by the person who conducts the image interpretation into an image interpretation report or electronic medical record information. The server may be configured to perform management of image interpretation reports or electronic medical record information by itself, or to transfer (forward, send) image interpretation reports or electronic medical record information to another medical system (e.g., an electronic medical record system).

The image interpretation apparatus is a computer configured to perform interpretation of an image acquired by the slit lamp microscope, using an image processing processor and/or an artificial intelligence engine, for example. Information derived from the image by the image interpretation apparatus may be converted by the image interpretation apparatus or another computer into an image interpretation report or electronic medical record information and then transmitted to the server, for example. In some other examples, information derived from the image by the image interpretation apparatus may be transmitted to the server. In this case, the server or another computer may convert the information derived from the image by the image interpretation apparatus into an image interpretation report or electronic medical record information. The server may be configured to perform management of image interpretation reports or electronic medical record information by itself, or to transfer (forward, send) image interpretation reports or electronic medical record information to another medical system.

As described thus far, the slit lamp microscopes, the ophthalmic information processing apparatuses, and the ophthalmic systems of some aspect examples can be used for telemedicine. On the other hand, acquisition of an adequate image (good image, satisfactory image) using a conventional slit lamp microscope is not an easy task. In addition, effective image interpretation and diagnosis require acquisition of an image of a wide area of an anterior eye segment "in advance". For these reasons, it can be said that effective telemedicine using slit lamp microscopes has not been achieved. Some aspect examples can provide technologies and techniques that contribute to the achievement (realization, implementation) of effective telemedicine with slit lamp microscopes. Some aspect examples may also be applied for other uses.

Hereinafter, some aspect examples will be described. Any modifications, such as additions, replacements, and/or omissions, on the basis of any known technique or technology, may be applied to any of these aspect examples. Further, any two or more of these aspect examples may be combined at least in part. Any modifications, such as additions, replacements, and/or omissions, on the basis of any known technique or technology, may be applied to such a combination.

The "processor" as used in the aspect examples described below includes a circuit or circuitry such as a central processing unit (CPU), a graphics processing unit (GPU), an application specific integrated circuit (ASIC), or a programmable logic device (PLD). Examples of the PLD include a simple programmable logic device (SPLD), a complex programmable logic device (CPLD), and a field programmable gate array (FPGA). For example, the processor loads and executes a program or data stored in a memory circuit or a data storage for implementing the functions of a corresponding aspect example. The processor may include a circuit (circuitry) used for artificial intelligence or cognitive computing. The processor of some typical examples may include a computer system trained and configured through machine learning.

First Aspect Example

FIG. 1 shows an example of the slit lamp microscope of the first aspect example.

The slit lamp microscope 1 may be used for photographing the anterior segment of the subject's eye E, and includes the illumination system 2, the photography system 3, the movement mechanism 6, the controller 7, the data processor 8, and the output unit 9. The cornea of the subject's eye E is denoted by the reference character C, and the crystalline lens is denoted by the reference character CL.

The slit lamp microscope 1 may be a single apparatus, or may also be a system that includes two or more apparatuses. In the case where the slit lamp microscope 1 is configured as a system, the slit lamp microscope 1 may include a main apparatus, a computer, and a communication device (telecommunication device). Here, the main apparatus may include the illumination system 2, the photography system 3, and the movement mechanism 6, the computer may include the controller 7, the data processor 8, and the output unit 9, and the communication device may perform communication between the main apparatus and the computer. In another case where the slit lamp microscope 1 is configured as a system, the slit lamp microscope 1 may include a main apparatus, a computer, an output device, and a communication device. Here, the main apparatus may include the illumination system 2, the photography system 3, and the movement mechanism 6, the computer may include the controller 7 and the data processor 8, the output device may include the output unit 9, and the communication device may perform communication among the main apparatus, the computer, and the output device. The computer of some examples may be disposed together with the main apparatus or may also be disposed on a network. The same applies to the output device.

<Illumination System 2>

The illumination system 2 projects slit light onto the anterior segment of the subject's eye E. The reference character 2a denotes the optical axis of the illumination system 2 that is referred to as the illumination optical axis. The illumination system 2 may have the same or similar configuration as or to the illumination system of a conventional slit lamp microscope. For example, the illumination system 2 includes an illumination light source, a positive lens, a slit forming member, and an objective lens in the order from the side far from the subject's eye E (not shown in the drawings).

The illumination light source outputs (emits) illumination light. The illumination system 2 may include a plurality of illumination light sources. For example, the illumination system 2 may include both an illumination light source that outputs continuous light or steady light, and an illumination light source that outputs flash light. Further, the illumination system 2 may include both an illumination light source for anterior segment illumination and an illumination light source for posterior segment illumination. Furthermore, the illumination system 2 may include two or more illumination light sources with mutually different output wavelengths. A typical example of the illumination system 2 includes a visible light source as an illumination light source. The illumination system 2 may also include an infrared light source. The illumination light output from the illumination light source passes through the positive lens and is projected onto the slit forming member.

The slit forming member passes a part of the illumination light to generate slit light. A typical example of the slit forming member has a pair of slit blades. The width of the region through which the illumination light passes is changed by changing the interval between the slit blades, and the width of the slit light is changed accordingly. The region through which the illumination light passes is referred to as a slit, and the interval between the slit blades is referred to as a slit width. Further, the slit forming member may be configured to be capable of changing the length of the slit light. The length of the slit light is a size of a cross section of the slit light along the direction perpendicular to the cross sectional width direction of the slit light. Here, the cross sectional width direction corresponds to the slit width. The width of the slit light and the length of the slit light of some typical examples are represented as the size of a projected image on the anterior segment formed by the slit light; however, possible representations of the width and length of the slit light are not limited to these. For example, the width of the slit light and the length of the slit light may be represented as the size of the cross section of the slit light at a freely selected position, or as the size of the slit formed by the slit forming member.

The slit light generated by the slit forming member is refracted by the objective lens and is projected onto the anterior segment of the subject's eye E.

The illumination system 2 may further include a focus mechanism configured for changing the focal position of the slit light. The focus mechanism may be configured to move the objective lens along the illumination optical axis 2a, for example. The movement of the objective lens may be carried out automatically and/or manually. Another focus mechanism may be configured to change the focal position of the slit light by: preparing and disposing a focusing lens at a position in the illumination optical axis 2a between the objective lens and the slit forming member; and moving the focusing lens along the illumination optical axis 2a.

Note that FIG. 1 is a top view. As shown in FIG. 1, the direction along the axis of the subject's eye E is defined as the Z direction in the present aspect example. Of the directions perpendicular to the Z direction, the left-right direction (or, the lateral direction) for the subject is defined as the X direction. The direction perpendicular to both the X direction and the Z direction is defined as the Y direction. In some typical examples, the X direction is the direction from one of the left eye and the right eye toward the other, and the Y direction is the direction parallel to the body axis of the subject (body axis direction).

<Photography System 3>

The photography system 3 is configured to perform photography of the anterior segment while the slit light from the illumination system 2 is being projected onto the anterior segment. The reference character 3a denotes the optical axis of the photography system 3 that is referred to as the photography optical axis. The photography system 3 of the present aspect example includes the optical system 4 and the image sensor 5.

The optical system 4 is configured to direct light coming from the anterior segment of the subject's eye E onto which the slit light is being projected, to the image sensor 5. The image sensor 5 includes a light detecting plane that receives the light directed by the optical system 4.

The light directed by the optical system 4, that is, the light coming from the anterior segment of the subject's eye E, contains return light of the slit light being projected onto the anterior segment, and may further contain other kinds of light. Examples of the return light include reflected light of the slit light, scattered light of the slit light, and fluorescence induced by the slit light. Examples of the other kinds of light include light from the environment in which the slit lamp microscope 1 is disposed, such as indoor light (room light) and sunlight. In the case where another illumination system different from the illumination system 2 is provided as an anterior segment illumination system for illuminating the entire anterior segment, return light of the anterior segment illumination light emitted by the anterior segment illumination system may be contained in the light directed by the optical system 4.

The image sensor 5 may be an area sensor that has a two dimensional image detecting area. The image sensor 5 may be, for example, a charge-coupled device (CCD) image sensor, a complementary metal oxide semiconductor (CMOS) image sensor, or another type of image sensor.

The optical system 4 may have, for example, the same or similar configuration as or to the photography system of a conventional slit lamp microscope. For example, the optical system 4 includes an objective lens, a variable magnification optical system, and an imaging lens in the order from the side closer to the subject's eye E. The light coming from the anterior segment of the subject's eye E onto which the slit light is being projected, passes through the objective lens and the variable magnification optical system, and then forms an image on the light detecting plane of the image sensor 5 by the imaging lens.

The photography system 3 may include the first photography system and the second photography system, for example. In a typical example, the first photography system and the second photography system have the same configuration. The case in which the photography system 3 includes the first photography system and the second photography system will be described later as another aspect example.

The photography system 3 may further include a focus mechanism configured for changing the focal position of the photography system 3. The focus mechanism may be configured to move the objective lens along the photography optical axis 3a, for example. The movement of the objective lens may be carried out automatically and/or manually. Note that a focusing lens may be prepared and disposed at a position in the photography optical axis 3a between the objective lens and the imaging lens, and also the focus mechanism may be capable of moving the focusing lens along the photography optical axis 3a, thereby changing the focal position of the photography system 3.

The illumination system 2 and the photography system 3 function as a Scheimpflug camera. More specifically, the illumination system 2 and the photography system 3 are configured in such a manner that the subject plane along the illumination optical axis 2a, the optical system 4, and the light detecting plane of the image sensor 5 satisfy what is commonly referred to as the Scheimpflug condition. More specifically, the YZ plane passing through the illumination optical axis 2a (the YZ plane contains the subject plane), the principal plane of the optical system 4, and the light detecting plane of the image sensor 5 intersect on the same straight line. As a result of this, photographing can be performed with all positions in the subject plane in focus. In other words, photographing can be performed with all positions in the direction along the illumination optical axis 2a in focus.

The illumination system 2 and the photography system 3 of the present aspect example are configured in such a manner that at least an area defined by the anterior surface of the cornea C and the posterior surface of the crystalline lens CL is in focus of the photography system 3, for example. In other words, photography may be performed in a state in which the focus of the photography system 3 is on the entire area from the apex of the anterior surface of the cornea C (Z=Z1) to the apex of the posterior surface of the crystalline lens CL (Z=Z2) shown in FIG. 1. Note that the location Z=Z0 corresponds to the Z coordinate of the intersection of the illumination optical axis 2a and the photography optical axis 3a.

The condition described above is typically implemented by the configuration and arrangement of the elements included in the illumination system 2, the configuration and arrangement of the elements included in the photography system 3, and the relative positions between the illumination system 2 and the photography system 3. A parameter indicating the relative positions of the illumination system 2 and the photography system 3 may include the angle θ formed by the illumination optical axis 2a and the photography optical axis 3a, for example. The value of the angle θ may be set to 17.5 degrees, 30 degrees, or 45 degrees, for example. The angle θ may be variable.

<Movement Mechanism 6>

The movement mechanism 6 is configured to move the illumination system 2 and the photography system 3. The movement mechanism 6 includes, for example, a movable stage, an actuator, and a mechanism. The illumination system 2 and the photography system 3 are placed on the movable stage. The actuator is configured to operate in accordance with a control signal input from the controller 7. The mechanism is configured to receive driving force generated by the actuator and move the movable stage. In some other examples, the movement mechanism 6 may include a movable stage on which the illumination system 2 and the photography system 3 are placed, and a mechanism configured to receive force applied to an operation device (not shown in the drawings) and move the movable stage. The operation device is a lever, for example. The movable stage may be movable at least in the X direction and may be further movable in either one or both of the Y direction and the Z direction.

The movement mechanism 6 of the present aspect example is configured to move the illumination system 2 and the photography system 3 together with each other in the X direction, for example. In other words, the movement mechanism 6 moves the illumination system 2 and the photography system 3 in the X direction while maintaining the state in which the above-mentioned Scheimpflug condition is satisfied. In parallel with this movement, the photography system 3 performs moving image photography at a predetermined time interval (photographing rate, acquisition rate), for example. As a result of this, a three dimensional area of the anterior segment of the subject's eye E is scanned with the slit light, and a plurality of images (a cross sectional image group) corresponding to the plurality of cross sections in the three dimensional area is collected.

<Controller 7>

The controller 7 is configured to control each part of the slit lamp microscope 1. For example, the controller 7 controls elements of the illumination system 2 (e.g., illumination light source, slit forming member, focus mechanism, etc.), elements of the photography system 3 (e.g., focus mechanism, image sensor, etc.), the movement mechanism 6, the data processor 8, and the output unit 9, and the like. Further, the controller 7 may be capable of executing control for changing the relative positions of the illumination system 2 and the photography system 3. In some aspect examples, the controller 7 includes the undermentioned display controller 71. The display controller 71 is configured to control the undermentioned display device 9A to display information. The details of this control process will be described later.

The controller 7 includes a processor, a primary storage, a secondary storage, and the like. The secondary storage retains a control program and the like. The control program and the like may be stored in a computer or a data storage accessible by the slit lamp microscope 1. The function of the controller 7 is implemented by cooperation of software such as the control program and hardware such as the processor.

The controller 7 may be capable of applying the following controls to the illumination system 2, the photography system 3 and the movement mechanism 6 in order to perform scanning on a three dimensional area of the anterior segment of the subject's eye E with the slit light.

Figure 2A:
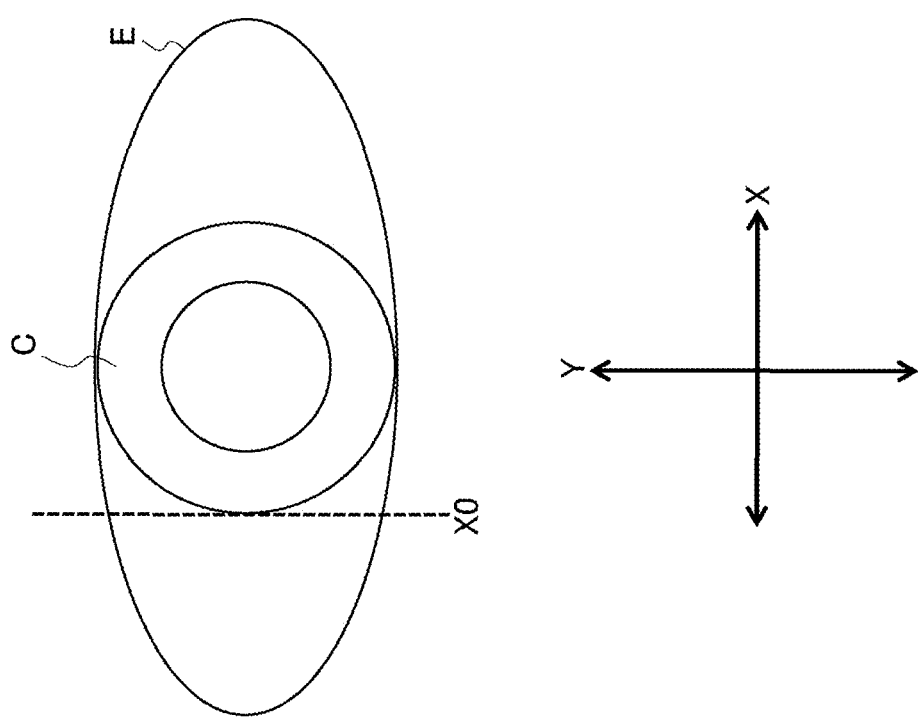
FIG. 2A is a schematic diagram for describing the operation of the slit lamp microscope of the aspect example.

First, the controller 7 controls the movement mechanism 6 to place the illumination system 2 and the photography system 3 at a predetermined scan start position. This control is referred to as alignment control. The scan start position is, for example, a position corresponding to the edge position (first edge position) of the cornea C in the X direction, or a position further away from the axis of the subject's eye E than the first edge position. The reference character X0 shown in FIG. 2A denotes an example of a scan start position corresponding to the first edge position of the cornea C in the X direction. Further, the reference character X0' shown in FIG. 2B denotes an example of a scan start position further away from the axis EA of the subject's eye E than the position corresponding to the first edge position of the cornea C in the X direction.

The controller 7 controls the illumination system 2 to start the projection of the slit light onto the anterior segment of subject's eye E. This control is referred to as slit light projection control. The slit light projection control may be performed before the execution of the alignment control or during the execution of the alignment control. The slit light is typically continuous light, but the slit light may be intermittent light (pulse light). The turning on/off control of the pulse light is synchronized with the photographing rate of the photography system 3. The slit light is typically visible light, but the slit light may be infrared light or a mixture of visible light and infrared light.

The controller 7 controls the photography system 3 to start moving image photography (moving image acquisition) of the anterior segment of the subject's eye E. This control is referred to as photography control. The photography control may be performed before the execution of the alignment control or during the execution of the alignment control. In some typical examples, the photography control is executed simultaneously with the slit light projection control or after the slit light projection control.

After having executed the alignment control, the slit light projection control, and the photography control, the controller 7 performs control of the movement mechanism 6 to start the movement of the illumination system 2 and the photography system 3. This control is referred to as movement control. The illumination system 2 and the photography system 3 are moved together by the movement control. In other words, the movement mechanism 6 moves the illumination system 2 and the photography system 3 while maintaining the relative positions (e.g., the angle θ) between the illumination system 2 and the photography system 3. In some typical examples, the movement mechanism 6 moves the illumination system 2 and the photography system 3 while maintaining the state in which the aforementioned Scheimpflug condition is satisfied. The movement of the illumination system 2 and the photography system 3 is performed from the aforementioned scan start position to a predetermined scan end position. The scan end position is, for example, a position corresponding to the edge position (second edge position) of the cornea C on the opposite side of the first edge position in the X direction, or a position further away from the axis of the subject's eye E than the second edge position, as in the scan start position. In such a case, the area from the scan start position to the scan end position becomes a scan area.

In some typical examples, the photography system 3 carries out the moving image photography in parallel with the projection of the slit light onto the anterior segment and the movement of the illumination system 2 and the photography system 3 in the X direction. The width direction of the slit light corresponds to the X direction and the longitudinal direction of the slit light corresponds to the Y direction.

Here, the length of the slit light (that is, the size of the slit light in the Y direction) is set to be, for example, equal to or greater than the diameter of the cornea C on the surface of the subject's eye E. In other words, the length of the slit light is set to be equal to or greater than the corneal diameter in the Y direction. Further, the distance of the movement of the illumination system 2 and the photography system 3 carried out by the movement mechanism 6 (that is, scan area) is set to be equal to or greater than the corneal diameter in the X direction, as described above. As a result of setting the slit light length and the movement distance in these manners, an area including the entire cornea C can be scanned with the slit light.

Figure 3:
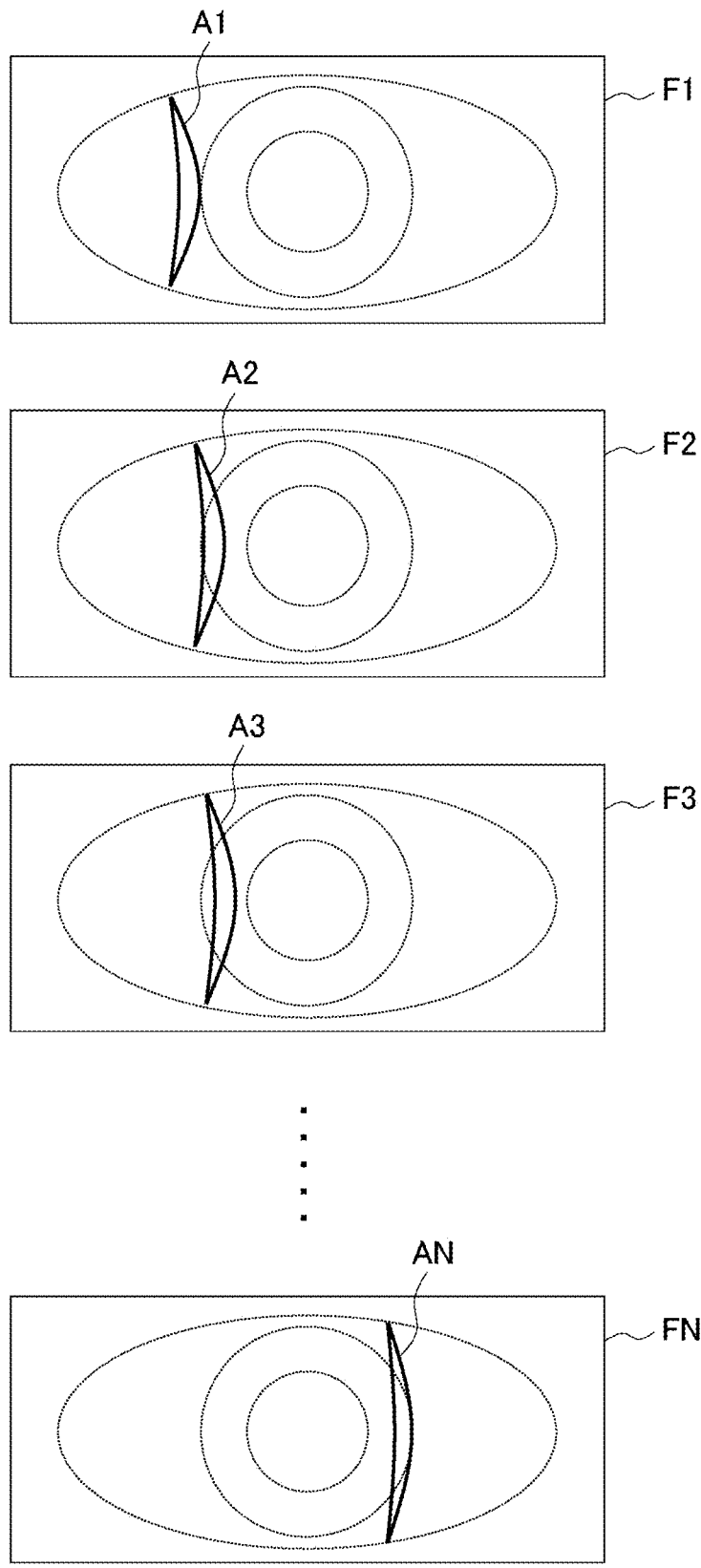
FIG. 3 is a schematic diagram for describing the operation of the slit lamp microscope of the aspect example.

With such a scan, a plurality of anterior segment images corresponding to mutually different slit light projection positions is acquired. In other words, a moving image is obtained in which the state (aspect) of the movement of the slit light projection position in the X direction is depicted. In the present aspect example, since the Scheimpflug condition is satisfied, a plurality of cross sectional images can be obtained in which a slit light projected region (cross section) at the time of photographing (at the time of capturing) is depicted in high definition. FIG. 3 shows an example of such a plurality of anterior segment images, that is, an example of such a group of frames (a frame group) composing a moving image.

FIG. 3 shows the plurality of anterior segment images (the frame group, the cross sectional image group) F1, F2, F3, . . . , and FN. The subscripts "n" of the anterior segment images Fn (n=1, 2, . . . , N) represent a time series order. In other words, the n-th anterior segment image acquired is represented by the reference character "Fn". The anterior segment image Fn includes the region onto which the slit light is being projected (slit light projected region) An. As shown in FIG. 3, the positions of the slit light projected regions A1, A2, A3, . . . , and AN shift to the right in time series order. The scan start position and the scan end position in the example shown in FIG. 3 correspond to both edge positions of the cornea C in the X direction. Possible scan start positions and/or possible scan end positions are not limited to the present example. The scan start position and/or the scan end position may be a position(s) further away from the axis of the subject's eye E than the edge position(s) of the cornea, for example. In addition, the direction of scans and the number of (times of) scans may be set accordingly.

<Data Processor 8>

The data processor 8 executes various kinds of data processing. Data to be processed may be either any data acquired by the slit lamp microscope 1 or any data input from the outside. For example, the data processor 8 can process images acquired by using the photography system 3. Note that the configuration examples and the function examples of the data processor 8 will also be described in other aspect examples in addition to the description of the present aspect example.

The data processor 8 includes a processor, a primary storage, a secondary storage, and the like. The secondary storage retains a data processing program and the like. The data processing program and the like may be stored in a computer or a data storage accessible by the slit lamp microscope 1. The function of the data processor 8 is implemented by cooperation of software such as the data processing program and hardware such as the processor.

The data processor 8 is configured to generate information (opacity distribution information) that represents a distribution of an opaque area(s) in a crystalline lens of the subject's eye E, based on a plurality of cross sectional images collected by scanning the anterior segment of the subject's eye E with slit light. A description will be given of several examples of such data processor 8. FIG. 4 to FIG. 14 show some configuration examples of the data processor 8, and two or more of these configuration examples may be combined. The configuration of the data processor 8 is not limited to these examples. The data processor 8 of some examples may include a freely selected element for achieving the same or similar results as or to these examples.

Figure 4:
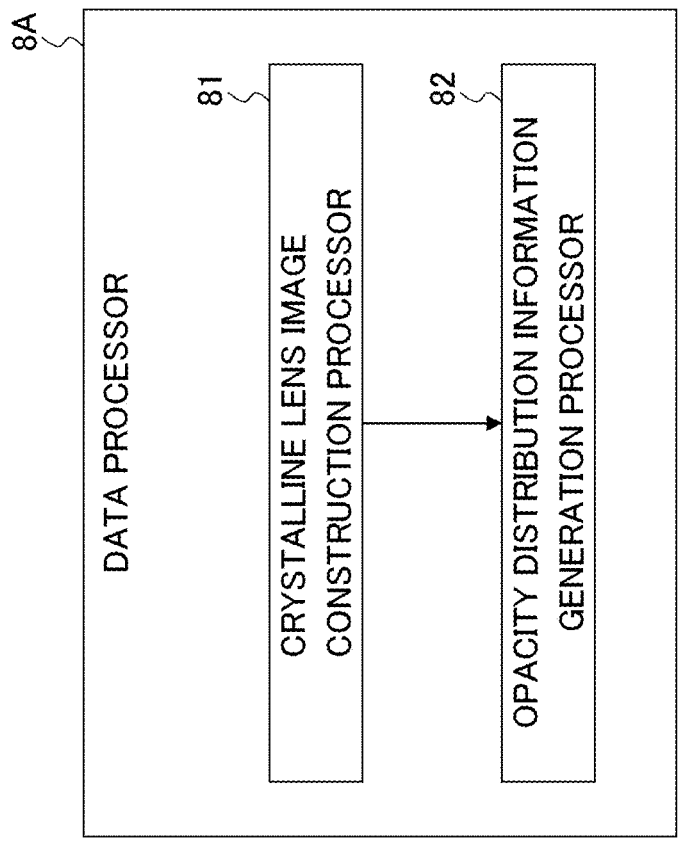
FIG. 4 is a schematic diagram illustrating the configuration of the slit lamp microscope of the aspect example.

The data processor 8A shown in FIG. 4 includes the crystalline lens image construction processor 81 and the opacity distribution information generation processor 82. The crystalline lens image construction processor 81 is configured to construct a three dimensional crystalline lens image from a plurality of cross sectional images (a plurality of anterior segment images) collected by anterior segment scanning using the slit light. The opacity distribution information generation processor 82 is configured to analyze the constructed three dimensional crystalline lens image to generate opacity distribution information.

FIG. 5A shows the first configuration example of the crystalline lens image construction processor 81. The crystalline lens image construction processor 81A of the present example includes the reconstruction processor 811 and the segmentation processor 812.

The reconstruction processor 811 is configured to apply three dimensional reconstruction to a plurality of anterior segment images collected by anterior segment scanning using the slit light. With this, a three dimensional reconstructed image is created from the plurality of anterior segment images. A three dimensional reconstructed image of some typical examples is stack data or volume data.

Stack data is constructed by representing, using a single three dimensional coordinate system (three dimensional image space), a plurality of anterior segment images defined by mutually different two dimensional coordinate systems (two dimensional image spaces). In other words, stack data is constructed by embedding a plurality of anterior segment images in the same three dimensional image space. For example, the embedding positions of individual anterior segment images may be determined based on the relative positional relationship between the plurality of anterior segment images.

In some examples, the relative positional relationship between the plurality of anterior segment images may be determined from the content of the above-mentioned scan control (slit light projection control, photography control, movement control, etc.). As an example of this, the relative positional relationship (arrangement intervals, etc.) of the plurality of anterior segment images can be determined based on the content of the movement control (scan area) and the content of the photography control (photographing rate, acquisition rate, capture rate, frame rate).

In some other examples, front images of the anterior segment are collected in parallel with scanning for collecting a plurality of cross sectional images of the anterior segment (a plurality of anterior segment images). In some typical examples, this anterior segment front photographing is synchronized with this scanning, and the relative positional relationship between the plurality of cross sectional images can be determined from the slit light projection regions depicted in the plurality of front images.

Volume data is also referred to as voxel data, and is constructed by applying a known voxelization process to stack data in some typical examples. It should be noted that the three dimensional image in the present aspect example is not limited to stack data or volume data.

The three dimensional reconstruction technique applied to the present aspect example may be freely selected. In some typical examples, the reconstruction processor 811 may apply a known three dimensional reconstruction technique to the plurality of anterior segment images in order to construct stack data. Further, the reconstruction processor 811 may apply a known voxelization process to this stack data in order to construct volume data.

The reconstruction processor 811 is configured to be capable of executing any of known processing executable as a part of three dimensional reconstruction and known processing executable together with three dimensional reconstruction. For example, the reconstruction processor 811 may apply, to the plurality of anterior segment images and/or the three dimensional reconstructed image, freely-selected correction processing such as noise elimination, brightness correction, distortion correction, contrast correction, color correction, and gamma correction. In addition, the reconstruction processor 811 may apply, to the plurality of anterior segment images and/or the three dimensional reconstructed image, a freely-selected filter such as a moving average filter, a Gaussian filter, a median filter, a Sobel filter, a smoothing filter, a sharpening filter, and a thinning filter.

The segmentation processor 812 is configured to apply segmentation to the three dimensional reconstructed image (stack data, volume data, etc.) constructed by the reconstruction processor 811. Segmentation or image segmentation is a process of partitioning an image into a plurality of segments (a plurality of regions). The segmentation of the present aspect example is used for identifying a partial region of the three dimensional reconstructed image.

The segmentation technique used in the present aspect example may be freely selected. The segmentation processor 812 of some examples includes a processor that operates in accordance with a program for executing a known segmentation algorithm. The segmentation processor 812 of some other examples may include an artificial intelligence engine. In some typical examples, this artificial intelligence engine may include a convolutional neural network (CNN). This convolutional neural network may have been trained in advance using training data that includes a large number of images acquired with slit lamp microscopes and corresponding segmentation results.

The segmentation processor 812 of some examples is configured to identify an image region corresponding to a predetermined tissue (predetermined site, part, or area) from the three dimensional reconstructed image constructed by the reconstruction processor 811. This tissue to be identified may usually be any tissue that can be photographed by the slit lamp microscope 1. For example, the tissue to be identified may be any of the followings: the cornea; a sub-tissue of the cornea (such as the anterior surface of the cornea, posterior surface of the cornea, corneal epithelium, Bowman's layer, corneal stroma, Dua's layer, Descemet's membrane, corneal endothelium); the iris; the anterior surface of the iris; the pupil; the anterior chamber; the crystalline lens; a sub-tissue of the crystalline lens (such as the anterior surface of the crystalline lens, posterior surface of the crystalline lens, crystalline lens epithelium, crystalline lens capsule); the vitreous body; a lesion; a blood vessel; and other ocular tissues.

Further, the segmentation processor 812 may be configured to identify an image region corresponding to any part of any ocular tissue from the three dimensional reconstructed image constructed by the reconstruction processor 811. For example, this part to be identified may be, for example, any of the front part (anterior part), central part, back part (posterior part), edge part, end part, and other parts.

As mentioned above, diaphanoscopy has a disadvantage that the brightness of an image cannot be controlled as well as a disadvantage that three dimensional information cannot be provided. One of the purposes of the slit lamp microscope 1 is to provide a novel crystalline lens observation technique without these disadvantages.

In order to achieve this purpose, the segmentation processor 812 may be configured to identify an image region corresponding to the crystalline lens (crystalline lens region) from the three dimensional reconstructed image constructed by the reconstruction processor 811. The image region extracted from the three dimensional reconstructed image by the segmentation processor 812 is referred to as a three dimensional crystalline lens image or simply a crystalline lens image.

Figure 5B:
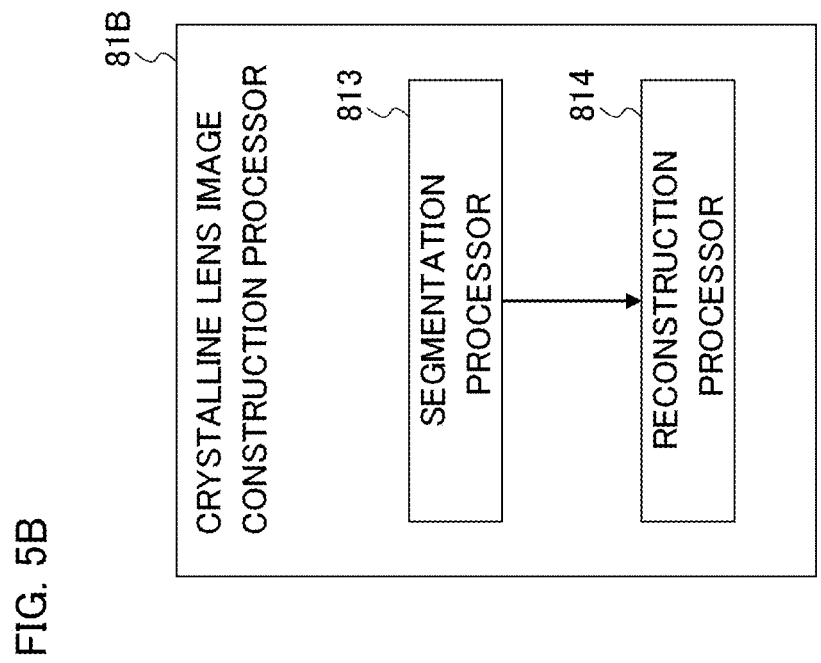
FIG. 5B is a schematic diagram illustrating the configuration of the slit lamp microscope of the aspect example.

FIG. 5B shows the second configuration example of the crystalline lens image construction processor 81. The crystalline lens image construction processor 81B of the present example includes the segmentation processor 813 and the reconstruction processor 814.

The first example described above is configured to first reconstruct a three dimensional image from a plurality of cross sectional images and then extract a three dimensional crystalline lens image from this three dimensional reconstructed image. On the other hand, the present example is configured to first extract a two dimensional crystalline lens image from each of a plurality of cross sectional images and then reconstruct a three dimensional crystalline lens image from the plurality of two dimensional crystalline lens images extracted.

The segmentation processor 813 is configured to apply segmentation to each of a plurality of anterior segment images collected by anterior segment scanning with slit light, thereby identifying a plurality of two dimensional crystalline lens images. Further, the reconstruction processor 814 is configured to construct a three dimensional crystalline lens image by applying three dimensional reconstruction to the plurality of two dimensional crystalline lens images identified from the individual plurality of anterior segment images by the segmentation processor 813.

The segmentation technique applied to the present example as well as the three dimensional reconstruction technique applied to the present example may be freely selected. Further, the method of determining the relative positional relationship between the plurality of two dimensional crystalline lens images may be executed in the same manner as the method of determining the relative positional relationship between the plurality of cross sectional images in the first example.

FIG. 6 shows a configuration example of the opacity distribution information generation processor 82. The opacity distribution information generation processor 82A of the present example includes the local distribution information generation processor 821. The local distribution information generation processor 821 is configured to generate information (local distribution information) that represents a distribution of an opaque area(s) in a three dimensional partial region, for each of a plurality of three dimensional partial regions in the three dimensional crystalline lens image constructed by the crystalline lens image construction processor 81. With this, obtained is a plurality of pieces of local distribution information respectively corresponding to the plurality of three dimensional partial regions of the three dimensional crystalline lens image.

The aspects of the plurality of three dimensional partial regions of the three dimensional crystalline lens image may be freely selected. In some typical examples, the plurality of three dimensional partial regions may be set by dividing (partitioning) the three dimensional crystalline lens image in a predetermined pattern defined in the XY plane. Examples of this division (partition) pattern in the XY plane include sector division (division into sectors), concentric division (division into concentric annuli, division by concentric circles), grid division (division by a grid or a lattice), and any other suitable patterns.

Figure 15:
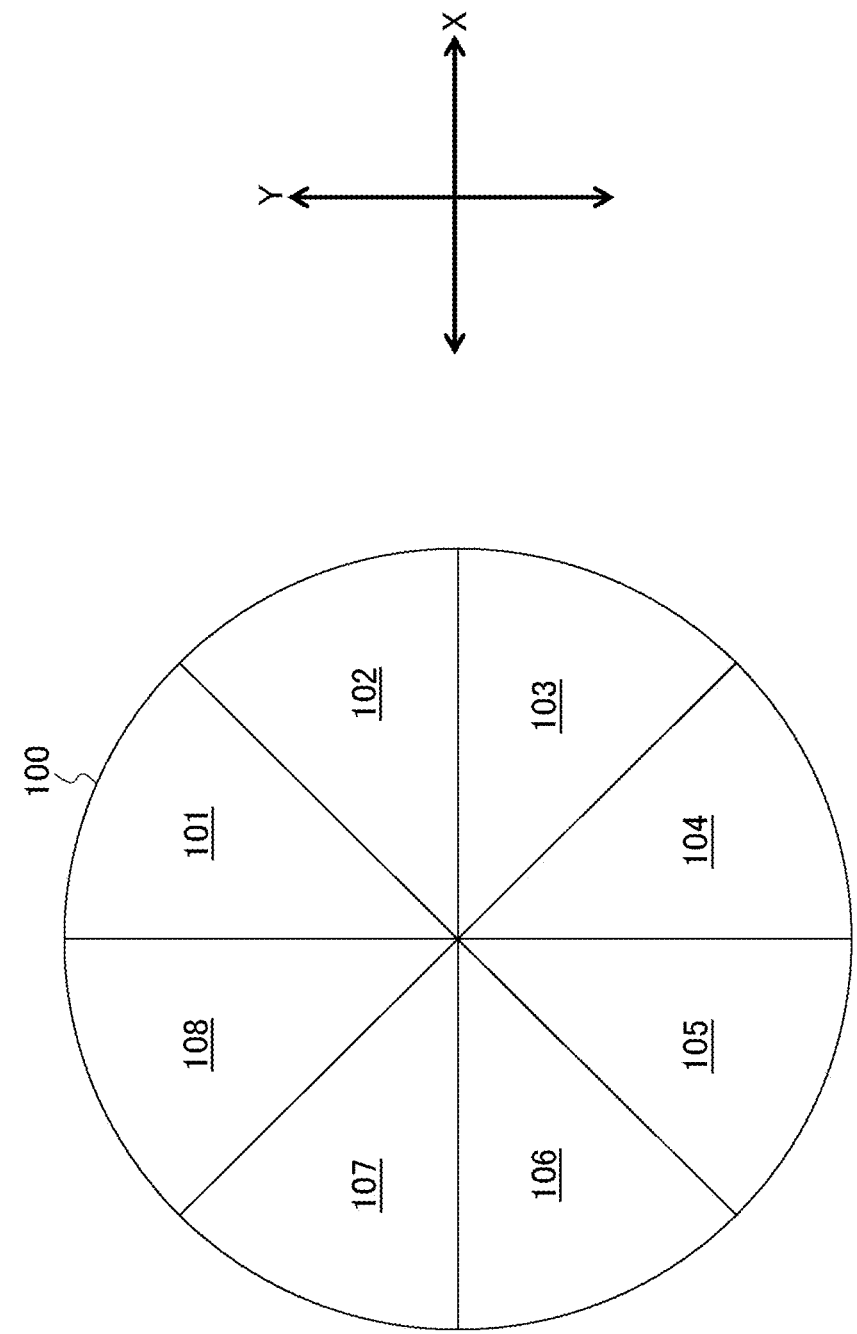
FIG. 15 is a schematic diagram for describing the process performed by the slit lamp microscope of the aspect example.

Sector division is a division technique that applies equal angle division to the crystalline lens image in the XY plane. Each partial image obtained by this division technique is substantially in the shape of a fan-shaped solid. This fan-shaped solid is a three dimensional figure whose axis is parallel to the Z direction and whose XY cross section perpendicular to this axis is of a fan shape. The center of the equal angle division in some typical examples is located at the center of the crystalline lens image in the XY plane. The XY center of the crystalline lens image may be determined, for example, as the center of the XY projection image of the crystalline lens image, as the center of gravity of the XY projection image of the crystalline lens image, or as a point on the axis of the crystalline lens image. Here, the axis of the crystalline lens image is, for example, a straight line passing through both the center of the anterior capsule and the center of the posterior capsule. FIG. 15. shows an example of sector division. In the sector division of the present example, equal angle division at an angle of 45 degrees is applied to the crystalline lens image 100. As a result, the eight pieces of partial regions 101 to 108, each having a shape of a substantially fan-shaped solid with the central angle of 45 degrees, are obtained. The same applies to other division patterns such as concentric division and grid division.

While divisions by patterns on the XY plane are described here, the modes or aspects of divisions of a three dimensional crystalline lens image are not limited to this. In some examples, a three dimensional crystalline lens image may be divided in the Z direction. In some other examples, a division by a pattern in the XY plane and a division in the Z direction may be combined. In addition, instead of or in combination with such a division with a pre-determined pattern, either one or both of the following division modes may be employed: a division mode based on any of the position, shape, and size (dimensions) of a sub-tissue of the crystalline lens; and a division mode based on any of the position, shape, and size (dimensions) of a tissue near the crystalline lens.

The opacity distribution information generation processor 82 (the local distribution information generation processor 821) identifies an image region (opaque region) corresponding to an opaque area in a three dimensional crystalline lens image. This process, in a typical example, includes image analysis based on pixel values such as brightness and/or color. For example, any segmentation technique may be used for this opaque region identification.

In some examples, the local distribution information generation processor 821 may be configured to acquire a plurality of pieces of local distribution information respectively corresponding to the plurality of three dimensional partial regions in the three dimensional crystalline lens image by performing the following processes: a process of identifying an opaque region(s) from the entire three dimensional crystalline lens image; a process of setting a plurality of three dimensional partial regions in the three dimensional crystalline lens image; and a process of assigning (allocating) a global opacity distribution obtained by the opaque region identification from the entire three dimensional crystalline lens image, to the plurality of three dimensional partial regions.

In some other examples, the local distribution information generation processor 821 may be configured to acquire a plurality of pieces of local distribution information respectively corresponding to the plurality of three dimensional partial regions in the three dimensional crystalline lens image by performing the following processes: a process of setting a plurality of three dimensional partial regions in the three dimensional crystalline lens image; and a process of identifying an opaque region from each of the plurality of three dimensional partial regions.

In some typical examples of the present aspect example, the slit light is visible light, so that the region behind the iris and the backside of the iris are not depicted in the plurality of anterior segment images collected by the scanning using such slit light. Therefore, the crystalline lens image in the three dimensional reconstructed image is only the image region corresponding to the part of the crystalline lens of the subject's eye E that is located just behind the pupil.

Further, since the slit lamp microscope 1 is configured to perform photography of a cross section illuminated by the slit light (e.g., YZ cross section) from an oblique angle, the state of this cross section is depicted in an anterior segment image obtained by photographing this cross section, and, in particular, a two dimensional distribution of opacities (opaque areas) in the crystalline lens (e.g., a distribution in the YZ cross section) is depicted. Repeating photography (photographing, image capturing) in parallel with moving such a cross section (e.g., performing moving image photography while performing movement of such a YZ cross section in the X direction) yields a three dimensional reconstructed image representing a three dimensional distribution of opaque areas in the crystalline lens. The three dimensional crystalline lens image in this three dimensional reconstructed image includes information on the three dimensional opacity distribution. As described thus far, the present aspect example makes it possible to obtain a three dimensional distribution of opaque areas in the crystalline lens.

Figure 7:
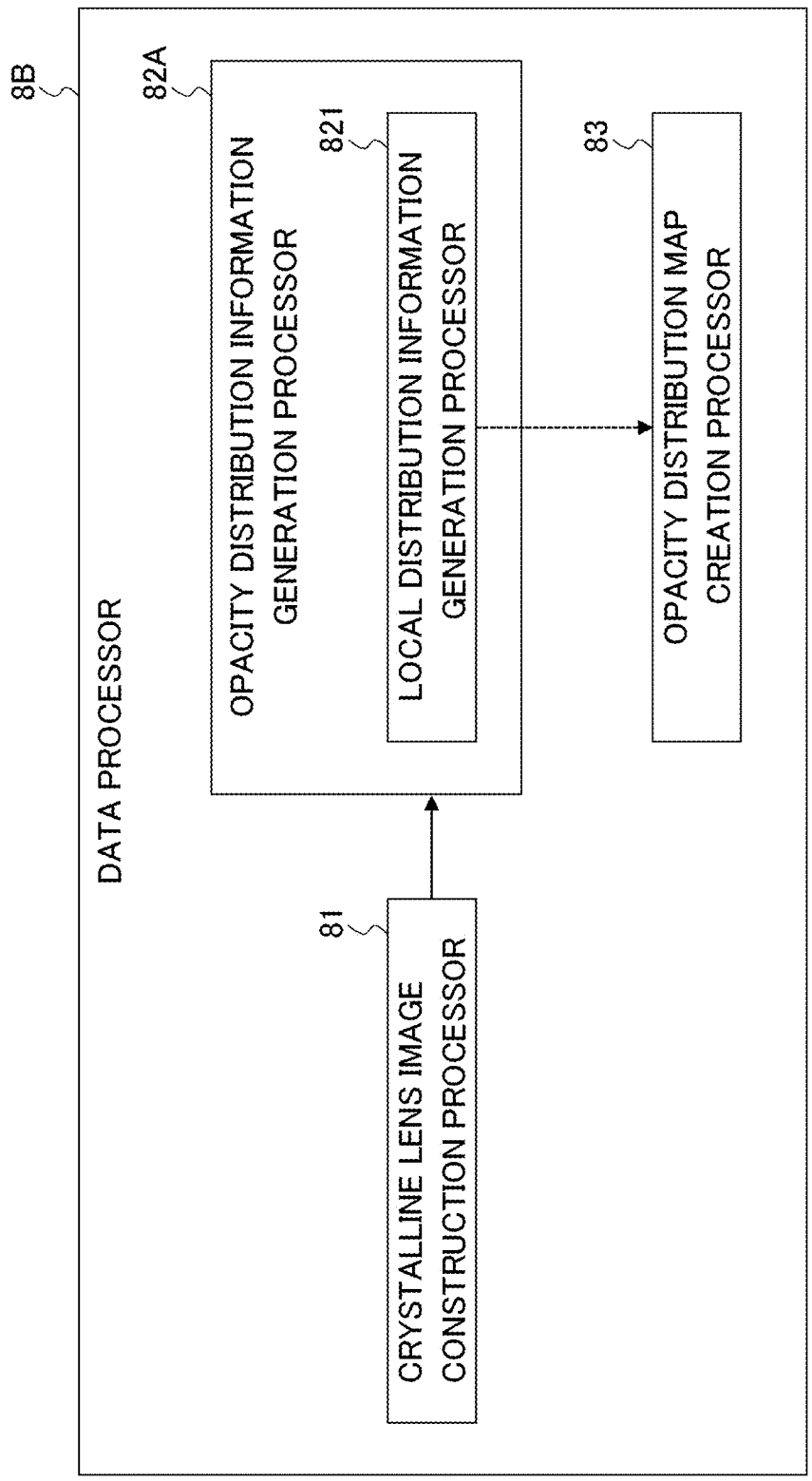
FIG. 7 is a schematic diagram illustrating the configuration of the slit lamp microscope of the aspect example.

The slit lamp microscope 1 may be configured to be capable of creating an image that represents a distribution of opaque areas in the crystalline lens of the subject's eye E. This created image is referred to as an opacity distribution map. FIG. 7 shows a configuration example of the data processor 8 that can create opacity distribution maps. The data processor 8B of the present example includes the opacity distribution map creation processor 83. In the present example, the local distribution information generation processor 821 generates a plurality of pieces of local distribution information respectively corresponding to a plurality of three dimensional partial regions in a three dimensional crystalline lens image. The opacity distribution map creation processor 83 is configured to create an opacity distribution map based on the plurality of pieces of local distribution information generated.

An opacity distribution map is information that represents visualization of a freely selected indicator regarding a distribution of opaque areas. This indicator may be, for example, position, size (dimensions), shape, number, density, or concentration. As mentioned above, the present aspect example is capable of obtaining a three dimensional distribution of opaque areas, and in particular, is capable of obtaining the positions of opaque areas in the depth direction (Z direction) which cannot be obtained by diaphanoscopy. Therefore, an opacity distribution map of the present aspect example may, at least, include information that represents the depth positions of opaque areas in each of a plurality of three dimensional partial regions in a three dimensional crystalline lens image. The method or technique of representing such depth positions may be freely selected. In some examples, depth positions may be represented by using displayed positions, numerical values, colors, patterns, or any other suitable parameters.

The opacity distribution map may be defined by a two dimensional coordinate system that can be used to represent the depth positions of opaque areas. In some examples, the first coordinate axis of this two dimensional coordinate system represents the depth direction (Z direction), and the second coordinate axis represents a direction perpendicular to the depth direction (any direction in the XY plane).

Figure 16A:
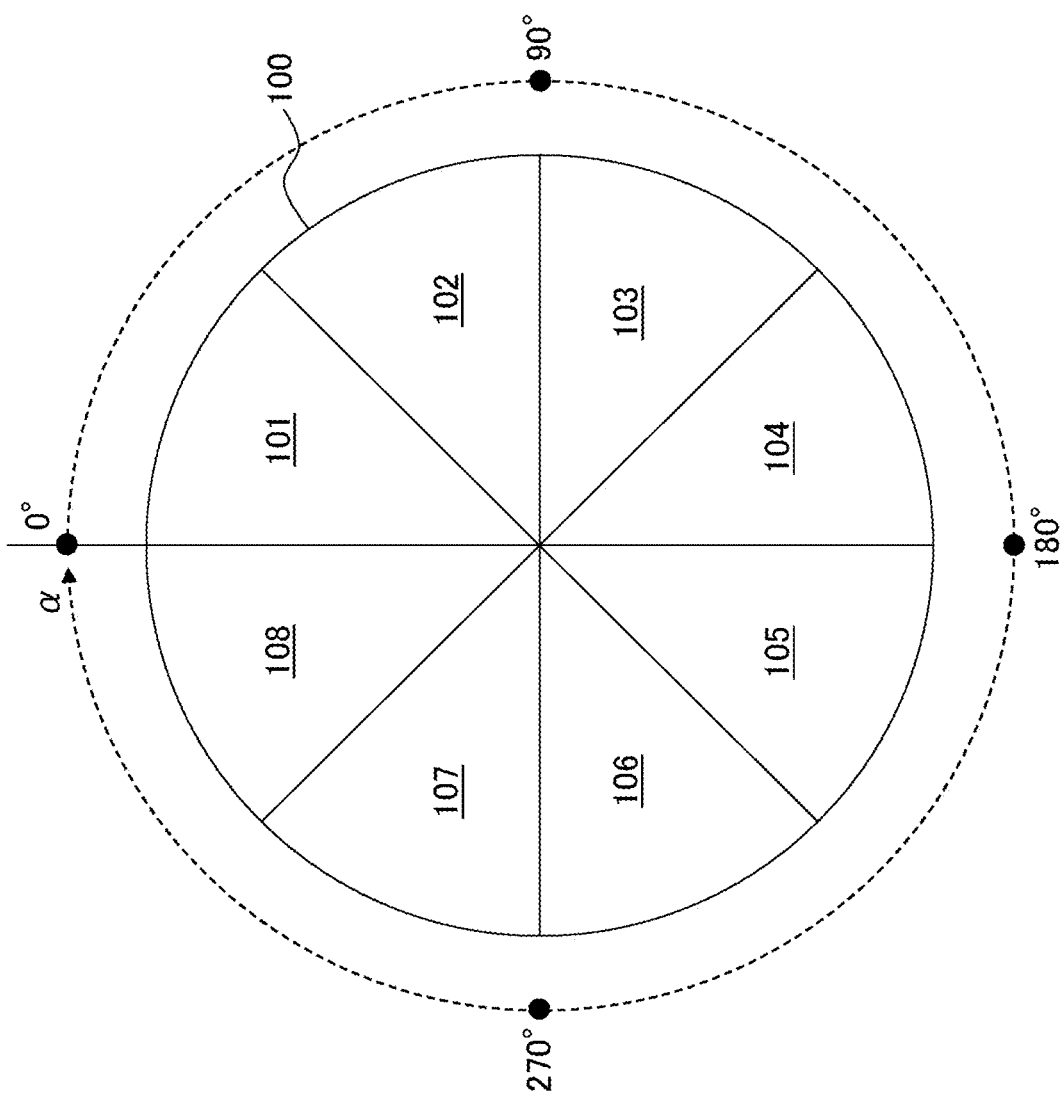
FIG. 16A is a schematic diagram for describing the process performed by the slit lamp microscope of the aspect example.

An example of an opacity distribution map using such a two dimensional coordinate system will be described with reference to FIG. 16A and FIG. 16B. FIG. 16A shows the second coordinate axis $\alpha$ in the case of FIG. 15 (sector division of the crystalline lens image 100 with an equal angle division at an angle of 45 degrees). The second coordinate axis a is defined in the XY coordinate system, and is a coordinate axis representing angles with the upward direction as the origin (zero degrees) and the clockwise direction as the positive direction. The first coordinate axis in the present example is the Z coordinate axis in the XYZ coordinate system.

As described above, the sector division of the present example yields the eight pieces of partial regions 101 to 108, each of which has a substantially fan-shaped solid shape with the central angle of 45 degrees. The angle ranges of the central angles of the partial regions 101 to 108 correspond to the interval (range) $\alpha$=0 to 45 degrees, the interval $\alpha$=45 to 90 degrees, the interval $\alpha$=90 to 135 degrees, the interval $\alpha$=135 to 180 degrees, the interval $\alpha$=180 to 225 degrees, the interval $\alpha$=225 to 270 degrees, the interval $\alpha$=270 to 315 degrees, and the interval $\alpha$=315 to 360 degrees of the second coordinate axis, respectively.

Figure 16B:
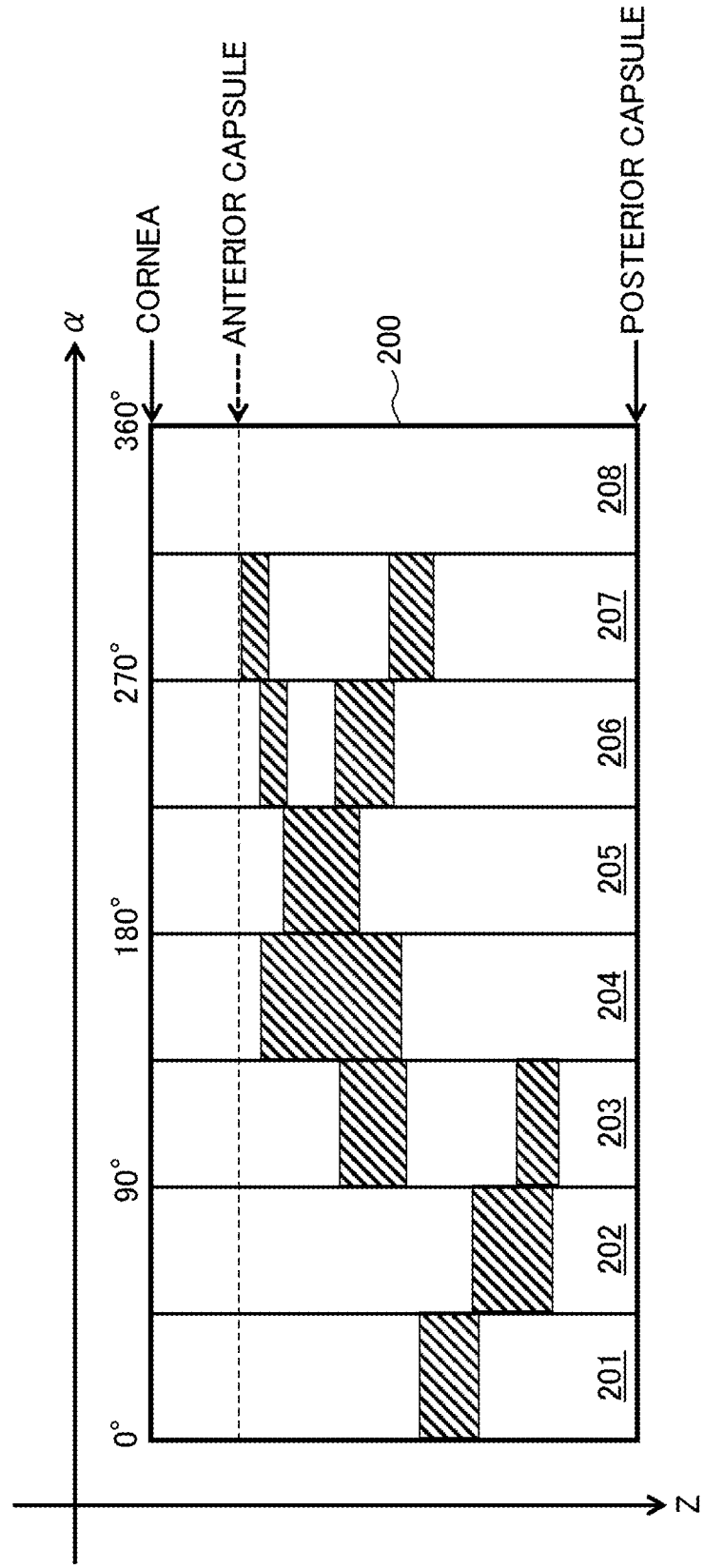
FIG. 16B is a schematic diagram for describing the process performed by the slit lamp microscope of the aspect example.

FIG. 16B shows an example of an opacity distribution map represented by a two dimensional coordinate system in which the Z coordinate axis is the first coordinate axis and the $\alpha$ coordinate axis is the second coordinate axis. In the two dimensional coordinate system shown in FIG. 16B, the $\alpha$ coordinate axis, which has been defined in a circular shape in FIG. 16A, is represented in a linear shape. That is, the two dimensional coordinate system shown in FIG. 16B is a two dimensional Cartesian coordinate system (two dimensional orthogonal coordinate system) defined by the linear-shaped Z coordinate axis and the linear-shaped $\alpha$ coordinate axis.

The upper edge of the opacity distribution map 200 shown in FIG. 16B defined by the Z$\alpha$ coordinate system shows the position of the cornea, and the lower edge shows the position of the posterior capsule of the crystalline lens. The dashed line between the upper and lower edges indicates the position of the anterior capsule of the crystalline lens. The three dimensional crystalline lens image corresponds to the area from the anterior capsule of the crystalline lens to the posterior capsule of the crystalline lens, and opaque regions identified from the three dimensional crystalline lens image are distributed in this area. The opaque regions are indicated by the shaded lines (diagonal lines).

The opacity distribution map 200 is partitioned into the eight pieces of strip-shaped partial regions 201 to 208, each of which has the Z direction as the longitudinal direction and the $\alpha$ direction as the lateral direction. The eight pieces of partial regions 201 to 208 in the opacity distribution map 200 correspond to the eight pieces of partial regions 101 to 108 of the crystalline lens image 100 shown in FIG. 16A, respectively.

According to the opacity distribution map 200 configured in this way, the distribution of opaque areas in the crystalline lens of subject's eye E can be represented (visualized) in a manner that can be easily perceived. In particular, the depth positions of opaque areas (that is, a distribution of opaque areas in the depth direction), which cannot be obtained by diaphanoscopy, can be represented (visualized) in a manner that can be easily perceived.

Note that it is possible to provide a three dimensional distribution of opaque areas by using anterior segment OCT. However, there are some possible problems in using anterior segment OCT, and thus, the slit lamp microscope 1 of the present aspect example is considered to be advantageous at least in the acquisition and provision (representation, visualization) of opacity distributions. The possible problems in using anterior segment OCT are the followings: (1) Anterior segment OCT apparatuses are not used as widely used as slit lamp microscopes; (2) While the slit lamp microscope 1 performs photography using visible light that contributes to human vision, anterior segment OCT performs measurement using infrared light; (3) While the slit lamp microscope 1 performs photography of an illuminated field from an oblique direction and so opaque areas are clearly depicted regardless of the depth position, anterior segment OCT detects back reflection and backscattering of illumination light so that opaque areas located in deep positions may not be (clearly) depicted. For example, in the case where there exist two or more opaque areas arranged in the depth direction (two or more opaque areas with different depth positions, one opaque area is above another) like the partial regions 203, 206, and 207, an opaque area(s) located in a deeper position(s) cannot be (clearly) depicted.

An image created based on a plurality of anterior segment images may be displayed together with the opacity distribution map 200. This image of some examples may be an image defined by a two dimensional coordinate system that is used to define the opacity distribution map 200. In some examples, a two dimensional image defined by the $Z\alpha$ coordinate system can be constructed by projecting a three dimensional image that includes a three dimensional crystalline lens image onto a cylindrical surface centered on the axis of the crystalline lens. Here, the three dimensional image that includes the three dimensional crystalline lens image is a three dimensional image representing the region from the cornea to the posterior capsule of the crystalline lens. Such image construction process is performed, in some examples, by the rendering processor 86 described later.

The slit lamp microscope 1 may be configured to be capable of acquiring information that represents a distribution of light transmissivity of the crystalline lens of the subject's eye E. Examples of this information include transmissivity distribution information and a transmissivity distribution map. Some examples of the configuration of the data processor 8 for acquiring such information will be described with reference to FIG. 8A to FIG. 8C.

Figure 8A:
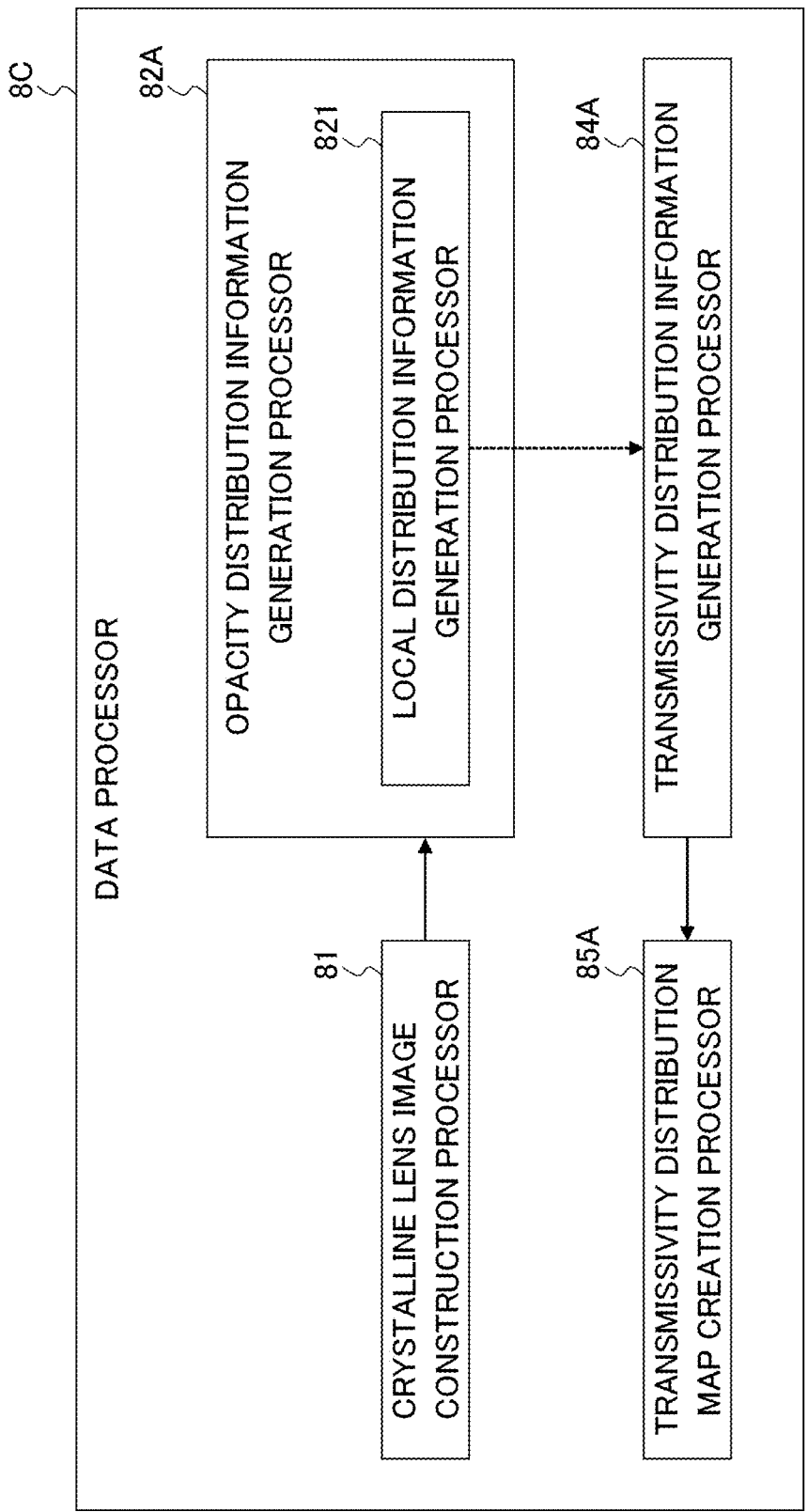
FIG. 8A is a schematic diagram illustrating the configuration of the slit lamp microscope of the aspect example.

The data processor 8C shown in FIG. 8A includes the transmissivity distribution information generation processor 84A and the transmissivity distribution map creation processor 85A. In the present example, the local distribution information generation processor 821 generates a plurality of pieces of local distribution information respectively corresponding to a plurality of three dimensional partial regions in a three dimensional crystalline lens image.

The transmissivity distribution information generation processor 84A is configured to generate transmissivity distribution information that represents a distribution of light transmissivity of the crystalline lens of the subject's eye E, based on the plurality of pieces of local distribution information generated by the local distribution information generation processor 821. The transmissivity distribution map creation processor 85A is configured to create a transmissivity distribution map that visually represents a distribution of light transmissivity of the crystalline lens of the subject's eye E, based on the transmissivity distribution information generated by the transmissivity distribution information generation processor 84A.

In some examples, the transmissivity distribution information generation processor 84A calculates values of light transmissivity in individual three dimensional partial regions respectively corresponding to the plurality of pieces of local distribution information generated by the local distribution information generation processor 821. Each of the calculated values may be any of the followings, for example: a single value (e.g., statistical value such as the mean value, the maximum value, the minimum value, the median, the mode); a range (e.g., range between the maximum value and the minimum value); and a distribution.

In some examples, the transmissivity distribution map creation processor 85A assigns the value of light transmissivity calculated from each of the plurality of pieces of local distribution information to a corresponding three dimensional partial regions, thereby creating an image (transmissivity distribution map) that represents a distribution of light transmissivity over the plurality of three dimensional partial regions. The technique or method of representing values of light transmissivity may be freely selected. For example, the magnitudes of values of light transmissivity or any other suitable characteristics may be represented by numerical values, colors, patterns, or any other suitable parameters.

Figure 8B:
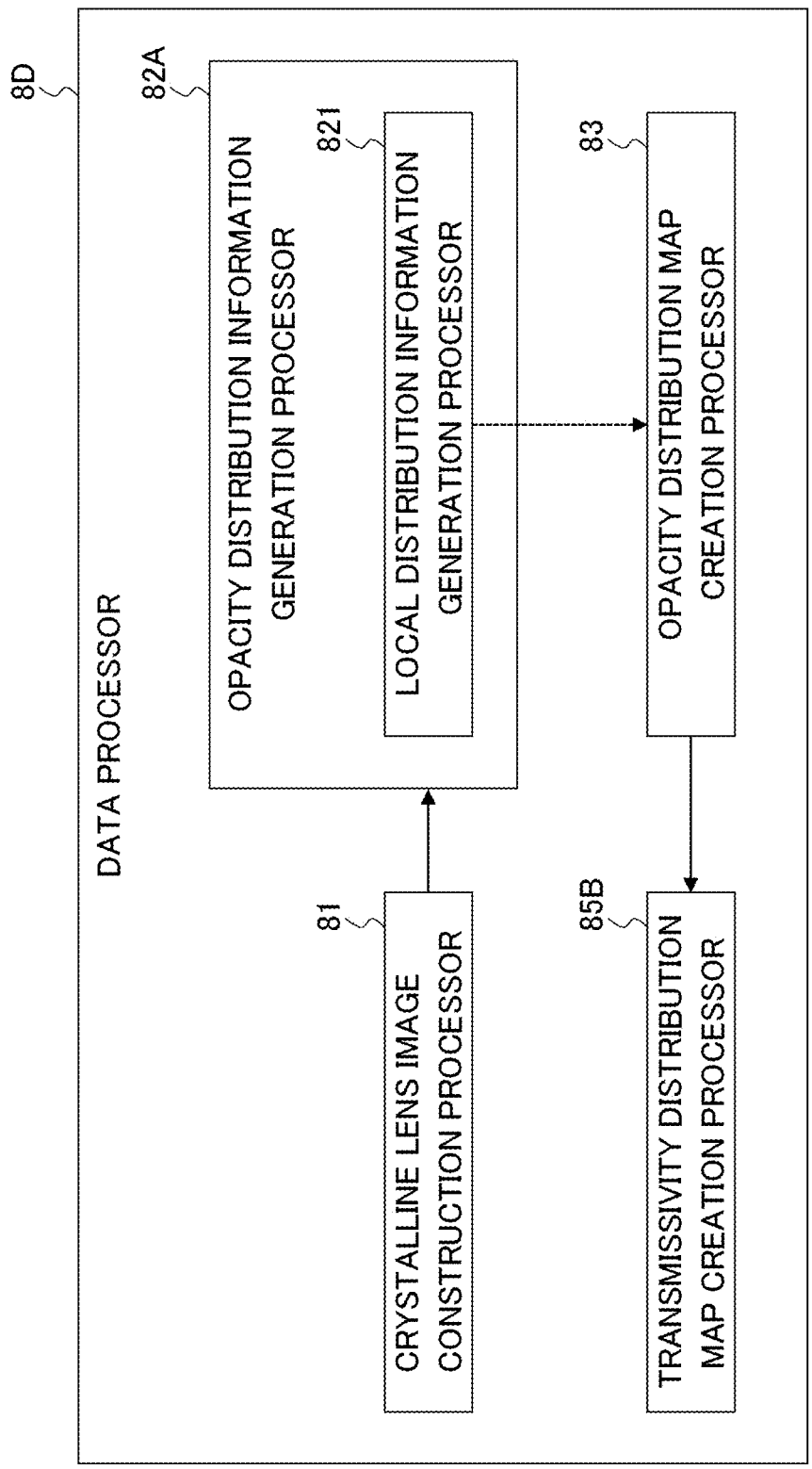
FIG. 8B is a schematic diagram illustrating the configuration of the slit lamp microscope of the aspect example.

The data processor 8D shown in FIG. 8B includes the transmissivity distribution map creation processor 85B. In the present example, the local distribution information generation processor 821 generates a plurality of pieces of local distribution information respectively corresponding to a plurality of three dimensional partial regions in a three dimensional crystalline lens image, and then the opacity distribution map creation processor 83 creates an opacity distribution map based on the plurality of pieces of local distribution information generated by the local distribution information generation processor 821.

The transmissivity distribution map creation processor 85B is configured to create a transmissivity distribution map that visually represents a distribution of light transmissivity of the crystalline lens of the subject's eye E, based on the opacity distribution map created by the opacity distribution map creation processor 83.

In some examples, the transmissivity distribution map creation processor 85B creates a transmissivity distribution map by converting each of the plurality of pieces of local distribution information represented in the opacity distribution map into light transmissivity. The technique or method of representing values of light transmissivity may be freely selected. Further, the technique or method of converting local distribution information into light transmissivity may also be freely selected. Described below is a specific example of the case of creating a transmissivity distribution map from an opacity distribution map in this manner.

Figure 8C:
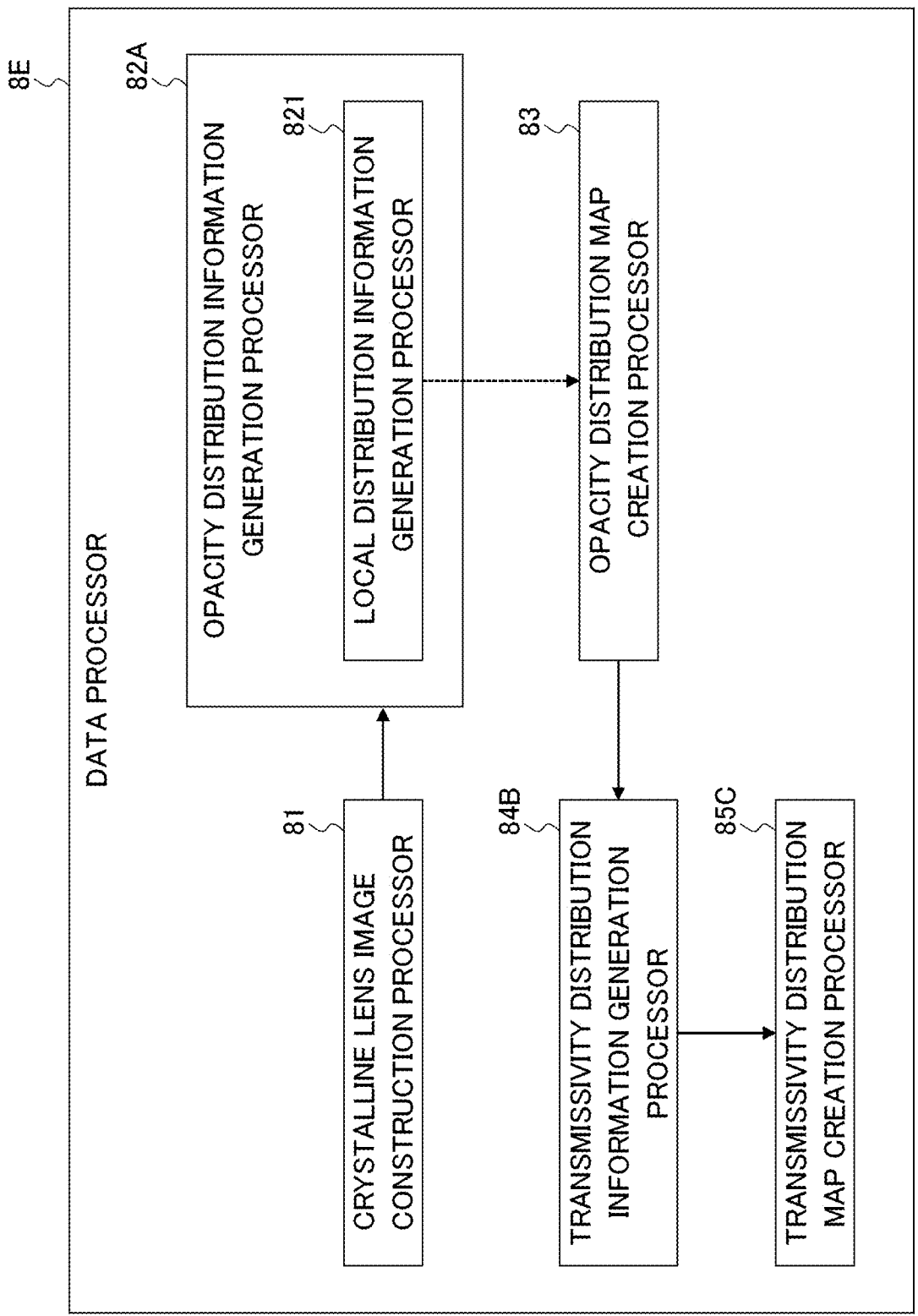
FIG. 8C is a schematic diagram illustrating the configuration of the slit lamp microscope of the aspect example.

The data processor 8E shown in FIG. 8C includes the transmissivity distribution information generation processor 84B and the transmissivity distribution map creation processor 85C. In the present example, the local distribution information generation processor 821 generates a plurality of pieces of local distribution information respectively corresponding to a plurality of three dimensional partial regions in a three dimensional crystalline lens image, and then the opacity distribution map creation processor 83 creates an opacity distribution map based on the plurality of pieces of local distribution information generated by the local distribution information generation processor 821.

In the present example, an opacity distribution map created by the opacity distribution map creation processor 83 is represented by a two dimensional coordinate system in which the first coordinate axis represents the depth direction and the second coordinate axis represents a direction perpendicular to the depth direction. The opacity distribution map 200 of FIG. 16B, which is an example of such an opacity distribution map, is defined by the $Z\alpha$ coordinate system.

In order to create a transmissivity distribution map from an opacity distribution map defined by such a two dimensional coordinate system, the transmissivity distribution information generation processor 84B is configured to generate transmissivity distribution information that represents a distribution of light transmissivity of the crystalline lens of the subject's eye E by executing the calculation of dividing the size (area, square measure, quantity or value that expresses the extent of a two dimensional region) of an opaque area(s) in a three dimensional partial region defined by the two dimensional coordinate system by the size of this three dimensional partial region. This division (calculation of quotient) is performed for each of a plurality of three dimensional partial regions in a three dimensional crystalline lens image.

When the opacity distribution map 200 in FIG. 16B is created by the opacity distribution map creation processor 83, the transmissivity distribution information generation processor 84B generates transmissivity distribution information that represents a distribution of light transmissivity of the crystalline lens of the subject's eye E by performing calculation, for each of the plurality of three dimensional partial regions 101 to 108 in the three dimensional crystalline lens image 100 of FIG. 16A, of dividing the size(s) of the opaque area(s) in a three dimensional partial region defined by the Zα coordinate system by the size of this three dimensional partial region.

In some examples, for the three dimensional partial region 101 in the three dimensional crystalline lens image 100, the transmissivity distribution information generation processor 84B calculates the value of light transmissivity corresponding to the three dimensional partial region 101 by calculating a quotient of the size of the opaque area in the three dimensional partial region 101 defined by the Zα coordinate system over the size of the three dimensional partial region 101. In other words, the transmissivity distribution information generation processor 84B calculates the value (estimated value) of light transmissivity corresponding to the three dimensional partial region 101 by dividing the size of the opaque area (the shaded region) in the strip-shaped partial region 201 in FIG. 16B by the size of the partial region 201.

By executing the same calculation for each of the three dimensional partial regions 102 to 108, the transmissivity distribution information generation processor 84B obtains a plurality of pieces of transmissivity distribution information corresponding to the plurality of three dimensional partial regions 101 to 108 in the three dimensional crystalline lens image 100.

The method or technique of generating transmissivity distribution information from the opacity distribution map 200 is not limited to this. In some examples, the transmissivity distribution information generation processor 84B may be configured to calculate, for each of the plurality of three dimensional partial regions 101 to 108 in the three dimensional crystalline lens image 100, a value of light transmissivity corresponding to a three dimensional partial region by calculating a quotient of the volume(s) (quantity or value that expresses the extent of a three dimensional region) of an opaque area(s) in a three dimensional partial region over the volume of this three dimensional partial region. In some other examples, the transmissivity distribution information generation processor 84B may perform calculation by taking into account weights determined based on a predetermined index (e.g., density, concentration) of opaque areas.

The transmissivity distribution map creation processor 85C is configured to create a transmissivity distribution map that visually represents a distribution of light transmissivity of the crystalline lens of the subject's eye E, based on the transmissivity distribution information generated by the transmissivity distribution information generation processor 84B. The method or technique of representing values of light transmissivity may be freely selected.

Figure 17:
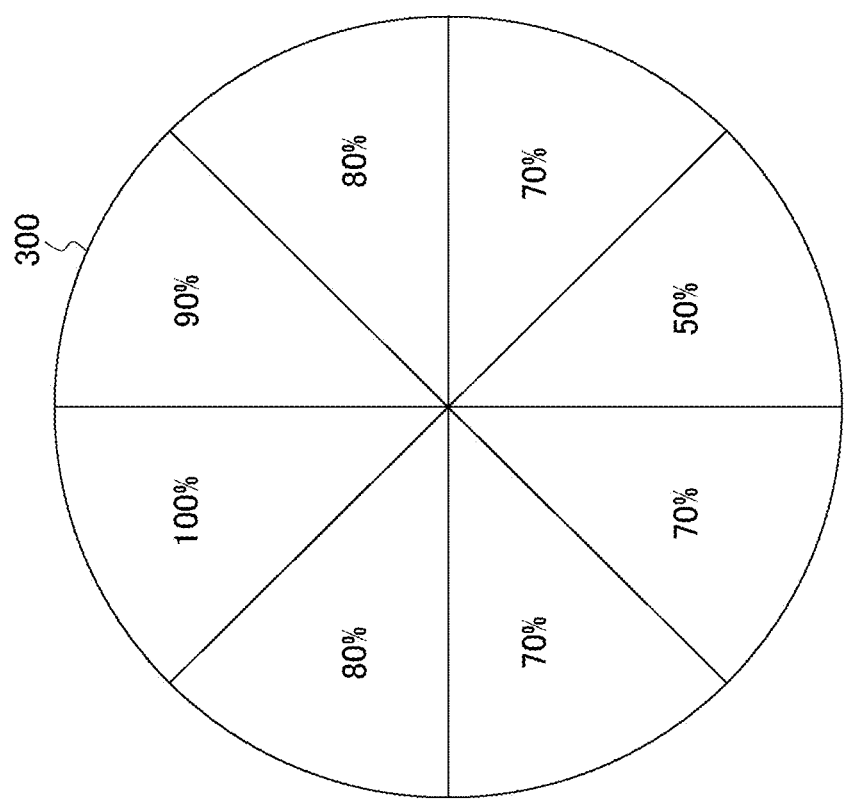
FIG. 17 is a schematic diagram for describing the process performed by the slit lamp microscope of the aspect example.

FIG. 17 shows an example of a transmissivity distribution map created by the transmissivity distribution map creation processor 85C. The transmissivity distribution map 300 presents the eight pieces of light transmissivity values for the eight pieces of zones corresponding to the eight pieces of three dimensional partial regions 101 to 108 in the three dimensional crystalline lens image 100 (see FIG. 15). Here, the smaller the value of light transmissivity, the stronger the opacity (the higher the density or concentration of opacity). According to the transmissivity distribution map 300 configured in this way, a distribution of light transmissivity in the crystalline lens of the subject's eye E can be visualized in an easily perceivable manner.

The slit lamp microscope 1 of the present aspect example may be configured to apply rendering to a plurality of anterior segment images (a plurality of cross sectional images) collected by anterior segment scanning using the slit light, or apply rendering to an image constructed from a plurality of anterior segment images collected by anterior segment scanning. Some examples of the configuration of the data processor 8 for that purpose will be described with reference to FIG. 9A and FIG. 9B.

Figure 9A:
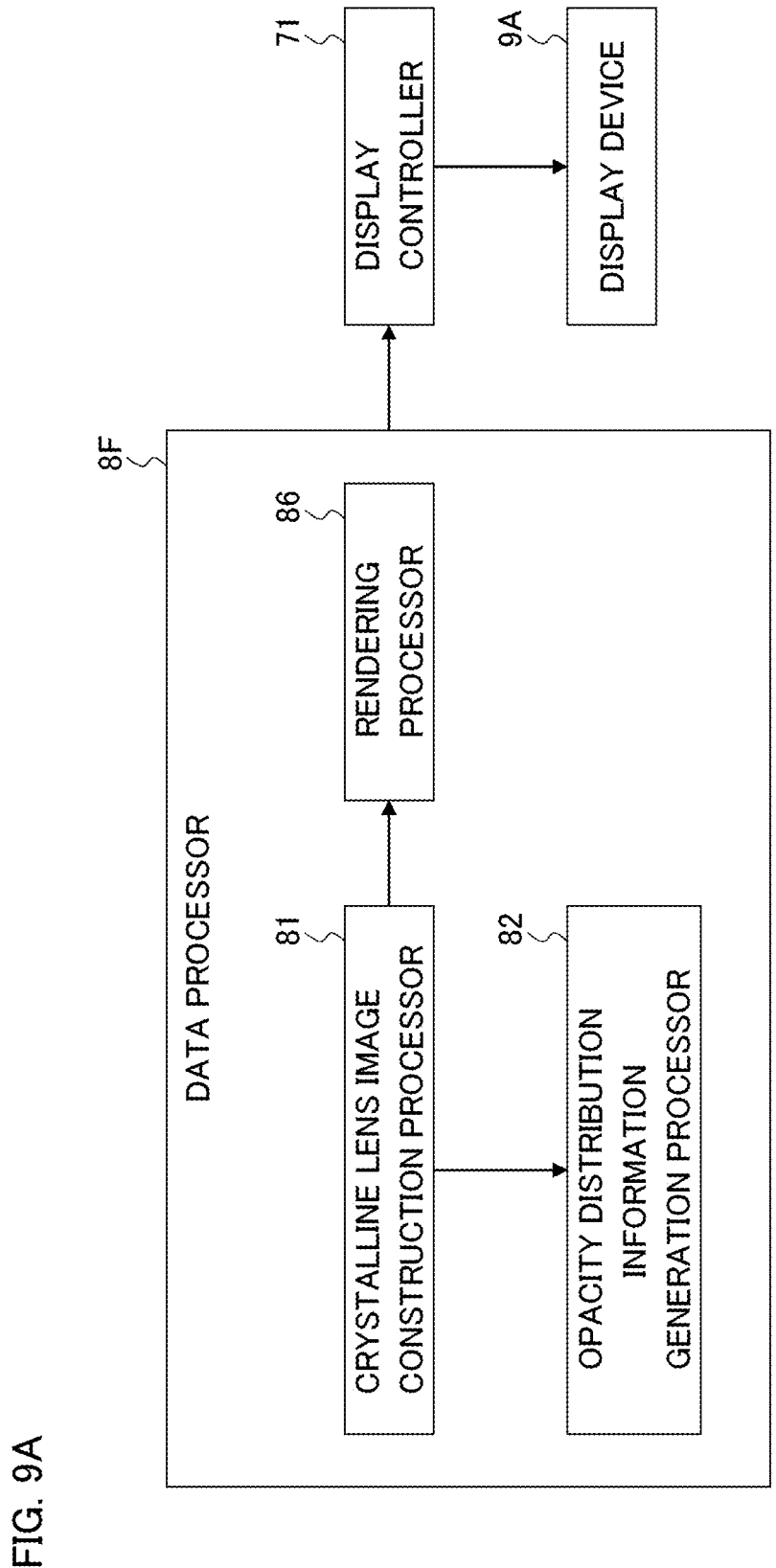
FIG. 9A is a schematic diagram illustrating the configuration of the slit lamp microscope of the aspect example.

The data processor 8F shown in FIG. 9A includes the rendering processor 86. The rendering processor 86 is configured to apply rendering to a three dimensional image that includes a three dimensional crystalline lens image constructed by the crystalline lens image construction processor 81.

The three dimensional image to which the rendering is applied may be any of the followings: a three dimensional crystalline lens image; a three dimensional image including the three dimensional crystalline lens image as a proper subset; a part (a proper subset) of the three dimensional crystalline lens image; and a three dimensional image including a part (a proper subset) of the three dimensional crystalline lens image as a proper subset.

More generally, the three dimensional image to which the rendering is applied is an image whose pixel positions are defined using a three dimensional coordinate system. In some examples, the three dimensional image to which the rendering is applied may be a freely determined part of a three dimensional reconstructed image of a plurality of anterior segment images collected by anterior segment scanning with slit light, or an entire three dimensional reconstructed image of a plurality of anterior segment images collected by anterior segment scanning with slit light. The three dimensional reconstructed image of some examples may be stack data or volume data.

The rendering processor 86 applies rendering to the three dimensional image obtained in this way. Examples of the technique or method of this rendering include volume rendering, surface rendering, maximum intensity projection (MIP), minimum intensity projection (MinIP), and multi planar reconstruction (MPR). The rendering technique applied to the present aspect example is mainly projection.

The projection includes image processing of executing a projection (integration), in a predetermined direction, of a group of pixels (pixel group) included in the three dimensional image. In other words, the projection includes image processing of projecting a group of images (image group) included in the three dimensional image onto a predetermined plane. In some typical examples, the rendering processor 86 can construct a two dimensional image (projection image) defined in the XY coordinate system by applying projection in the Z direction to the three dimensional image defined in the XYZ coordinate system.

Needless to say, it is also possible to employ any rendering technique other than projection. The rendering processor 86 of some examples may be prepared as being capable of executing a plurality of kinds of rendering techniques, and these techniques may be executed in a selective manner.

In the present aspect example, the rendering processor 86 receives a three dimensional crystalline lens image constructed by the crystalline lens image construction processor 81 or a three dimensional image that includes at least part of a three dimensional crystalline lens image constructed by the crystalline lens image construction processor 81. In some examples, the rendering processor 86 constructs an XY projection image by applying projection in the Z direction to the three dimensional crystalline lens image.

The display controller 71 may be configured to display, on the display device 9A, a rendered image constructed by the rendering processor 86 and information created based on the opacity distribution information in such a manner that one of the rendered image and the information created based on the opacity distribution information is overlaid on the other. In some examples, the display controller 71 may display, over an XY projection image, distribution information that represents a distribution state of opacity areas in the crystalline lens of the subject's eye E. Examples of this distribution information include opacity distribution information, opacity distribution map, transmissivity distribution information, and transmissivity distribution map. Described below is a specific example of the case of displaying an XY projection image and distribution information in such a manner as to overlay one of the XY projection image and the distribution information on the other.

Figure 9B:
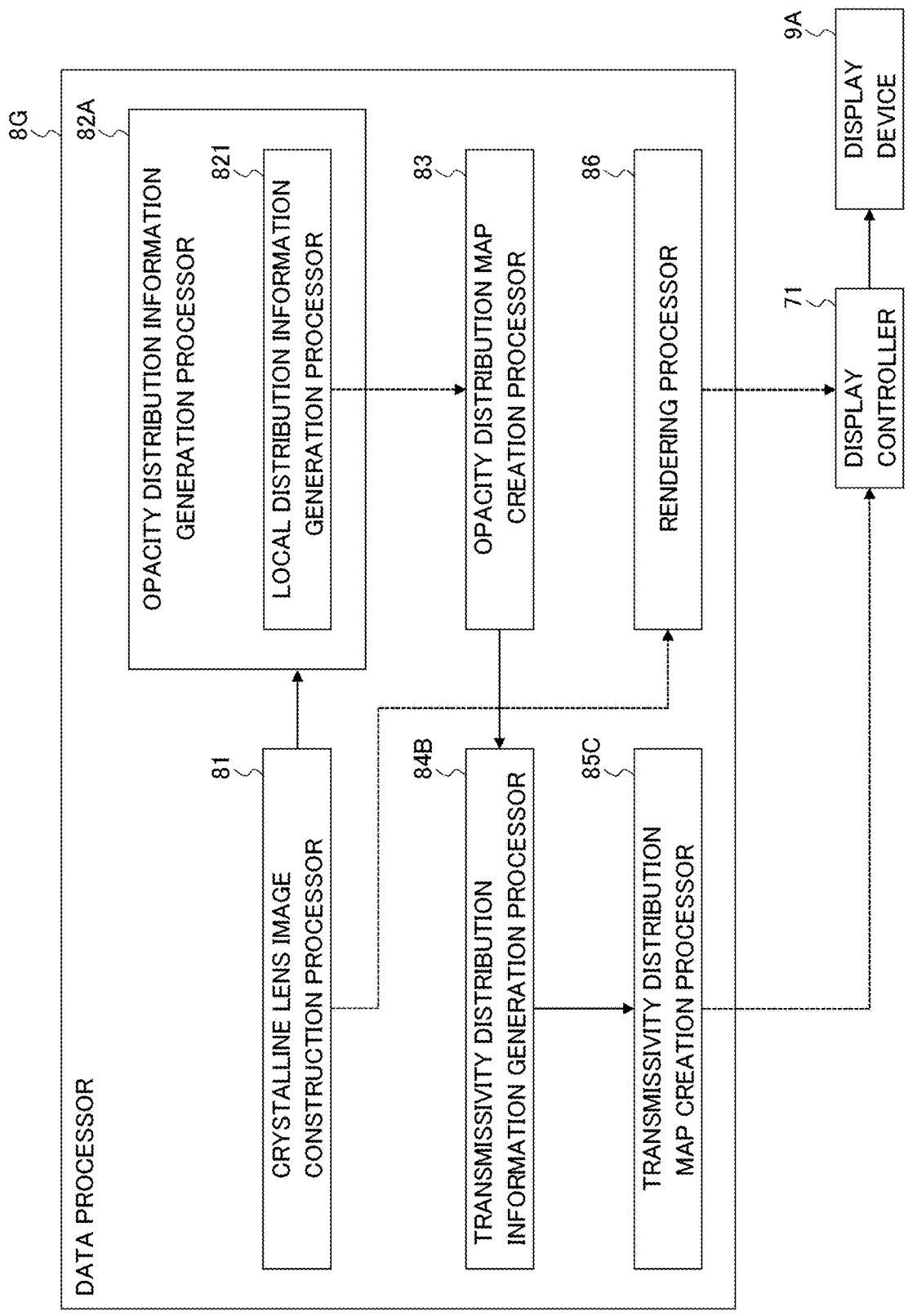
FIG. 9B is a schematic diagram illustrating the configuration of the slit lamp microscope of the aspect example.

The data processor 8G shown in FIG. 9B is a combination of the data processor 8E shown in FIG. 8C and the rendering processor 86. In the data processor 8G of the present example, the transmissivity distribution map creation processor 85C creates, for example, the transmissivity distribution map 300 of FIG. 17, and then the rendering processor 86 constructs an XY projection image of the three dimensional crystalline lens image 100 of FIG. 15.

The display controller 71 displays this XY projection image on the display device 9A, and also displays the transmissivity distribution map 300 on this XY projection image.

Note that since the XY projection image and the transmissivity distribution map 300 (distribution information) are generated from the same three dimensional crystalline lens image 100 (the same plurality of cross sectional images), there is a natural positional correspondence between the XY projection image and the distribution information. Thus, there is no need to apply registration between the XY projection image and the distribution information.

On the other hand, there may also be the case where an XY projection image and distribution information are acquired from mutually different three dimensional crystalline lens images. In some examples, an XY projection image may be constructed from a three dimensional crystalline lens image acquired on the first measurement date, distribution information may be acquired from a three dimensional crystalline lens image acquired on the second measurement date different from the first measurement date, and the XY projection image and the distribution information may be displayed in such a manner that one of the XY projection image and the distribution information is displayed on the other. In the examples like this, registration between the XY projection image and the distribution information can be performed through registration between the two corresponding three dimensional crystalline lens images.

In place of such registration between three dimensional crystalline lens images, an equivalent registration process may be performed. In some examples, any one of the following registration processes may be performed instead of the registration between three dimensional crystalline lens images: registration between two pieces of XY projection images respectively constructed from two pieces of three dimensional crystalline lens images; and registration between two pieces of three dimensional reconstructed images constructed by the reconstruction processor 811 in FIG. 5A. Here, the two pieces of three dimensional reconstructed images are the images before extraction of the two pieces of three dimensional crystalline lens images.

The display methods or techniques described above as examples allow the user not only to observe the morphology (shape, form) and structure of the crystalline lens of the subject's eye E from the XY projection image, but also to observe the state of a distribution of opacity areas and/or the state of a distribution of light transmissivity from the distribution information. In some typical examples, the display methods or techniques described above make it possible not only to present the morphology and structure of the crystalline lens (photographed image) and the functions of the crystalline lens (distribution information) in an easily perceivable manner, but also to present the relationship between the morphology and structure of the crystalline lens (photographed image) and the functions of the crystalline lens (distribution information) in an easily perceivable manner.

Further, as described above, the rendering processor 86 can construct a projection image defined by the XY coordinate system, by applying projection in the Z direction (projection onto the XY plane) to the three dimensional crystalline lens image. The projection in the Z direction includes the integration (addition) of the pixel values of a pixel group aligned along the Z direction, so that a projection image constructed thereby contains information regarding the positions (locations) and the states (conditions) of opacities in the crystalline lens.

The projection image constructed in this way not only represents the two dimensional opacity distribution (distribution in the XY plane) like a transillumination image, but also contains information on the opacity distribution (opacity distribution information) in the depth direction (Z direction, axial direction) inherited from the three dimensional reconstructed image.

The display controller 71 can display the projection image as a two dimensional image (planar image) like a transillumination image. In that case, information about the depth direction cannot be presented as spatial information. Therefore, the depth information of individual opaque areas may be represented by display colors, display densities, display patterns, or like display parameters. For example, in the case of representing depths by colors, information indicating the correspondence between depths and colors (color bar) can be displayed together with a projection image.

The depth information of opaque areas may include information indicating any position of an opaque area such as the position of the most anterior part of an opaque area (the position closest to the cornea), the position of the most posterior part of an opaque area, or the central position of an opaque area. Further, the depth information of opaque areas may include information indicating the size of an opaque area in the depth direction.

When two or more opaque areas are arranged in the depth direction and overlap with each other, the depth information of these opaque areas may be displayed together, or the individual pieces of depth information of these opaque areas may be displayed in a selective manner.

In addition, information indicating the degree of opacity may be displayed. The degree of opacity may include information such as the density of the opacity, the severity of the opacity, and the size of the opacity. Such degrees of opacity may be represented, for example, by display colors, display densities, display patterns, or any other suitable display parameters.

When rendering is applied to the entire crystalline lens image, a part of the rendered image corresponding to the entire crystalline lens image may be extracted and displayed. The process of extracting a part of a rendered image may be performed, for example, in the same manner as the segmentation described above.

Further, rendering may be applied to a part (partial region) of the crystalline lens image. In this case, segmentation may be applied to the crystalline lens image to identify a partial region thereof. In some alternative examples, segmentation may be applied to the three dimensional reconstructed image to identify a partial region of a crystalline lens image.

The data processor 8 of some examples may be configured to identify a partial region of a crystalline lens in the depth direction (Z direction, axial direction) of the subject's eye E (this partial region has a dimension (an extent) in the depth direction), from the crystalline lens image (or from the three dimensional reconstructed image). This partial region may be any of the following regions, for example: a nucleus region; the anterior region of the nucleus; the posterior region of the nucleus; a capsule region; a region shallower than a predetermined depth position; a region deeper than a predetermined depth position; a region located between the first depth position and the second depth position; and other partial regions. The rendering processor 86 may apply rendering to the partial region identified by the data processor 8. This makes it possible to provide a distribution of opaque areas in this partial region. For example, a distribution of opaque areas in a depth range designated by the user can be provided.

The data processor 8 may be configured to identify a partial region of the crystalline lens in a direction perpendicular to the depth direction (Z direction, axial direction) of the subject's eye E (this partial region has a dimension (an extent) in a direction perpendicular to the depth direction), from the crystalline lens image (or the three dimensional reconstructed image). Here, the direction perpendicular to the depth direction is, for example, the X direction, the Y direction, or the XY direction (direction defined by the XY coordinate system). For example, as described above, the data processor 8 may partition the crystalline lens image into a plurality of sectors (segments) at equal angles and then obtain the state or condition of opacity, such as a distribution, amount, ratio, degree, etc., for each of the sectors.

When either one or both of the nucleus region and the capsule region of the crystalline lens is identified by segmentation, the data processor 8 may perform identification of a partial region of the crystalline lens based on the region identified. For example, when the nucleus region of the crystalline lens is identified, the data processor 8 may identify the partial region using the contour of this nucleus region as a reference. More specifically, the partial region may be determined by enlarging or reducing the nucleus region by a predetermined size or dimension. When the capsule region of the crystalline lens is identified, the partial region may be determined in accordance with the shape (curved surface shape) of the capsule region. For example, a partial region having the front surface that is the same or similar curved surface as or to the anterior capsule region may be determined.

Figure 18:
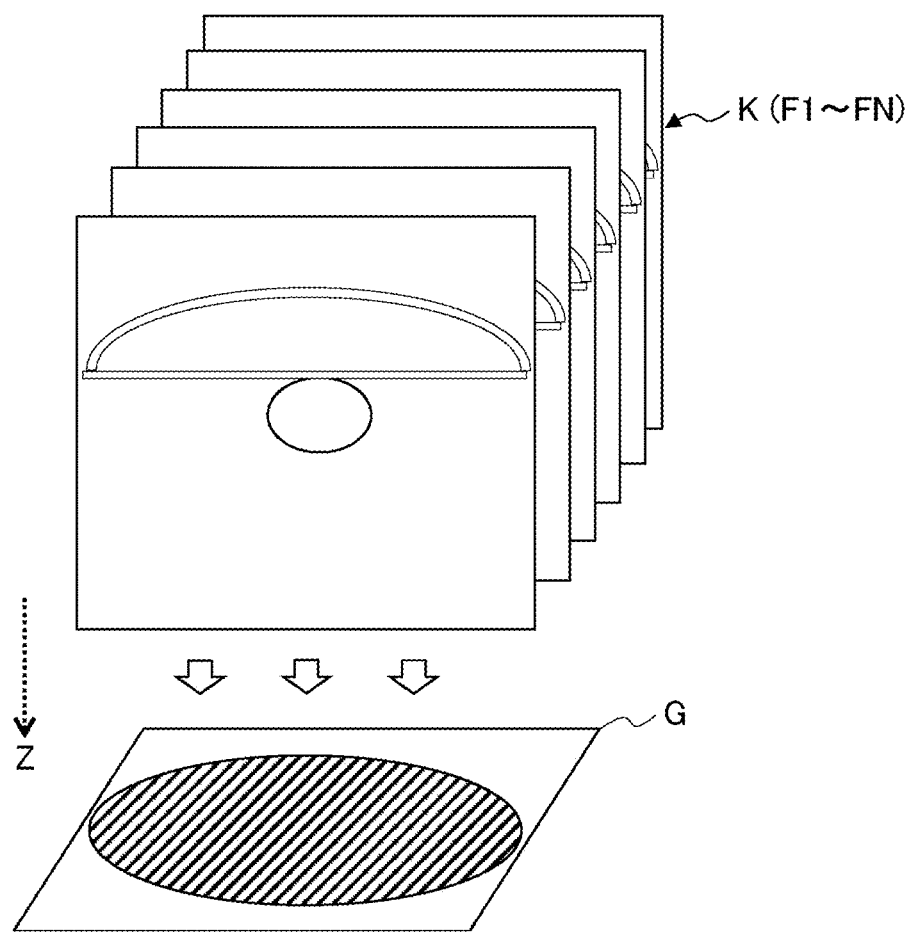
FIG. 18 is a schematic diagram for describing the process performed by the slit lamp microscope of the aspect example.

Some examples of rendering processes that can be performed in the present aspect examples will be described. FIG. 18 shows an example of rendering for constructing a projection image defined on the XY plane. The reference character K denotes a three dimensional reconstructed image (e.g., stack data) constructed from the plurality of anterior segment images F1 to FN shown in FIG. 3. The rendering processor 86 applies projection in the Z direction to this three dimensional reconstructed image K. As a result of this, the rendered image (projection image) G defined on the XY plane perpendicular to the Z direction is constructed.

Figure 19:
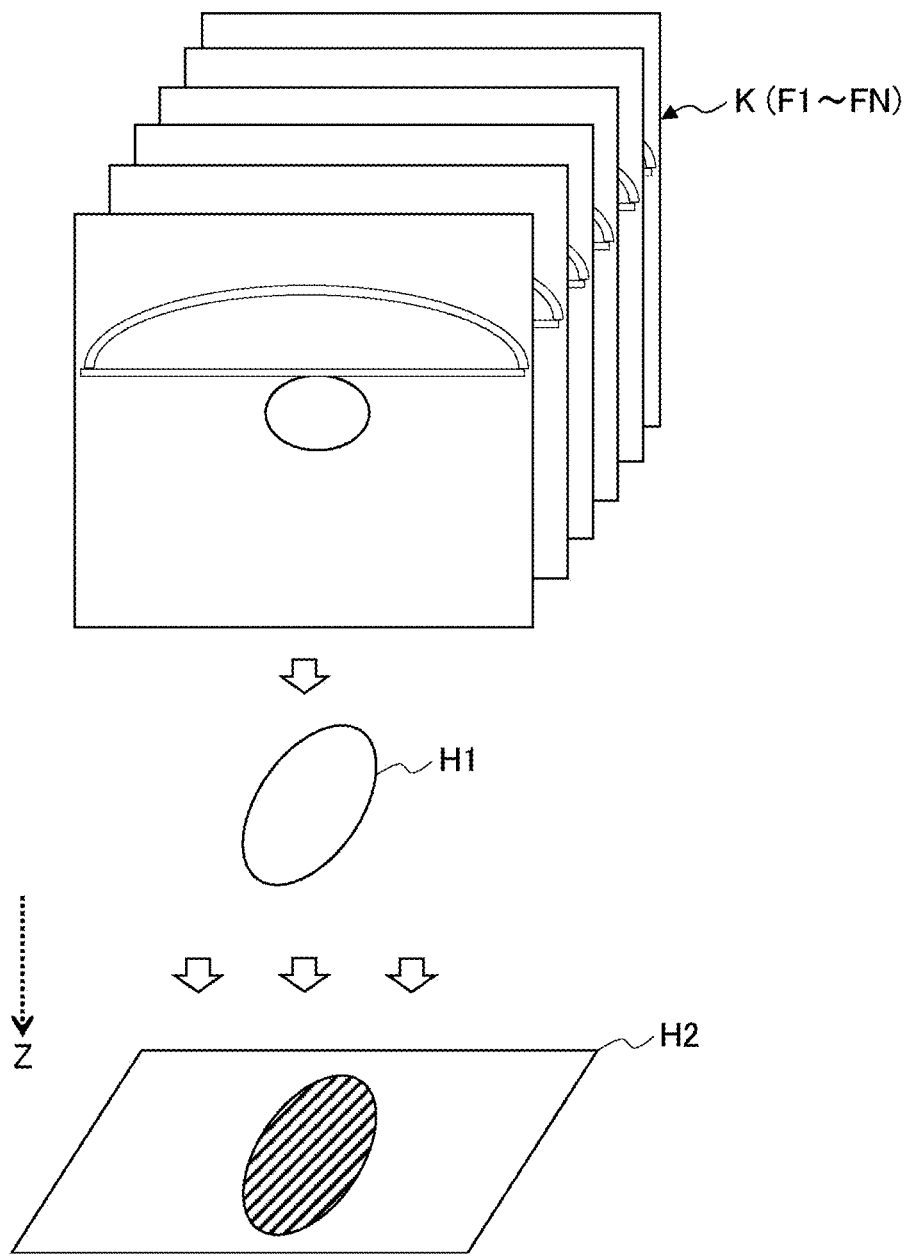
FIG. 19 is a schematic diagram for describing the process performed by the slit lamp microscope of the aspect example.

FIG. 19 shows another example of rendering for constructing a projection image defined on the XY plane. The crystalline lens image construction processor 81 extracts the three dimensional crystalline lens image H1 from the three dimensional reconstructed image K constructed from the plurality of anterior segment images F1 to FN. The rendering processor 86 applies projection in the Z direction to the crystalline lens image H1. As a result of this, the rendered image (projection image) H2 of the crystalline lens image H1 is constructed. This rendered image H2 is defined in the XY plane perpendicular to the Z direction.

The slit lamp microscope 1 of the present aspect example may be configured to obtain a change over time (time dependent change) in the state of opacities of the crystalline lens. Some examples of the configuration of the data processor 8 for that purpose will be described with reference to FIG. 10A and FIG. 10B.

Figure 10A:
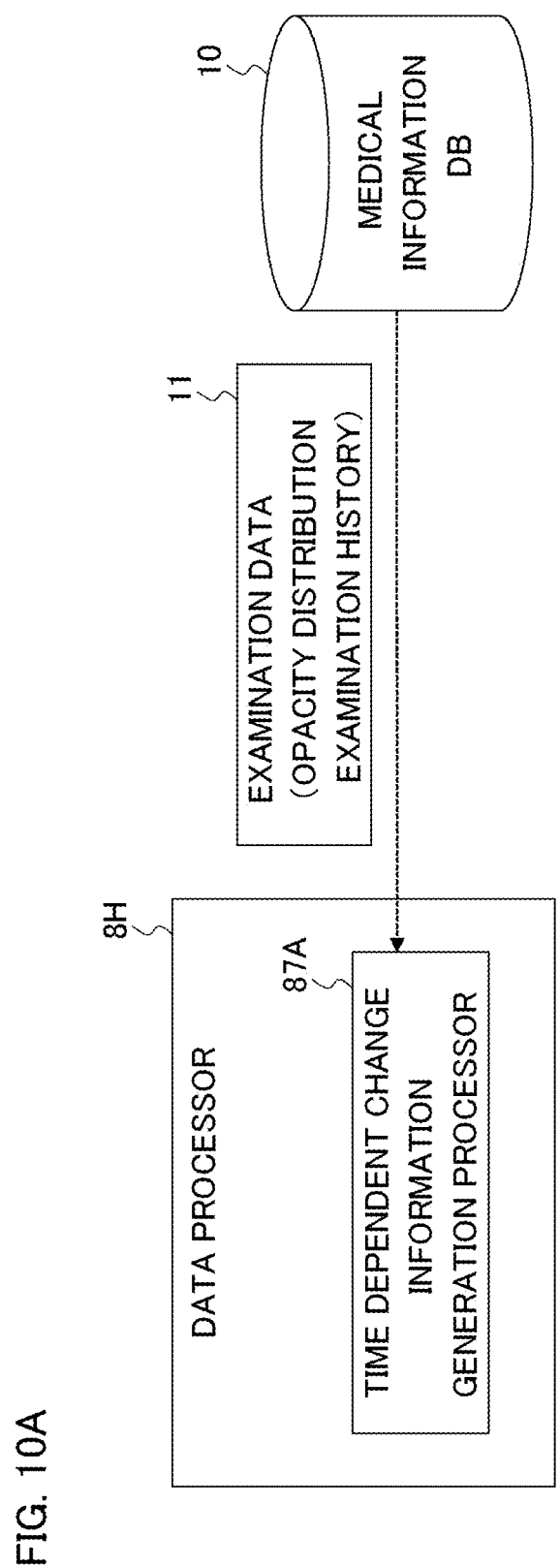
FIG. 10A is a schematic diagram illustrating the configuration of the slit lamp microscope of the aspect example.

The data processor 8H shown in FIG. 10A includes the time dependent change information generation processor 87A. Further, the medical information database 10 is used in the present example. The medical information database 10 stores at least data obtained by a crystalline lens opacity examination performed using the slit lamp microscope 1 and the like. The medical information database 10 is disposed in a hospital information system (HIS) such as an electronic medical record system. The medical information database 10 may be configured as a part of the slit lamp microscope 1, or may be configured as an information system accessible by the slit lamp microscope 1. Instead of the medical information database 10, a recording medium may be used on which data obtained by a crystalline lens opacity examination performed using the slit lamp microscope 1 or the like is recorded.

From such a medical information database 10, the examination data (opacity distribution examination history) 11 is input into the time dependent change information generation processor 87A. Here, the examination data 11 is data obtained by a crystalline lens opacity examination carried out for the subject's eye E in the past. In addition, data acquired in the current examination is also input into the time dependent change information generation processor 87A. As a result, the time dependent change information generation processor 87A receives a plurality of pieces of data regarding the opacity state of the crystalline lens of the subject's eye E. The examination data 11 includes not only the data (numerical value etc.) regarding the opacity state of the crystalline lens of the subject's eye E, but also identification information of the subject, measurement date (photographing date), and the any other suitable information.

The type or kind of data processed by the time dependent change information generation processor 87A may be freely selected. In some examples, the time dependent change information generation processor 87A is configured to process opacity distribution information and/or information acquired based on the opacity distribution information. Examples of the information acquired based on the opacity distribution information include an opacity distribution map, transmissivity distribution information, and a transmissivity distribution map. More generally, the time dependent change information generation processor 87A may be configured to process a plurality of cross sectional images collected by anterior segment scanning with slit light and/or information obtained based on the plurality of cross sectional images.

The time dependent change information generation processor 87A is configured to generate information (time dependent change information) that represents a time dependent change in a distribution of opaque areas of the crystalline lens of the subject's eye E based on a plurality of pieces of opacity distribution information for the subject's eye E (or, based on information obtained from the plurality of pieces of opacity distribution information). The representation method or technique of a time dependent change may be freely selected. Examples of the representation method or technique of a time dependent change include representation by a graph, table, list, video, slide show and any other suitable visualizations. A specific example for generating such time dependent change information will be described below.

Figure 10B:
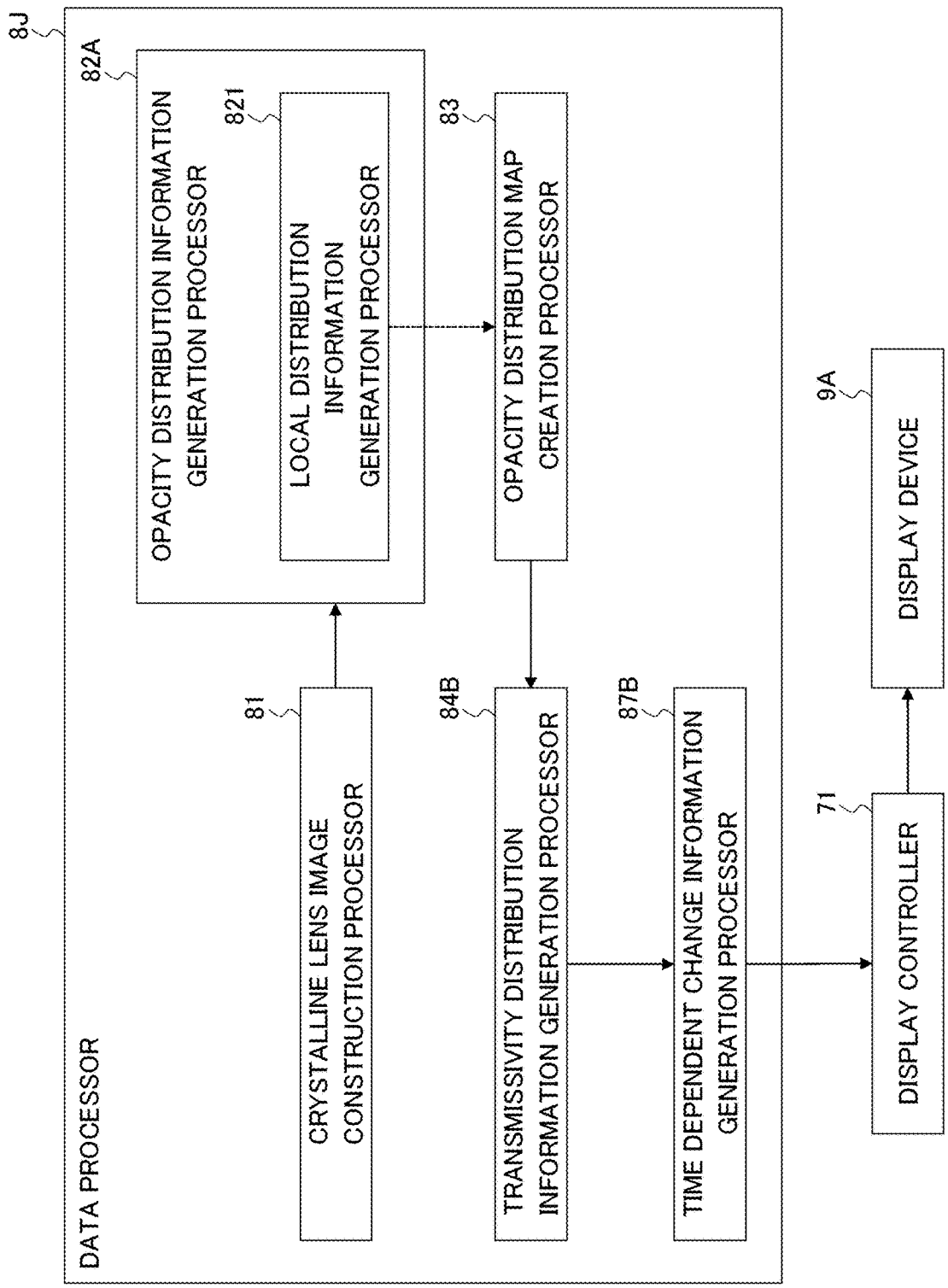
FIG. 10B is a schematic diagram illustrating the configuration of the slit lamp microscope of the aspect example.

The data processor 8J shown in FIG. 10B is a modification of the data processor 8E shown in FIG. 8C, and is provided with the time dependent change information generation processor 87B in place of the transmissivity distribution map creation processor 85C. As described above, a plurality of pieces of data (a plurality of pieces of transmissivity distribution information, a plurality of pieces of information generated based on the plurality of pieces of transmissivity distribution information) respectively acquired on a plurality of measurement dates (a plurality of photographing dates), is input to the time dependent change information generation processor 87B.

The time dependent change information generation processor 87B is configured to generate time dependent change information that represents a time dependent change in a distribution of light transmissivity of the crystalline lens of the subject's eye E based on the plurality of pieces of transmissivity distribution information generated by the transmissivity distribution information generation processor 84B (or, based on the plurality of pieces of information obtained based on the plurality of pieces of transmissivity distribution information). The display controller 71 can display information on the display device 9A based on the time dependent change information generated.

Figure 20:
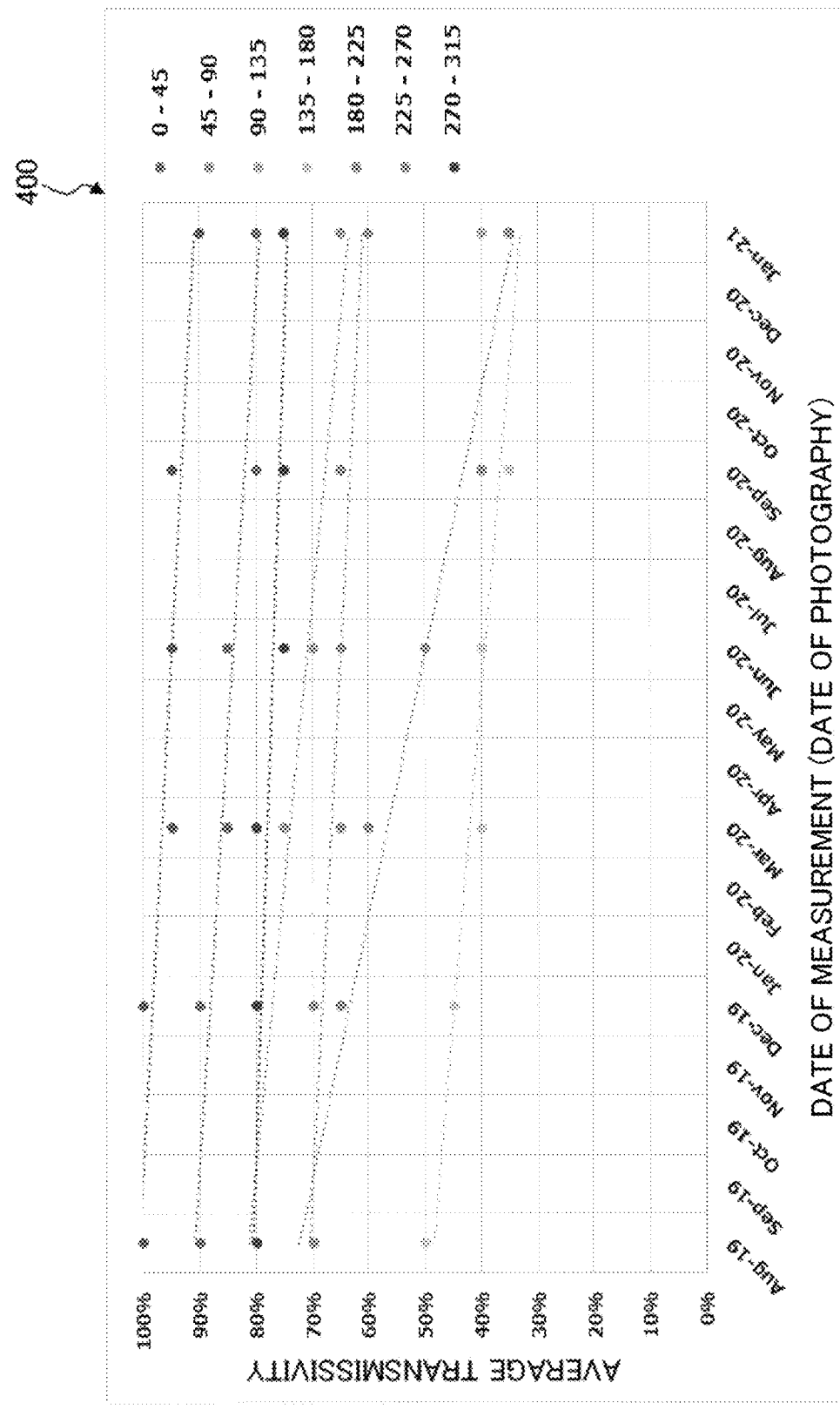
FIG. 20 is a schematic diagram for describing the process performed by the slit lamp microscope of the aspect example.

FIG. 20 shows an example of information displayed based on the time dependent change information generated by the time dependent change information generation processor 87B. The time dependent change information 400 includes graphs created in the same way as the transmissivity distribution map 300 in FIG. 17. These graphs in the time dependent change information 400 is created by plotting the values of transmissivity (average transmissivity values) that are acquired for each of the eight pieces of three dimensional partial regions 101 to 108 in the three dimensional crystalline lens image 100 shown in FIG. 15, for each of the measurement dates (photographing dates). The time dependent change information 400 presents trend a graph of the time dependent change of average transmissivity for each of the three dimensional partial regions 101 to 108.

The time dependent change information 400 is capable of providing, in addition to the distribution of light transmissivity in the crystalline lens of the subject's eye E, the local time dependent change of the light transmissivity, the global time dependent change of the light transmissivity, the trends of changes in the light transmissivity, and/or like information in a manner that the user can easily perceive.

The slit lamp microscope 1 of the present aspect example is configured to perform anterior segment scanning in parallel with movement in the X direction of slit light that illuminates the YZ cross section. Therefore, the incident angle of the slit light on the cornea with a curved surface shape changes with the progress of scanning, and in particular, the magnitude of reflection on the anterior surface of the cornea changes with the movement of scan position. Accordingly, the brightness and color representations of a plurality of anterior segment images collected by the scanning are generally not the same. A three dimensional reconstructed image or a three dimensional crystalline lens image constructed from such a plurality of anterior segment images may end up having inconsistent brightness and/or inconsistent color tones between the scanned cross sections.

In order to address such a problem, the slit lamp microscope 1 of the present aspect example may be configured to apply normalization of a predetermined parameter to a plurality of anterior segment images (the plurality of cross sectional images) collected by scanning. The normalization in the present example is a process for adjusting the plurality of anterior segment images in such a manner that values of a predetermined image parameter of the plurality of anterior segment images become substantially equal.

The normalization of the present aspect example may include a process of calculating a correction value (adjustment value) for making the image parameter values of the plurality of anterior segment images substantially equal, and a process of assigning the calculated correction values to the individual anterior segment images. The normalization of the present aspect example may further include a process of actually changing the image parameter values of the plurality of anterior segment images based on the correction value calculated.

Some examples of the configuration of the data processor 8 for performing such normalization will be described with reference to FIG. 11.

Figure 11:
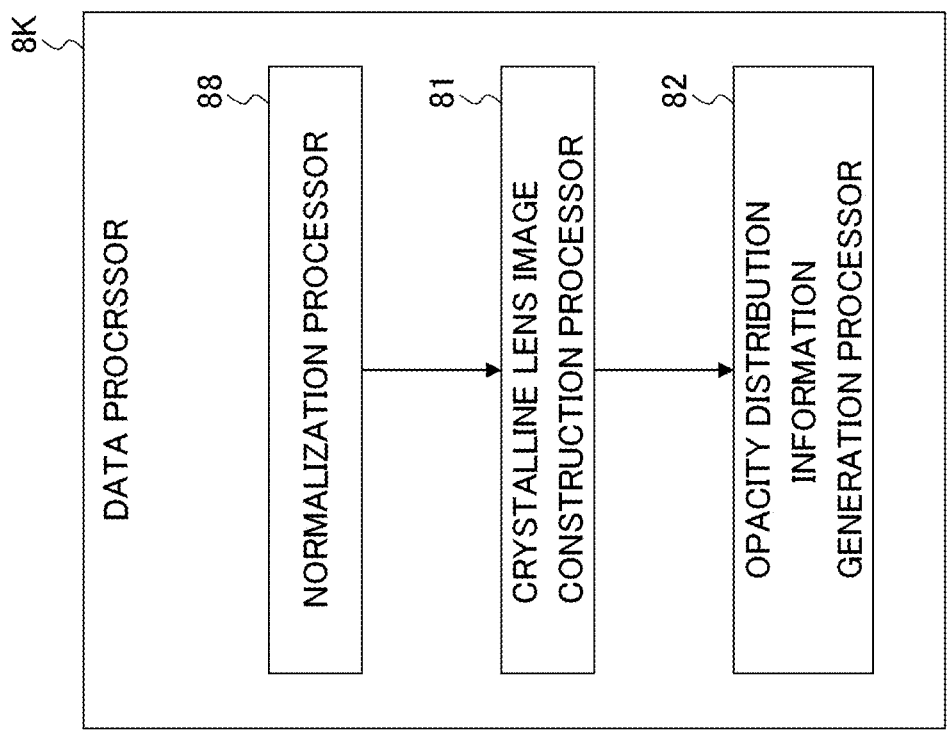
FIG. 11 is a schematic diagram illustrating the configuration of the slit lamp microscope of the aspect example.

The data processor 8K shown in FIG. 11 includes the normalization processor 88. The normalization processor 88 is configured to apply normalization to a plurality of cross sectional images collected by anterior segment scanning using the slit light. In some examples, the normalization processor 88 may be configured to perform either one or both of brightness normalization and color normalization.

The brightness normalization is performed to make the brightness of the plurality of anterior segment images substantially equal. It is considered desirable to perform the brightness normalization using a tissue with a relatively small degree of reflection as a reference. From this point of view, the normalization processor 88 of some examples first identifies an image of the posterior surface of the cornea (an image region corresponding to the posterior surface of the cornea) in each of the plurality of anterior segment images, by applying segmentation to each of the plurality of anterior segment images.

Next, the normalization processor 88 of some examples selects one of the plurality of images of the posterior surface of the cornea respectively identified from the plurality of anterior segment images, set the selected image as a reference image. An indicator or parameter used for selecting a reference image may be freely selected, and for example, any indicator of time series, spatial position, and brightness is employed. In some examples, the normalization processor 88 may select an image of the posterior surface of the cornea of the first acquired anterior segment image among the plurality of anterior segment images, as a reference image (time series indicator). In some other examples, the normalization processor 88 may select an image of the posterior surface of the cornea of the anterior segment image that passes through the corneal apex (the anterior segment image closest to the corneal apex) among the plurality of anterior segment images, as a reference image (spatial position index). Further, in some other examples, the normalization processor 88 may select an image of the posterior surface of the cornea with the largest (or smallest) statistical value (maximum value, minimum value, average value, etc.) of brightness among the plurality of images of the posterior surface of the cornea, as a reference image (brightness index). The method or technique for determining a reference image is not limited to these examples, and may be freely selected. In some examples, the user may perform selection of a reference image. In some examples, a reference value (target value) of brightness may be determined instead of performing selection of a reference image.

Subsequently, the normalization processor 88 calculates a comparison value between the reference image and each of the images of the posterior surface of the cornea other than the reference image, in order to make the brightness of the plurality of images of the posterior surface of the cornea substantially equal. In some examples, this comparison value may be calculated by comparing a representative value of the brightness of the reference image (average value, maximum value, minimum value, etc.) with a representative value of the brightness of the images of the posterior surface of the cornea other than the reference image. In some typical examples, the comparison value may be any one of the following values: a ratio value obtained by dividing the representative value of brightness of an images of the posterior surface of the cornea other than the reference image by the representative value of brightness of the reference image; and a difference value obtained by subtracting the representative value of brightness of the reference image from the representative value of brightness of an image of the posterior surface of the cornea other than the reference image. The comparison value calculated in this way is assigned to a corresponding anterior segment image.

A comparison value assigned to an anterior segment image is used as a correction value for adjusting the brightness of this anterior segment image in such a manner as to equalize the brightness of this anterior segment image with the brightness of a reference anterior segment image. This reference anterior segment image is an anterior segment image including the reference image. In some examples where the correction value is the ratio value mentioned above, the brightness of an anterior segment image can be adjusted to match the brightness of the reference anterior segment image by multiplying the brightness of this anterior segment image by the ratio value. In some other examples where the correction value is the difference value mentioned above, the brightness of an anterior segment image can be adjusted to match the brightness of the reference anterior segment image by adding the difference value to the brightness of this anterior segment image.

Since the slit light of the slit lamp microscope 1 of the present aspect example contains visible light, a plurality of anterior segment images obtained by anterior segment scanning is a plurality of color images. Color normalization is performed for adjusting the colors (e.g., hue, colorfulness, brightness, or any other suitable color parameters) of the plurality of anterior segment images. In some examples, similar to the brightness normalization described above, the normalization processor 88 performs a process of selecting one of the plurality of anterior segment images as a reference anterior segment image, a process of comparing color information of the reference anterior segment image and color information of an anterior segment image other than the reference anterior segment image to find a comparison value, and a process of assigning the comparison value to a corresponding anterior segment image (a process of assigning the comparison value to this anterior segment image other than the reference anterior segment image). Here, the comparison value may be calculated, for example, by comparing anterior segment images adjacent to each other. The series of processes described above makes it possible to implement color normalization between the plurality of anterior segment images.

In the present example, the opacity distribution information is generated using the plurality of anterior segment images normalized in this way. This makes it possible to obtain the opacity distribution information using the plurality of anterior segment images in which the inconsistencies (variations) in brightness and/or colors caused by anterior segment scanning have been corrected. As a result of this, the accuracy, the precision, the reproducibility, and any other suitable quality parameters of examination can be improved.

As described above, the slit lamp microscope 1 of the present aspect example is capable of acquiring images of anterior eye segments and various kinds of information of crystalline lens opacity. The slit lamp microscope 1 may be configured to perform evaluation of cataract using information acquired. Some examples of the configuration of the data processor 8 for performing cataract evaluation will be described with reference to FIG. 12.

Figure 12:
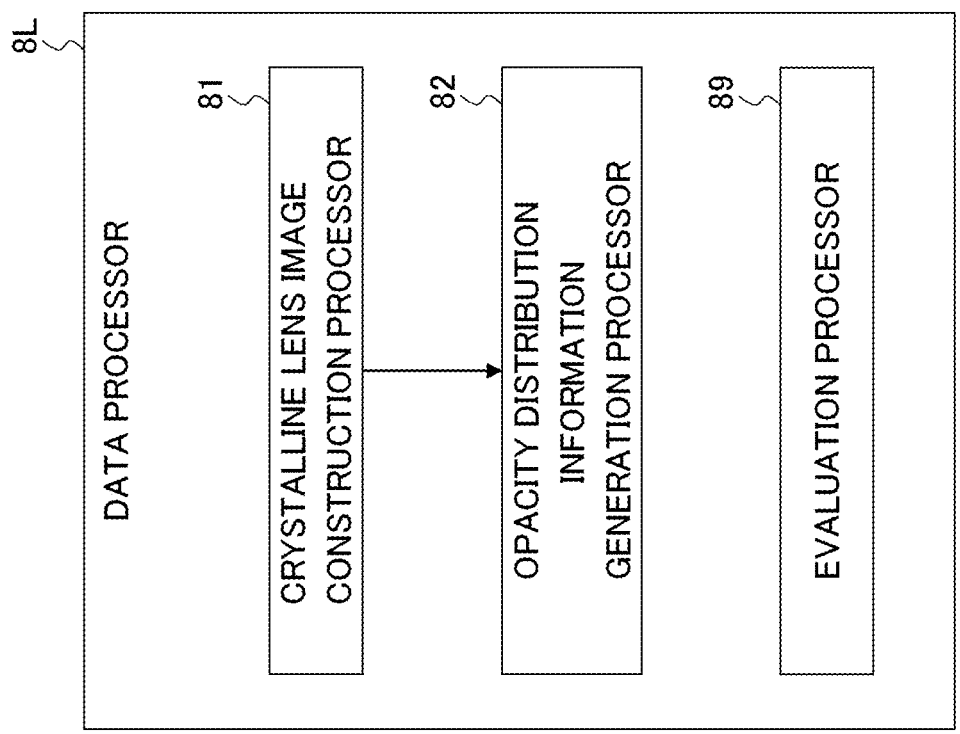
FIG. 12 is a schematic diagram illustrating the configuration of the slit lamp microscope of the aspect example.

The data processor 8L shown in FIG. 12 includes the evaluation processor 89. The evaluation processor 89 may be capable of performing various kinds of evaluations related to cataract; however, evaluation of hardness of crystalline lens nucleus and evaluation of cataract type will be described here.

Information on the hardness of crystalline lens nucleus is used in diagnosis of the degree of progression of nuclear cataract. As mentioned above, since the slit light of the slit lamp microscope 1 of the present aspect example contains visible light, a plurality of anterior segment images obtained by anterior segment scanning is a plurality of color images.

Regarding the relationship between hardness of crystalline lens nucleus and color tones, Emery-Little classification is known. The Emery-Little classification is described, for example, in the following document: Eiichiro Matsui, Hiroyuki Matsushima, Yoshihiro Matsumoto and Tadashi Senoo, "AGING AND EYE DISEASES (KAREI TO GAN-SHIKKAN)", Dokkyo Journal of Medical Sciences, 35 (3): 251-258, 2008. In the Emery-Little classification, the degrees of progression of cataract are divided into five grades, namely the Grades 1 to 5, and hardness of nucleus and color tones are associated with each other for each grade.

The evaluation processor 89 of some examples may be configured to acquire color information of the crystalline lens of the subject's eye E based on a plurality of anterior segment images, a three dimensional reconstructed image, or a three dimensional crystalline lens image, and then identify (select) the grade corresponding to the acquired color information of the crystalline lens from the five grades defined by the Emery-Little classification. More specifically, this evaluation may be performed in the following way.

If the color of the crystalline lens is "transparent or slightly white", the evaluation processor 89 determines the nuclear hardness to be "Soft" (Grade 1). If the color of the crystalline lens is "white or slightly pale yellow", the evaluation processor 89 determines the nuclear hardness to be "Semi soft" (Grade 2). If the color of the crystalline lens is "yellow", the evaluation processor 89 determines the nuclear hardness to be "Medium" (Grade 3). If the color of the crystalline lens is "brownish yellow", the evaluation processor 89 determines the nuclear hardness to be "Hard" (Grade 4). If the color of the crystalline lens is "brown to black", the evaluation processor 89 determines the nuclear hardness to be "Rock hard" (Grade 5).

The evaluation processor 89 may be configured to perform inference of the type of cataract that the subject's eye E is suffering from. In some examples, the evaluation processor 89 may be configured to perform the cataract type inference based on any one or more of opacity distribution information, an opacity distribution map, transmissivity distribution information, and a transmissivity distribution map.

As a specific example, if opacity areas are unevenly distributed in the central region of the crystalline lens, the evaluation processor 89 can infer the type to be nuclear cataract. If opacity areas are widely distributed in the peripheral region of the crystalline lens, or if opacity areas are distributed in a radial shape, the evaluation processor 89 can infer the type to be cortical cataract. If opacity areas are unevenly distributed near the anterior capsule of the crystalline lens, the evaluation processor 89 can infer the type to be anterior subcapsular cataract. Further, if opacity areas are unevenly distributed near the posterior capsule of the crystalline lens, the evaluation processor 89 can infer the type to be posterior subcapsular cataract. In addition, the evaluation processor 89 may be configured to perform evaluation of the degree of progression of cataract based on freely selected known knowledge and findings such as the Emery-Little classification.

The evaluation processor 89 configured in this way is capable of providing information used for cataract diagnosis to a doctor, a diagnosis support computer disposed in a subsequent stage, or the like. In particular, the slit lamp microscope 1 of the present aspect example is capable of performing evaluation based on a three dimensional distribution of opacities, which cannot be obtained from a transillumination image. Therefore, the slit lamp microscope 1 of the present aspect example is capable of providing information of higher quality than information obtained by conventional methods or techniques.

The slit lamp microscope 1 of the present aspect example may be configured to perform simulation of a vision condition of the subject's eye E by using various kinds of information regarding crystalline lens opacity. Some examples of the configuration of the data processor 8 for performing such vision condition simulation will be described with reference to FIG. 13.

Figure 13:
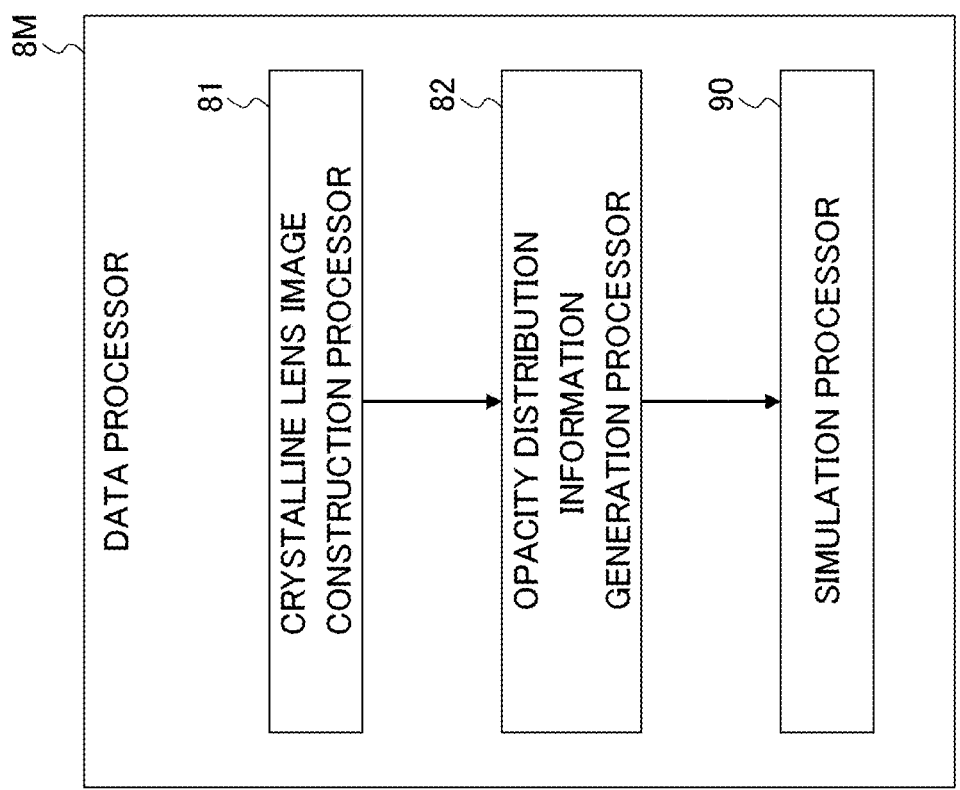
FIG. 13 is a schematic diagram illustrating the configuration of the slit lamp microscope of the aspect example.

The data processor 8M shown in FIG. 13 includes the simulation processor 90. The simulation processor 90 is configured to perform vision condition simulation based on, for example, any one or more of opacity distribution information, an opacity distribution map, transmissivity distribution information, and a transmissivity distribution map.

The vision condition simulation is an operation (calculation) that creates a model by actually performing evaluation of how the subject's eye E visually recognizes an object, based on a distribution (e.g., position, size, density, concentration) of opacity areas in the crystalline lens.

In some examples, the simulation processor 90 first creates a crystalline lens model based on an opacity distribution information. This crystalline lens model includes information on the distribution of the opacity areas in the crystalline lens of the subject's eye E. Further, this crystalline lens model may include information on measurement values that have already been acquired from the subject's eye E. The simulation processor 90 of some example is configured to create a crystalline lens model using measurement values of a parameter such as the anterior surface curvature of the crystalline lens, the posterior curvature of the crystalline lens, or the thickness of the crystalline lens. Any one or more measurement values may be acquired by the measurement processor 91 described later.

Next, the simulation processor 90 of the present example creates an eye model including the crystalline lens model created. This eye model may include information on measurement values that have already been acquired from the subject's eye E. The simulation processor 90 may be configured to create an eye model using, for example, measurement values of a parameter such as the axial length, the corneal curvature, the anterior chamber depth, or the fundus shape (e.g., the retinal curvature). Any one or more measurement value may be acquired by the measurement processor 91 described later.

Subsequently, the simulation processor 90 of the present example perform ray tracing by using this eye model. In this ray tracing, the opacity areas act to attenuate the intensity of a ray of light, to attenuate the intensity of a selected wavelength component of a ray of light, to diffuse a ray of light, or the like. In some examples, the degree of these effects may be set on the basis of the density or concentration of the opacity areas. In this way, a result (image) of vision condition simulation of the subject's eye E for a given object such as a visual target, can be obtained.

The vision condition simulation as described above is considered to be effective in terms of informed consent. For example, a simulation result may be presented for the purpose of explaining the current state or condition of the subject's eye E, for the purpose of explaining the change in the visibility state caused by cataract surgery, or for any other purposes.

The slit lamp microscope 1 of the present aspect example may be configured to perform measurement of predetermined one or more anterior segment parameters based on a plurality of cross sectional images collected by anterior segment scanning using the slit light. The anterior segment parameters to be measured may include any one or more of the following parameters: corneal thickness (distribution thereof); anterior surface curvature of the cornea (distribution thereof); posterior surface curvature of the cornea (distribution thereof); anterior chamber depth (distribution thereof); crystalline lens thickness (distribution thereof); anterior surface curvature of the crystalline lens (distribution thereof); posterior surface curvature of the crystalline lens (distribution thereof); crystalline lens diameter (distribution thereof); crystalline lens tilt angle; and a positional difference (shift) between the corneal center and the crystalline lens center. Some examples of the configuration of the data processor 8 for performing such anterior segment parameter measurement will be described with reference to FIG. 14.

Figure 14:
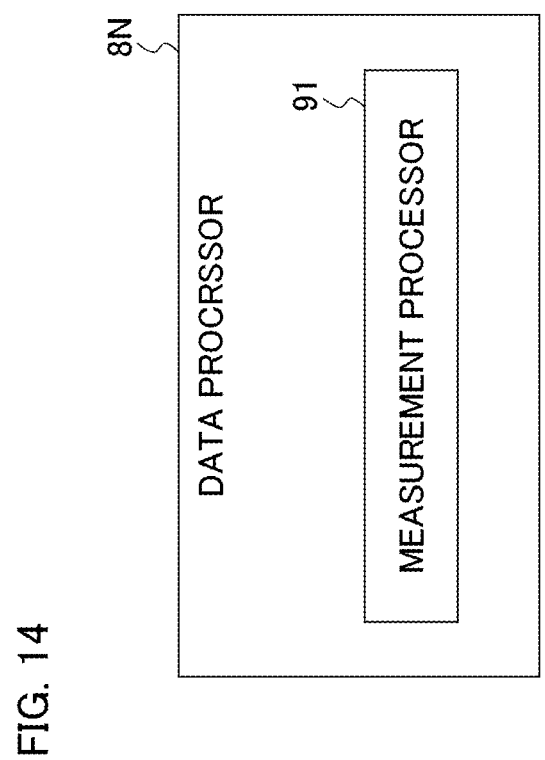
FIG. 14 is a schematic diagram illustrating the configuration of the slit lamp microscope of the aspect example.

The data processor 8N shown in FIG. 14 includes the measurement processor 91. The measurement processor 91 of some examples is configured to perform measurement of a predetermined anterior segment parameter based on a plurality of cross sectional images, a three dimensional reconstructed image, or a three dimensional crystalline lens image.

Like a conventional method or technique, the measurement of an anterior segment parameter includes a process of identifying a site (tissue) to be measured and a process of executing measurement based on the site identified. Some examples of the measurement of an anterior segment parameter will be described. The measurement of the corneal thickness includes the identification of an anterior surface image of the cornea, the identification of a posterior surface image of the cornea, and the measurement of a distance between the anterior surface image of the cornea and the posterior surface image of the cornea. The measurement of the crystalline lens thickness may be carried out in the same way. The measurement of the anterior surface curvature of the cornea includes the identification of an anterior surface image of the cornea and the measurement of the curvature of the anterior surface image of the cornea identified. Any of the measurement of the posterior surface curvature of the cornea, the measurement of the anterior surface curvature of the crystalline lens, or the measurement of the posterior surface curvature of the crystalline lens may be performed in the same manner. The measurement of the anterior chamber depth includes the identification of a posterior surface image of the cornea, the identification of an anterior surface image of the crystalline lens, and the measurement of a distance between the posterior surface image of the cornea and the anterior surface image of the crystalline lens. The measurement of the crystalline lens diameter includes the following processes: the identification of an image of the anterior capsule and an image of the posterior capsule in the crystalline lens image behind the pupil (described above); the estimation (extrapolation) of the entire shape of the anterior capsule based on the image of the anterior capsule; the estimation (extrapolation) of the entire shape of the posterior capsule based on the image of the posterior capsule; the identification of the edge of the crystalline lens (intersection of the anterior capsule and the posterior capsule) based on the estimated shape of the anterior capsule and the estimated shape of the posterior capsule; and the measurement of a diameter of the edge of the crystalline lens. The measurement of the crystalline lens tilt angle includes the following processes: the identification of an image of the anterior capsule and an image of the posterior capsule in the crystalline lens image behind the pupil; the identification of the center of the anterior capsule based on the image of the anterior capsule; the identification of the center of the posterior capsule based on the image of the posterior capsule; the identification of the straight line connecting the center of the anterior capsule and the center of the posterior capsule; and the measurement of the angle of this straight line with respect to a reference direction. The measurement of a positional difference between the corneal center and the crystalline lens center includes the following processes: the identification of a corneal center (the center of the anterior surface of the cornea or the center of the posterior surface of the cornea); the identification of a crystalline lens center (the center of the anterior surface of the crystalline lens, the center of the posterior surface of the crystalline lens, or the center of the crystalline lens); and the measurement of a positional difference in the XY direction (XY shift) between the corneal center and the crystalline lens center.

According to the anterior segment parameter measurement described above, the anterior segment parameters can be measured based on a group of cross sectional images of high quality collected by the anterior segment scanning using the slit light.

<Output Unit 9>

The output unit 9 outputs information from the slit lamp microscope 1. In some typical examples, the output unit 9 includes either one or both of a communication device and a display device. The communication device performs data communication between the slit lamp microscope 1 and other apparatuses. The display device (the display device 9A) displays information. The output unit 9 may include a recording device (e.g., data writer, drive device) for writing (recording) information on a recording medium, a printer for recording (printing) information on a printing medium, or like devices.

The communication device included in the output unit 9 performs data communication between the slit lamp microscope 1 and another apparatus. In other words, the communication device performs transmission of data to another apparatus and reception of data transmitted from another apparatus. The system or method of the data communication executed by the communication device may be selected accordingly. For example, the communication device may include any one or more of various kinds of communication interfaces such as a communication interface conforming to the Internet, a communication interface conforming to a dedicated line, a communication interface conforming to a local area network (LAN), and a communication interface conforming to near field communication. The data communication may include either one or both of wireless communication and wired communication. Data sent and received by the communication device may be encrypted. If this is the case, for example, either one or both of the controller 7 and the data processor 8 include(s) either one or both of an encryptor and a decryptor. The encryptor is configured to encrypt data to be sent by the communication device. The decryptor is configured to decrypt data having been received by the communication device.

The display device 9A included in the output unit 9 is configured to display various kinds of information under the control of the controller 7 (the display controller 71). The display device 9A may include a flat panel display such as a liquid crystal display (LCD). Note that the display device 9A may be a peripheral device of the slit lamp microscope 1.

<Other Elements>

In addition to the elements shown in FIG. 1, the slit lamp microscope 1 may further include an operation device. In some other aspect examples, an operation device may be a peripheral device of the slit lamp microscope 1. The operation device includes a device for operating the slit lamp microscope 1 and/or a device for inputting information. The operation device includes, for example, a button, a switch, a lever, a dial, a handle, a knob, a mouse, a keyboard, a trackball, an operation panel, or the like. A device such as a touch screen may be employed in which a display device and an operation device are integrated (combined). The subject (patient) or an assistant may operate the slit lamp microscope 1 by using the display device and the operation device.

<Alignment>

A description will be given of the alignment of the slit lamp microscope 1 with respect to the subject's eye E. Alignment, in general, is an operation to place an optical system of an apparatus at an appropriate position for photography or measurement of the subject's eye E. The alignment of the present aspect example is an operation to place the illumination system 2 and the photography system 3 at appropriate positions for acquisition of a moving image (a plurality of anterior segment images) as shown in FIG. 3.

There are various kinds of techniques for alignment of an ophthalmic apparatus. While some alignment techniques will be described below, alignment techniques applicable to the present aspect example are not limited to them.

One of the alignment techniques applicable to the present aspect example is stereo alignment. Stereo alignment may be applicable to an ophthalmic apparatus capable of photographing an anterior segment from two or more mutually different directions (two or more mutually different viewpoints). A specific method of stereo alignment is disclosed by the present applicant in Japanese Unexamined Patent Application Publication No. 2013-248376. Stereo alignment includes, for example, the following steps: a step of photographing the anterior segment from different directions by two or more anterior segment cameras to acquire two or more photographed images; a step of analyzing the photographed images by a processor to determine a three dimensional position of the subject's eye; and a step of performing movement control of an optical system by a processor based on the three dimensional position determined. With such an alignment operation, the optical system (the illumination system 2 and the photography system 3 in the present example) is brought to and placed at an appropriate alignment position with respect to the subject's eye. The position of the pupil (e.g., the center of the pupil or the center of gravity of the pupil) of the subject's eye is used as a reference (or an indicator) in a typical stereo alignment.

In addition to the stereo alignment described hereinbefore, any known alignment techniques may be employed, such as an alignment technique using a Purkinje image formed by alignment light, an alignment technique using an optical lever, or an alignment technique using an alignment indicator. The alignment technique using a Purkinje image and the alignment technique using an optical lever or an alignment indicator uses the position of the corneal apex of the subject's eye as a reference.

Conventional and typical alignment techniques including the above examples are performed for the purpose of matching the optical axis of an optical system with the axis of a subject's eye. On the other hand, the present aspect example may perform alignment so as to place the illumination system 2 and the photography system 3 at a position corresponding to the scan start position.

The first example of the alignment of the present aspect example may be carried out in the following manner. First, alignment by referring to the pupil or corneal apex of the subject's eye E may be performed by applying any of the alignment techniques described above. Then, the illumination system 2 and the photography system 3 may be moved (in the X direction) by a distance corresponding to a standard value of the corneal radius determined in advance. Note that a measurement value of the corneal radius of the subject's eye E may be used instead of the standard value.

The second example of the alignment of the present aspect example may be carried out in the following manner. First, alignment by referring to the pupil or corneal apex of the subject's eye E may be performed by applying any of the alignment techniques described above. Second, the corneal radius of the subject's eye E may be measured by analyzing an image of anterior segment. Third, the illumination system 2 and the photography system 3 may be moved (in the X direction) by a distance corresponding to the measurement value of the corneal radius of the subject's eye E. The image of the anterior segment analyzed in the present example is an anterior segment image obtained by the photography system 3 or another image, for example. This another image here may be an image of any kind, such as an image obtained by an anterior segment camera, an image obtained by an anterior segment OCT, or the like.

The third example of the alignment of the present aspect example may be carried out in the following manner. First, the first edge position of the cornea may be determined by analyzing an image of the anterior segment acquired by the anterior segment camera for stereo alignment or by the photography system 3. Then, the illumination system 2 and the photography system 3 may be moved to a position corresponding to the first edge position by applying stereo alignment.

It should be noted that alignment may be performed by referring to the pupil or corneal apex of the subject's eye E by applying any of the alignment techniques described above, and then the anterior segment scan with slit light may be started from the position determined by the alignment. In such a case as well, a scan sequence may be determined to scan the entire cornea C. For example, the scan sequence may be determined in such a manner that the scan is performed to the left from the position determined by the alignment and then to the right.

<Some Additional Matters and Items>

The slit lamp microscope 1 may be provided with a fixation system configured to output light for fixation of the subject's eye E. This light for fixation is referred to as fixation light. The fixation system of some typical examples includes at least one visible light source or a display device configured to display an image such as a landscape chart or a fixation target. This visible light source is referred to as fixation light source. The fixation system of some example aspects is arranged coaxially or non-coaxially with the illumination system 2 or the photography system 3. The fixation system may include an internal fixation system and/or an external fixation system. The internal fixation system is configured to present a fixation target to the subject through the optical path of an optical system of an apparatus. The external fixation system is configured to present a fixation target to the subject from outside the optical path of an optical system of an apparatus.

The types (kinds) of images that may be acquired by the slit lamp microscope 1 are not limited to the moving image of the anterior segment (that is, the plurality of anterior segment images) described above. For example, the slit lamp microscope 1 may acquire any of the following types of images: a three dimensional image constructed based on the moving image; a rendered image constructed based on the three dimensional image; a transillumination image; a moving image representing movement of a contact lens applied to the subject's eye; and an image representing a gap between a contact lens and the corneal surface by fluorescent agent administration. The slit lamp microscope 1 of some examples may be capable of carrying out fundus photography, corneal endothelial cell photography, Meibomian gland photography, or other modalities. In the case where the slit lamp microscope 1 is capable of acquiring a transillumination image, the slit lamp microscope 1 may perform any of the following processes, for example: a process of displaying the above-mentioned rendered image and the transillumination image; a process of executing image synthesis (image composition) of the rendered image and the transillumination image; a process of applying image processing to one of the rendered image and the transillumination image based on the other; and a process of analyzing one of the rendered image and the transillumination image based on the other.

<Operation>

Figure 21:
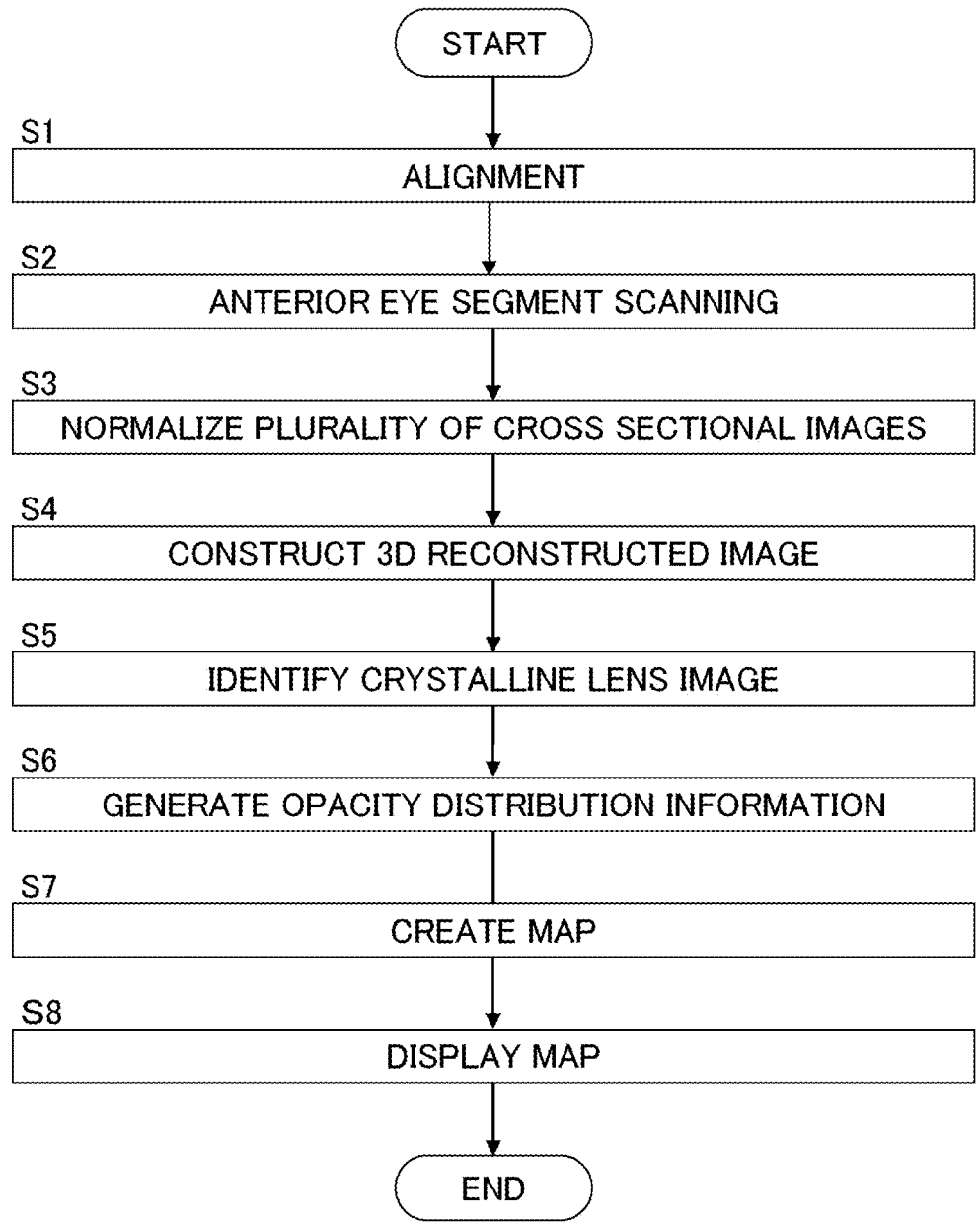
FIG. 21 is a flowchart illustrating the operation of the slit lamp microscope of the aspect example.

A description will be given of an operation of the slit lamp microscope 1. FIG. 21 shows an example of the operation.

While not shown in the drawings, the user (a subject, an examiner, or an assistant) inputs subject information into the slit lamp microscope 1 at any stage. The subject information that has been input is stored in the controller 7. The subject information of some typical examples includes identification information of the subject (referred to as subject ID).

Furthermore, background information may also be input. The background information is any kind of information related to the subject, and examples thereof include information acquired by a medical interview of the subject, information on a sheet filled in by the subject, information recorded in the electronic medical record of the subject, and the like. In some typical examples, the background information includes the subject's data on items such as gender, age, height, weight, disease name, possible disease name, examination result (e.g., visual acuity value, eye refractive power value, intraocular pressure value), history of a wearing device for refractive correction (e.g., history of wearing glasses, contact lenses) and the power of the device, examination history, and treatment history. These are merely examples, and possible items of the background information are not limited to these examples.

Further, in preparation for photography, the table on which the slit lamp microscope 1 is placed, the chair on which the subject sits, and the chin rest of the slit lamp microscope 1 are adjusted (all not shown in the drawings). For example, the heights of the table, chair, and chin rest are adjusted. The chin rest is provided with a chin rest member and a forehead rest member for stably positioning the face of the subject.

After the completion of the preparation, the subject sits on the chair, puts his/her chin on the chin rest member, and puts his/her forehead on the forehead rest member. Before or after these actions, the user performs an operation of issuing an instruction to start photography of the subject's eye. This operation may be conducted, for example, by pressing a photography start trigger button (not shown in the drawings) or inputting a voice instruction. Alternatively, the controller 7 may detect the completion of the preparation phase and automatically shift to the photography phase. In addition, a fixation target (not shown in the drawings) may be presented to the subject (the subject's eye E or the fellow eye thereof).

(S1: Alignment)

Upon commencing photography, the slit lamp microscope 1 performs alignment of the illumination system 2 and the photography system 3 with respect to the subject's eye E. Unlike general alignment operations for aligning the optical axis of an optical system with the corneal apex or the center of the pupil of the subject's eye E, the alignment in the step S1 is performed to place the illumination system 2 and the photography system 3 at a start position of the anterior segment scan to be performed in the step S2.

The mode (aspect) of the alignment of the step S1 may be freely selected, and may be any of the following modes, for example: stereo alignment; manual or automatic alignment using a Purkinje image; manual or automatic alignment using an optical lever; and manual or automatic alignment using an alignment index (alignment target).

Some aspect examples employ such conventional alignment techniques to perform alignment targeting the corneal apex or the center of the pupil. In addition, the controller 7 moves the illumination system 2 and the photography system 3, which have been moved by the alignment targeting the corneal apex or the center of the pupil, further to the scan start position (the position corresponding to the scan start position).

Some other aspect examples perform alignment targeting the scan start position from the beginning. This alignment may include, for example, a process of identifying the scan start position by analyzing an image of the anterior eye segment, and a process of moving the illumination system 2 and the photography system 3 to a position corresponding to the identified scan start position. Here, the image of the anterior eye segment to be analyzed is, for example, an image captured from the front or an oblique direction, and the scan start position to be identified is, for example, the first edge position of the cornea described above or a position that is a predetermined distance away from the first edge position in the direction opposite to the axis of the subject's eye E.

A predetermined operation may be performed any of before, during, and after alignment. Examples of this operation include adjustment of illumination light amount (adjustment of the intensity of slit light), adjustment of the slit (adjustment of the width of the slit, adjustment of the length of the slit, adjustment of the orientation of the slit, etc.), adjustment of the image sensor 5 (sensitivity adjustment, gain adjustment, etc.), focus adjustment, or the like.

(S2: Anterior Eye Segment Scanning)

The slit lamp microscope 1 applies scanning to the anterior segment of the subject's eye E by combining the projection of the slit light performed by the illumination system 2, the moving image photography performed by the photography system 3, and the movement of the illumination system 2 and the photography system 3 performed by the movement mechanism 6 in the manner described above.

Figure 22:
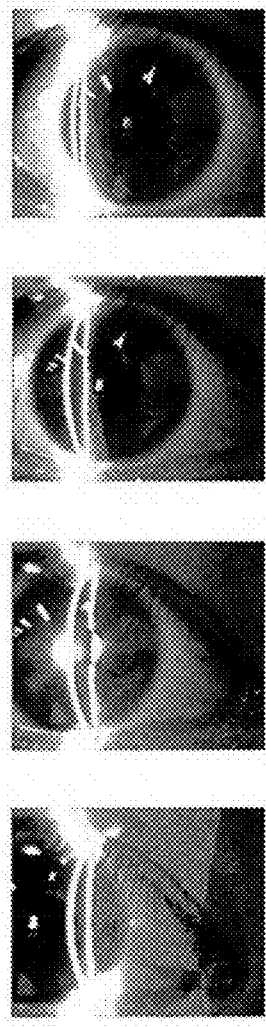
FIG. 22 is a diagram for describing the operation of the slit lamp microscope of the aspect example.

FIG. 22 shows several images, which represent an aspect of actually-performed anterior segment scanning, obtained by means of continuous photographing from the front. A person having ordinary skill in the art should understand, from these images, the aspect or state of the movement of the slit light being projected onto the anterior segment.

As a result of a single scan (that is, a scan from the scan start position to the scan end position), the image group (the plurality of anterior segment images) F1 to FN shown in FIG. 3 is obtained, for example.

The data processor 8 may be configured to perform predetermined processing on an image obtained by the scan application. For example, freely selected signal processing and/or freely selected image processing may be applied to an image obtained by the scan application, such as noise elimination, contrast adjustment, brightness adjustment, and color correction.

(S3: Normalize Plurality of Cross Sectional Images)

The normalization processor 88 applies normalization to the plurality of cross sectional images (e.g., the plurality of anterior segment images F1 to FN) collected in the step S2. As a result of the normalization, the brightness and/or the colors of the plurality of cross sectional images are/is adjusted.

(S4: Construct Three Dimensional Reconstructed Image)

The reconstruction processor 811 applies three dimensional reconstruction to the plurality of anterior segment images to which the normalization has been applied in the step S3. This yields a three dimensional reconstructed image.

(S5: Identify Crystalline Lens Image)

The segmentation processor 812 applies segmentation to the three dimensional reconstructed image constructed in the step S4, thereby identifying a crystalline lens image.

Note that the segmentation processor 812 may apply further segmentation to the crystalline lens image, thereby identifying an image region corresponding to a predetermined partial region of the crystalline lens.

(S6: Generate Opacity Distribution Information)

The crystalline lens image identified in the step S5 is a three dimensional image defined by the XYZ coordinate system. The opacity distribution information generation processor 82 analyzes this three dimensional crystalline lens image to generate opacity distribution information that represents a distribution of the opacity areas in the crystalline lens of the subject's eye E.

(S7: Create Map)

The data processor 8 creates a map related to crystalline lens opacity based on the opacity distribution information generated in the step S6. In some examples, the data processor 8 may create an opacity distribution map by the opacity distribution map creation processor 83, and may create a transmissivity distribution map by the transmissivity distribution map creation processor 85A (85B, 85C).

Further, the data processor 8 may execute the following processes: a process of constructing a rendered image executed by the rendering processor 86; a process of generating time dependent change information executed by the time dependent change information generation processor 87A (87B); a process of performing evaluation of a predetermined cataract indicator (a predetermined cataract parameter, a predetermined cataract score) executed by the evaluation processor 89; a process of performing vision condition simulation executed by the simulation processor 90; and a process of performing measurement of a predetermined anterior segment parameter executed by the measurement processor 91.

(S8: Display Map)

The controller 7 (the display controller 71) displays the map created in the step S7 and other freely selected information on the display device 9A of the output unit 9.

The controller 7 may control the communication device of the output unit 9 to transmit information to another apparatus. Examples of an apparatus to which information is transmitted include an information processing apparatus and a data storage. The information processing apparatus is, for example, a server on a wide area network, a server on a LAN, a computer terminal, or the like. The data storage may be a storage device disposed on a wide area network, a data storage disposed on a LAN, or any other suitable devices.

Examples of the information displayed and/or transmitted may include the background information described above. In some alternative examples, the background information may be supplementary information attached to an image. In general, the data structure of the information displayed and/or transmitted may be selected accordingly.

In some typical examples, the information displayed and/or transmitted may include information on the right eye of the subject and information on the left eye of the subject. The information on the right eye and the information on the left eye can be obtained by applying the operations performed by the present example to the right eye and the left eye, respectively. Identification information (identifier) is attached to each of the information on the right eye and the information on the left eye. The information on the right eye and the information on the left eye can be distinguished from each other by referring to the attached identification information.

Identification information of the subject is transmitted together with the information acquired by the slit lamp microscope 1. The identification information may be the subject ID input to the slit lamp microscope 1, or identification information generated based on the subject ID. For example, the subject ID used for personal identification in the facility where the slit lamp microscope 1 is disposed (referred to as internal identification information) may be converted into external identification information used outside the facility. Such identification information conversion makes it possible to improve the information security of personal information such as images and background information.

This ends the description of the operations of the present example.

<Effects>

Some advantageous effects achieved by the slit lamp microscope 1 of the present aspect example will be described.

The slit lamp microscope 1 of the present aspect example includes a scanner (the illumination system 2, the photography system 3, and the movement mechanism 6) and the data processor 8. The scanner is configured to scan the anterior segment of the subject's eye E with slit light, thereby collecting the plurality of cross sectional images F1 to FN.

In place of diaphanoscopy that depicts opaque areas in the crystalline lens as shadows of a light beam reverting from the retina, the slit lamp microscope 1 of the present aspect example is capable of conducting a novel observation technique that depicts opaque areas from a group of cross sectional images obtained by scanning the anterior segment with the slit light. Therefore, the slit lamp microscope 1 of the present aspect example is capable of adjusting the amount of illumination light (and imaging sensitivity). This makes it possible to perform management of the brightness of images and management of their image quality.

Due to such an advantage, it becomes possible to use images obtained by the slit lamp microscope 1 of the present aspect example for quantitative diagnosis. For example, it becomes possible to use the images for objective evaluation of the grade of cataract in addition to subjective evaluation. Further, it becomes possible to apply automatic image analysis using an analysis program and/or machine learning to images obtained by the slit lamp microscope 1 of the present aspect example.

In addition, the slit lamp microscope 1 of the present aspect example can provide a three dimensional distribution of opaque areas of the crystalline lens, unlike diaphanoscopy that can only provide a two dimensional distribution of opaque areas of the crystalline lens.

As a result, the slit lamp microscope 1 of the present aspect example can provide a novel ophthalmic observation technique in which the drawbacks of diaphanoscopy are eliminated.

In the present aspect example, the data processor 8 (8A) may include the crystalline lens image construction processor 81 and the opacity distribution information generation processor 82. The crystalline lens image construction processor 81 is configured to construct a three dimensional crystalline lens image 100 from the plurality of cross sectional images F1 to FN collected by the scanner. The opacity distribution information generation processor 82 is configured to analyze the three dimensional crystalline lens image 100 to generate opacity distribution information.

Here, the crystalline lens image construction processor 81 (81A) may include a first reconstruction processor (the reconstruction processor 811) and a first segmentation processor (the segmentation processor 812). The first reconstruction processor is configured to apply three dimensional reconstruction to the plurality of cross sectional images F1 to FN collected by the scanner. The first segmentation processor is configured to apply segmentation to a three dimensional reconstructed image constructed by the first reconstruction processor to identify the three dimensional crystalline lens image 100.

In some alternative examples, the crystalline lens image construction processor 81 (81B) may include a second segmentation processor (the segmentation processor 813) and a second reconstruction processor (the reconstruction processor 814). The second segmentation processor is configured to apply segmentation to each of the plurality of cross sectional images F1 to FN collected by the scanner, to identify a two dimensional crystalline lens image. The second reconstruction processor is configured to apply three dimensional reconstruction to a plurality of two dimensional crystalline lens images identified from the plurality of cross sectional images F1 to FN by the second segmentation processor, to construct the three dimensional crystalline lens image 100.

The opacity distribution information generation processor 82 (82A) may include the local distribution information generation processor 821. The local distribution information generation processor 821 is configured to generate local distribution information that represents a distribution of an opaque area in a three dimensional partial region for each of the plurality of three dimensional partial regions 101 to 108 in the three dimensional crystalline lens image 100 constructed by the crystalline lens image construction processor 81.

These configurations provide some aspect examples for constructing the three dimensional crystalline lens image 100 from the plurality of cross sectional images F1 to FN collected by the anterior segment scanning using the slit light.

In the present aspect example, the data processor 8 (8B) may further include the opacity distribution map creation processor 83. The opacity distribution map creation processor 83 is configured to create an opacity distribution map based on a plurality of pieces of local distribution information generated by the local distribution information generation processor 821.

Here, the opacity distribution map may be a map that represents the depth positions of opaque areas in each of the plurality of three dimensional partial regions 101 to 108 of the three dimensional crystalline lens image 100. Further, the opacity distribution map may be defined by a two dimensional coordinate system in which a first coordinate axis represents a depth direction (Z direction) and a second coordinate axis represents a direction perpendicular to the depth direction. In addition, the plurality of three dimensional partial regions 101 to 108 may be obtained by applying equal angle division to the three dimensional crystalline lens image 100 in a plane (XY plane) perpendicular to the depth direction (Z direction), and the second coordinate axis (α coordinate axis) may represent an angle direction of the equal angle division.

With such a configuration, it becomes possible to provide useful information for cataract diagnosis such as the opacity distribution map 200 of FIG. 16B.

In the present aspect example, the data processor 8 (8C) may include a first transmissivity distribution information generation processor (the transmissivity distribution information generation processor 84A). The first transmissivity distribution information generation processor is configured to generate transmissivity distribution information that represents a distribution of light transmissivity of the crystalline lens of the subject's eye E based on the plurality of pieces of local distribution information generated by the local distribution information generation processor 821.

Further, the data processor 8 (8C) may include a first transmissivity distribution map creation processor (the transmissivity distribution map creation processor 85A).

The first transmissivity distribution map creation processor is configured to create a transmissivity distribution map based on the transmissivity distribution information generated by the first transmissivity distribution information generation processor.

Is some alternative examples, the data processor 8 (8D) may include a second transmissivity distribution map creation processor (the transmissivity distribution map creation processor 85B). The second transmissivity distribution map creation processor is configured to create a transmissivity distribution map that represents a distribution of light transmissivity of the crystalline lens of the subject's eye E based on the opacity distribution map created by the opacity distribution map creation processor 83.

For example, the data processor 8 (8E) may include a second transmissivity distribution information generation processor (the transmissivity distribution information generation processor 84B). The second transmissivity distribution information generation processor is configured to generate transmissivity distribution information that represents a distribution of light transmissivity of the crystalline lens of the subject's eye E by calculating, for each of the plurality of three dimensional partial regions 101 to 108 of the three dimensional crystalline lens image 100, a quotient of the size (area) of an opaque area in a three dimensional partial region defined by the two dimensional coordinate system over the size (area) of this three dimensional partial region.

Further, the data processor 8 (8E) may include a third transmissivity distribution map creation processor (the transmissivity distribution map creation processor 85C). The third transmissivity distribution map creation processor is configured to create a transmissivity distribution map based on the transmissivity distribution information generated by the second transmissivity distribution information generation processor.

With such a configuration, it becomes possible to provide useful information for cataract diagnosis such as the transmissivity distribution map 300 of FIG. 17.

In the present aspect example, the data processor 8 (8F) may include a rendering processor 86. The rendering processor 86 is configured to apply rendering to a three dimensional image that includes the three dimensional crystalline lens image 100 constructed by the crystalline lens image construction processor 81. More generally, the three dimensional image to which the rendering is applied may be, for example, an entire three dimensional reconstructed image of a plurality of cross sectional images collected by the scanner or a part of this three dimensional reconstructed image. The present aspect example allows the user to observe a desired rendered image of a three dimensional crystalline lens image or other images.

Further, the rendering processor 86 may be configured to apply projection onto a predetermined plane, to the three dimensional image. Here, the predetermined plane may be set so as to be perpendicular to a depth direction (Z direction) of the subject's eye E (XY plane). The present configuration may be used, for example, to construct a planar image (two dimensional image) analogous to a transillumination image.

In addition, the slit lamp microscope 1 of the present aspect example includes a first display controller (the display controller 71). The first display controller is configured to display a rendered image constructed by the rendering processor 86 and information generated based on the opacity distribution information generated by the opacity distribution information generation processor 82 on a first display device (the display device 9A) in such a manner that one of the rendered image and the information generated based on the opacity distribution information is displayed on the other.

Further, the slit lamp microscope 1 of the present aspect example may include a second display controller (the display controller 71). The second display controller is configured to display, when the rendering processor 86 has applied the projection to a three dimensional image, a two dimensional image constructed by the projection and a distribution image generated based on the opacity distribution information on a second display device (the display device 9A) in such a manner that one of the two dimensional image and the distribution image is displayed on the other.

Here, the information displayed together with the rendered image (the projection image) may be any information obtained from the opacity distribution information. For example, this information may include any of the opacity distribution map 200, the transmissivity distribution map 300, a numerical value in regard to opacity distribution, a numerical value in regard to transmissivity, and any other information.

These configurations allow the user to perceive the morphology and the structure of the anterior segment (e.g., crystalline lens) from the rendered image as well as to perceive various kinds of information obtained from the opacity distribution information. In addition, these configurations also allow the user to perceive the positional relationship between the information obtained from the opacity distribution information and the morphology and the structure of the anterior segment.

In the present aspect example, the data processor 8 (8H) may include a first time dependent change information generation processor (the time dependent change information generation processor 87A). The first time dependent change information generation processor is configured to generate first time dependent change information that represents a time dependent change in a distribution of opaque areas of the crystalline lens of the subject's eye E based on a plurality of pieces of opacity distribution information (or information generated based on the plurality of pieces of opacity distribution information) obtained for the anterior segment of the subject's eye E.

Further, in the present aspect example, the data processor 8 (8J) may include a second time dependent change information generation processor (the time dependent change information generation processor 87B). The second time dependent change information generation processor is configured to generate second time dependent change information that represents a time dependent change in a distribution of light transmissivity of the crystalline lens of the subject's eye E based on the transmissivity distribution information of the crystalline lens of the subject's eye E.

Furthermore, the slit lamp microscope 1 of the present aspect example may include a third display controller (the display controller 71). The third display controller is configured to display, on a third display device (the display device 9A), a graph (the time dependent change information 400) that represents a time dependent change in light transmissivity of each of the plurality of three dimensional partial regions 101 to 108 of the three dimensional crystalline lens image 100 (time dependent changes in light transmissivity for the individual three dimensional partial regions 101 to 108 of the three dimensional crystalline lens image 100) based on the second time dependent change information.

With the configuration capable of generating information that represents a time dependent change of the crystalline lens as described above, it becomes possible to provide useful information for evaluating the progression (stage, grade) of cataract such as the time dependent change information 400 in FIG. 20.

In the present aspect example, the data processor 8 (8K) may include the normalization processor 88. The normalization processor 88 is configured to apply normalization to the plurality of cross sectional images F1 to FN collected by the scanner. Further, the data processor 8 (8K) may be configured to perform generation of the opacity distribution information based on the plurality of cross sectional images F1 to FN to which the normalization has been applied.

Such a configuration is capable of eliminating or reducing errors (inconsistencies, variations) that occur in the plurality of cross sectional images F1 to FN caused by the anterior segment scanning using the slit light. Therefore, it becomes possible to generate opacity distribution information of high quality.

Here, the normalization processor 88 may be configured to apply brightness normalization to the plurality of cross sectional images F1 to FN. In this case, the normalization processor 88 may further be configured to apply the brightness normalization to the plurality of cross sectional images F1 to FN based on brightness of an image corresponding to a posterior surface of a cornea of the anterior segment of the subject's eye E. The normalization processor 88 with this configuration makes it possible to generate opacity distribution information of high quality based on the plurality of cross sectional images F1 to FN whose brightness has been normalized.

In some aspect examples in which the slit light contains visible light, the normalization processor 88 may be configured to apply color normalization to the plurality of cross sectional images F1 to FN. The normalization processor 88 with this configuration makes it possible to generate opacity distribution information of high quality based on the plurality of cross sectional images F1 to FN whose colors have been normalized.

In the present aspect example, the data processor 8 (8L) may include the evaluation processor 89. The evaluation processor 89 is configured to perform evaluation of a predetermined cataract indicator (a predetermined cataract parameter, a predetermined cataract score) based on either one or both of the opacity distribution information (or information generated based on the opacity distribution information) and the plurality of cross sectional images F1 to FN.

For example, in the case where the slit light contains white light, the evaluation processor 89 may be configured to perform evaluation of hardness of a crystalline lens nucleus based on color information of the plurality of cross sectional images F1 to FN. This evaluation may be performed on the basis of any suitable known knowledge and findings such as the Emery-Little classification, for example.

Further, the evaluation processor 89 may be configured to perform cataract type inference based on the opacity distribution information (or information generated based on the opacity distribution information). This evaluation (inference) may also be performed based on any appropriate known knowledge and findings.

With the evaluation function described above, it becomes possible to provide information (indicator, parameter, score) used for cataract diagnosis, which can contribute to diagnostic support.

In the present aspect example, the data processor 8 (8M) may include the simulation processor 90. The simulation processor 90 is configured to perform vision condition simulation of the subject's eye E based on the opacity distribution information (or information generated based on the opacity distribution information).

According the present aspect example with this configuration, it becomes possible to conduct informed consent in an appropriate manner. For example, the present aspect example with this configuration allows the signs and symptoms of cataract, such as photophobia (glare), bleary eyes (dim, blur), color changes, or diplopia, to be presented as an image to the subject. When presenting the image of the signs and symptoms of cataract, the present aspect example with this configuration may also present the subject with a result of simulation of a virtual case (assumption case) in which the opacity state of the crystalline lens of the subject was worse than the current state, a result of simulation of a virtual case (assumption case) in which the opacity area of the crystalline lens is removed by surgery, or any other useful results.

In the present aspect example, the data processor 8 (8N) may include the measurement processor 91. The measurement processor 91 is configured to perform measurement of a predetermined anterior segment parameter based on the plurality of cross sectional images F1 to FN (or an image generated based on the plurality of cross sectional images F1 to FN). Here, the anterior segment parameter may include one or more of corneal thickness (corneal thickness distribution), corneal curvature (corneal curvature distribution), anterior chamber depth (anterior chamber depth distribution), crystalline lens thickness (crystalline lens thickness distribution), crystalline lens curvature (crystalline lens curvature distribution), crystalline lens diameter, crystalline lens tilt angle, and positional difference (positional deviation, positional error) between the corneal center and the crystalline lens center.

According to the present aspect example with this configuration, it becomes possible to calculate a value of the anterior segment parameter from the plurality of cross sectional images F1 to FN (or an image generated based on the plurality of cross sectional images F1 to FN). The measurement value obtained in this way may be used, for example, for the simulation described above, for the design and selection of an intraocular lens (IOL), for the consideration of treatment policies, for the consideration of surgical policies, or for any other suitable purposes.

The slit lamp microscope 1 of the present aspect example makes it possible to implement scanning of anterior eye segment with slit light by means of the following configuration. That is, the scanner includes the illumination system 2, the photography system 3, and the movement mechanism 6. The illumination system 2 is configured to project the slit light onto the anterior segment of the subject's eye E. The photography system 3 is configured to perform photography of the anterior segment from a direction different from the illumination system 2. The movement mechanism 6 is configured to move the illumination system 2 and the photography system 3. The photography system 3 performs repetitive photography (repetitive acquisition of images) in parallel with movement of the illumination system 2 and the photography system 3 performed by the movement mechanism 6. This repetitive photography is, for example, moving image photography at a photographing rate set in advance.

The movement mechanism 6 of the present aspect example may be configured to move the illumination system 2 and the photography system 3 in the X direction for anterior eye segment scanning with slit light. The movement mechanism 6 of the present aspect example may be capable of moving the illumination system 2 and the photography system 3 in a three dimensional manner for alignment.

Furthermore, the slit lamp microscope 1 of the present aspect example may have a function as a Scheimpflug camera, for example, in order to make it possible to photograph an area from the anterior surface of the cornea to the posterior surface of the crystalline lens by a single shot. For this purpose, the photography system 3 may include the optical system 4 and the image sensor 5. The optical system 4 is configured to direct light coming from the anterior eye segment onto which the slit light is projected. The image sensor 5 includes a light detecting plane and is configured to receive the light directed by the optical system 4. In addition, the slit lamp microscope 1 may be configured in such a manner that the subject plane along the optical axis of the illumination system 2, the optical system 4, and the image sensor 5 (the light detecting plane) satisfy the Scheimpflug condition.

Second Aspect Example

The present aspect example gives a description of an ophthalmic information processing apparatus. Any of the matters or items described in the first aspect example may be combined with or incorporated in the present aspect example.

Figure 23:
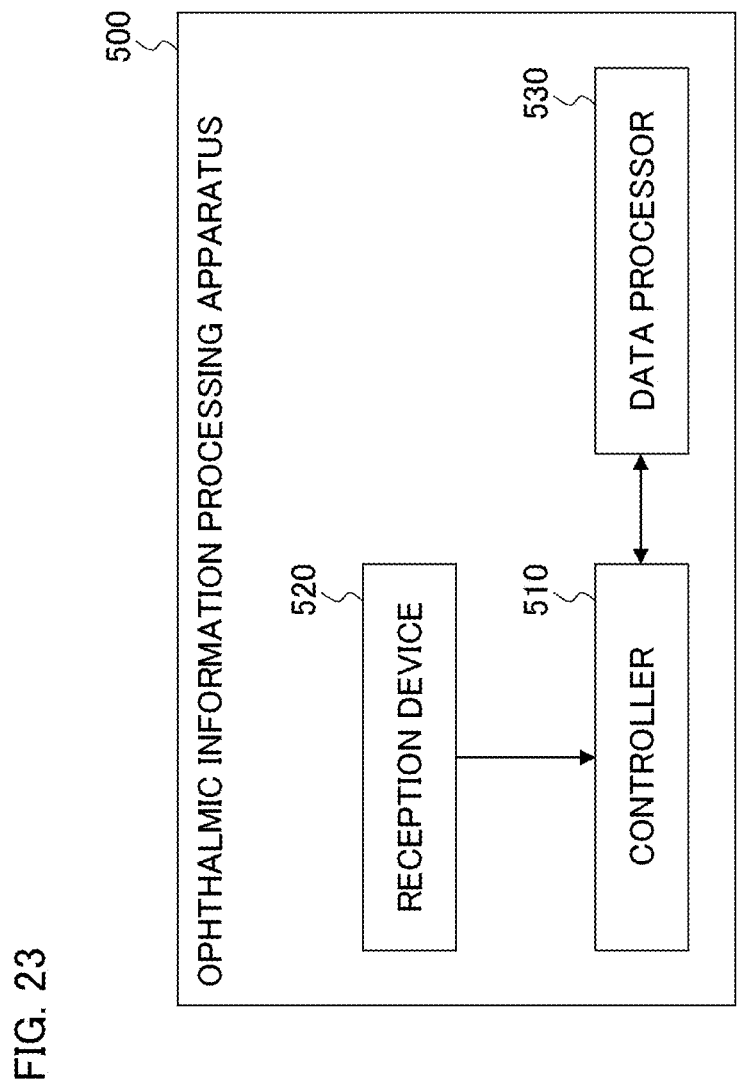
FIG. 23 is a schematic diagram illustrating the configuration of the ophthalmic information processing apparatus of the aspect example.

An example of the present aspect example is shown in FIG. 23. The ophthalmic information processing apparatus 500 includes the controller 510, the reception device 520, and the data processor 530. The controller 510 controls each part of the ophthalmic information processing apparatus 500.

The reception device 520 receives a plurality of cross sectional images collected by scanning an anterior segment of a subject's eye with slit light. The plurality of cross sectional images is obtained, for example, by an ophthalmic imaging apparatus having the same or similar configuration as or to the scanner of the slit lamp microscope 1 of the first aspect example. The reception device 520 receives the plurality of cross sectional images from the outside (for example, from an ophthalmic apparatus, an image archiving system, a recording medium, or other apparatuses or devices). The reception device 520 may include, for example, a communication device or a drive device.

The data processor 530 is configured to generate opacity distribution information that represents a distribution of an opaque area in a crystalline lens, based on the plurality of cross sectional images received by the reception device 520. The data processor 530 may have, for example, the same or similar function and configuration as or to the data processor 8 of the first aspect example. The data processor 530 may be any one of the data processors 8A to 8N of the first aspect example, or may be a combination of freely selected two or more of the data processors 8A to 8N of the first aspect example.

According to the ophthalmic information processing apparatus 500 of the present aspect example as described above, a novel ophthalmic observation technique without the drawbacks of diaphanoscopy can be provided by, for example, combining the ophthalmic information processing apparatus 500 with an ophthalmic imaging apparatus having the same or similar configuration as or to the scanner of the slit lamp microscope 1 of the first aspect example.

By combining or incorporating any of the matters or items described in the first aspect example with or in the present aspect example, an advantageous effect corresponding to the matters or items combined or incorporated can be achieved.

Third Aspect Example

The present aspect example gives a description of an ophthalmic system including an ophthalmic imaging apparatus and an information processing apparatus. The ophthalmic imaging apparatus has at least a function as a slit lamp microscope (the function as the scanner of the first aspect example). A slit lamp microscope included in the ophthalmic imaging apparatus may be the slit lamp microscope of the first aspect example. Note that the ophthalmic imaging apparatus does not have to have at least a part of the data processor of the first aspect example. Below, a description will be given while referring accordingly to the elements, the configurations, and the reference characters of any of the above-described aspect examples.

Figure 24:
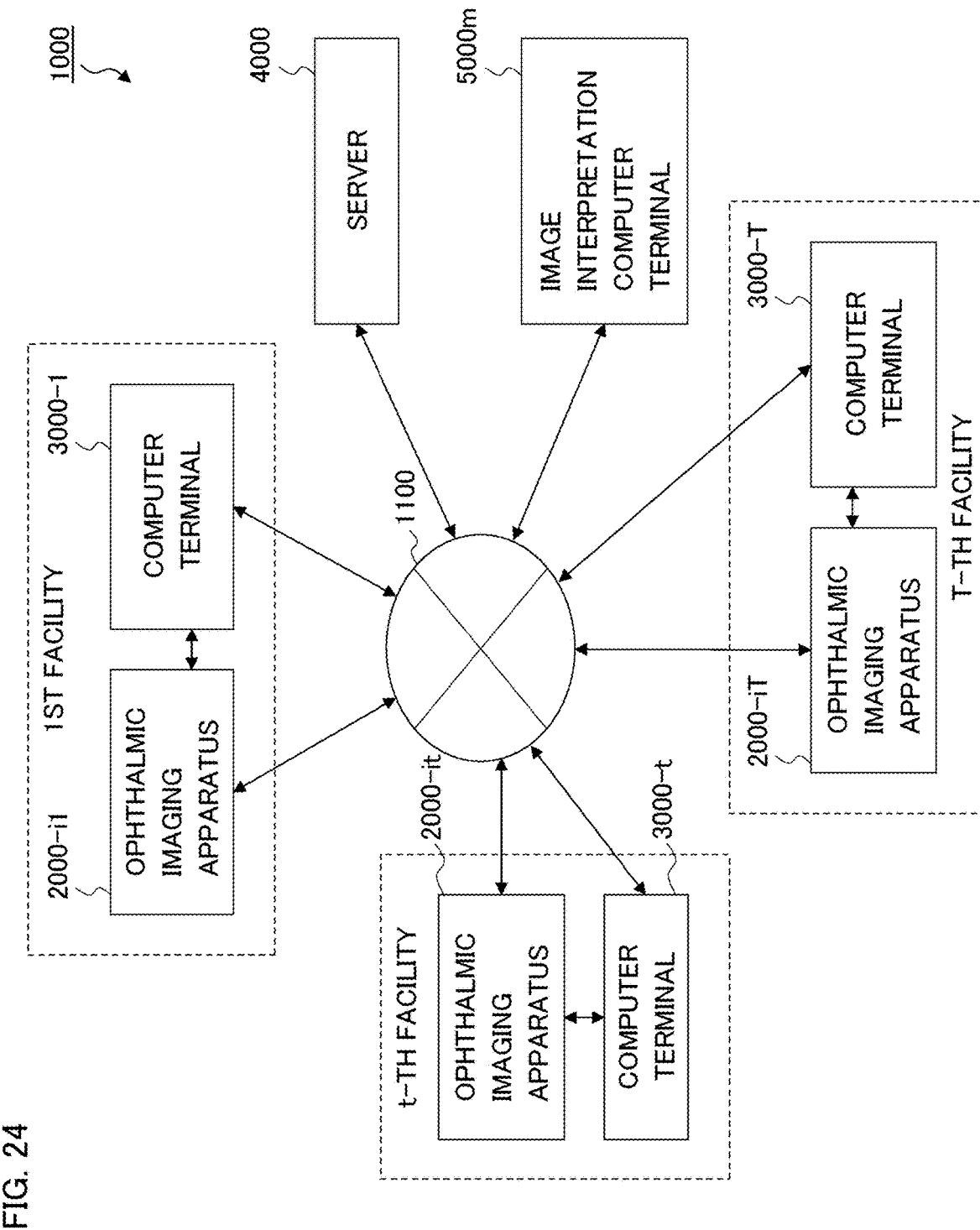
FIG. 24 is a schematic diagram illustrating the configuration of the ophthalmic system of the aspect example.

The ophthalmic system 1000 illustrated in FIG. 24 is configured using a communication channel (communication line) 1100 that is used for establishing connections between each of the number T of facilities (the first facility to the T-th facility) where ophthalmic imaging is conducted, the server 4000, and the image interpretation computer terminal 5000m. The server 4000 is an example of the information processing apparatus and the image interpretation computer terminal 5000m is an example of the information processing apparatus.

Here, the ophthalmic imaging includes at least anterior segment photography using a slit lamp microscope. This anterior segment photography includes at least the anterior segment scanning with slit light described in the first aspect example.

Each of the facilities (t-th facility: where t=1 to T, T is any positive integer) is provided with the ophthalmic imaging apparatus 2000-$i_t$ (where $i_t$=1 to $K_t$, $K_t$ is any positive integer). In other words, one or more ophthalmic imaging apparatuses 2000-$i_t$ are disposed in each of the facilities (t-th facility). The ophthalmic imaging apparatus 2000-$i_t$ constitutes a part of the ophthalmic system 1000. The ophthalmic system 1000 may include an examination apparatus that is capable of performing examination other than ophthalmic examination.

The ophthalmic imaging apparatus 2000-$i_t$ of the present example has the function of an "imaging apparatus" that performs imaging of eyes, and the function of a "computer" that performs various kinds of data processing and communicates with external devices. For another example, an imaging apparatus and a computer may be provided separately from each other. If this is the case, the imaging apparatus and the computer may communicate with each other. There may be any number of imaging apparatuses and any number of computers. For example, a single computer and a plurality of imaging apparatuses can be provided.

The "imaging apparatus" in the ophthalmic imaging apparatus 2000-$i_t$ includes at least a slit lamp microscope. This slit lamp microscope may be the slit lamp microscope of the first aspect example.

Further, in each of the facilities (t-th facility), disposed is an information processing apparatus that can be used by an assistant or a subject (that is, the computer terminal 3000-$t$). The computer terminal 3000-$t$ is a computer for use in the corresponding facility. The computer terminal 3000-$t$ may be, for example, a mobile terminal such as a tablet terminal or a smartphone, or a server disposed in the corresponding facility. The computer terminal 3000-$t$ may also include a wearable device such as a wireless earphone. Note that the computer terminal 3000-$t$ is only required to be a computer capable of realizing its functions in the corresponding facility. The computer terminal 3000-$t$ may be, for example, a computer placed outside the corresponding facility such as a cloud server.

The ophthalmic imaging apparatus 2000-$i_t$ and the computer terminal 3000-$t$ may communicate with each other through a network such as a network built in the t-th facility (e.g., in-house LAN), a wide area network (e.g., the Internet), or near-field communication technology.

The ophthalmic imaging apparatus 2000-$i_t$ may have the function as a communication device such as a server. If this is the case, the ophthalmic imaging apparatus 2000-$i_t$ and the computer terminal 3000-$t$ may communicate directly with each other. This makes it possible for the server 4000 and the computer terminal 3000-$t$ to communicate with each other via the ophthalmic imaging apparatus 2000-$i_t$. Therefore, the function of performing communication between the computer terminal 3000-$t$ and the server 4000 becomes omissible.

The server 4000 of some typical examples is disposed in a facility different from any of the first to the t-th facilities, for example, in a management center. The server 4000 can communicate with the image interpretation computer terminal 5000m (where m=1 to M, M is any positive integer) via a network. The network is, for example, a LAN or a wide area network. Further, the server 4000 can communicate with one or more of the ophthalmic imaging apparatuses 2000-$i_t$ disposed in the first to the t-th facilities via a wide area network.

The server 4000 has the following functions, for example: the function of relaying communication between the ophthalmic imaging apparatus 2000-$i_t$ and the image interpretation computer terminal 5000m; the function of recording the contents of the communication; the function of storing data and information acquired by the ophthalmic imaging apparatus 2000-$i_t$; and the function of storing data and information acquired by the image interpretation computer terminal 5000m. In addition, the server 4000 may have a data processing function.

The image interpretation computer terminal 5000m includes a computer that can be used for interpretation of images of a subject's eye acquired by the ophthalmic imaging apparatus 2000-$i_t$ (e.g., interpretation of a plurality of cross sectional images acquired through anterior segment scanning, or interpretation of a rendered image of a three dimensional image constructed based on a cross sectional images acquired through anterior segment scanning), as well as that can be used for creation of reports. The image interpretation computer terminal 5000m may have a function of data processing.

Figure 25:
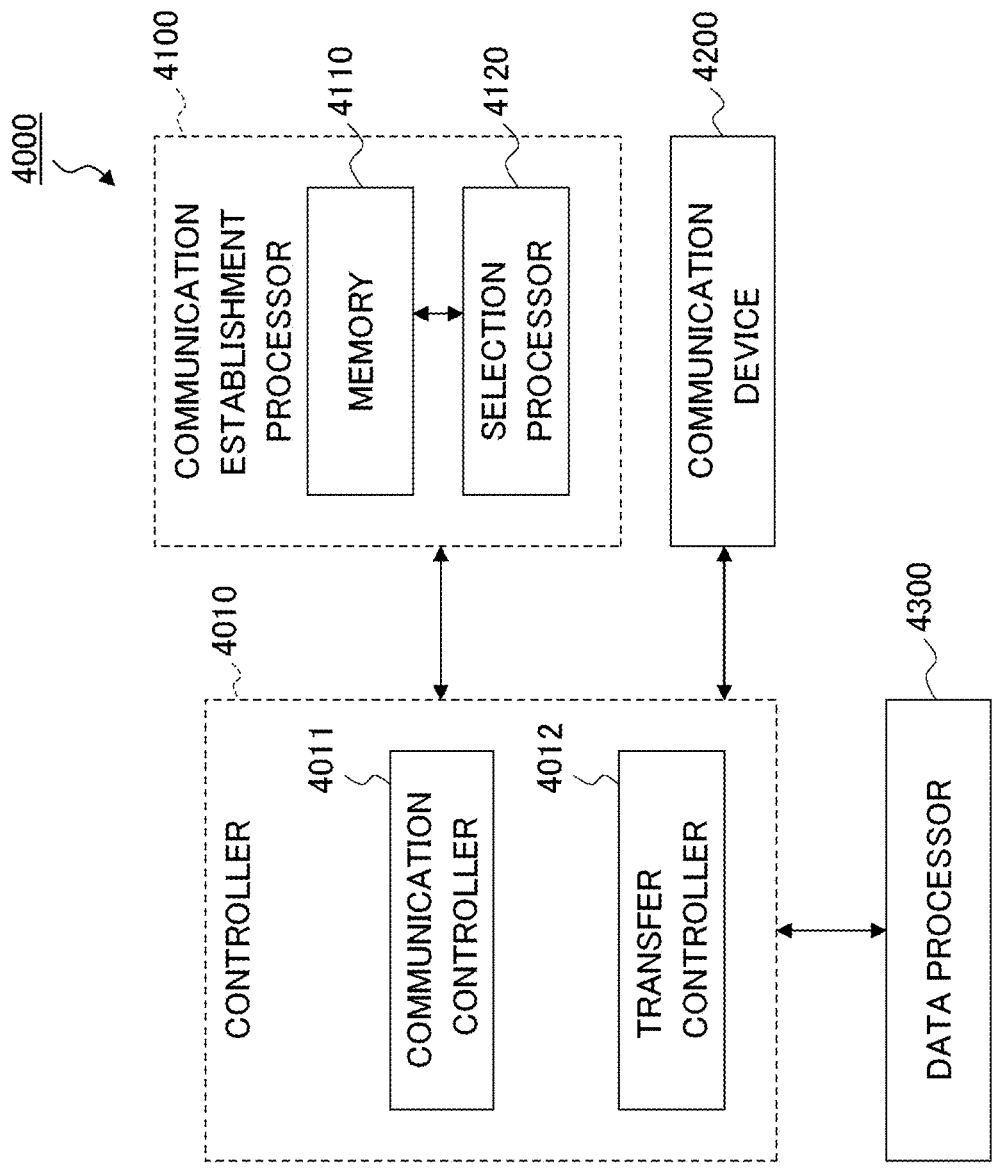
FIG. 25 is a schematic diagram illustrating the configuration of the ophthalmic system of the aspect example.

Now given is a description of the server 4000. The server 4000 illustrated in FIG. 25 includes the controller 4010, the communication establishment processor 4100, and the communication device 4200.

The controller 4010 executes control of each part of the server 4000. The controller 4010 may be capable of executing other processing such as arithmetic processing. The controller 4010 includes a processor. The controller 4010 may further include a RAM, a ROM, a hard disk drive, a solid state drive, etc.

The controller 4010 includes the communication controller 4011 and the transfer controller 4012.

The communication controller 4011 is configured to perform control relating to the establishment of communication between a plurality of apparatuses that includes a plurality of ophthalmic imaging apparatuses 2000-$i_t$, a plurality of computer terminals 3000-$t$, and a plurality of image interpretation computer terminals 5000m. For example, the communication controller 4011 may be configured to send a control signal for establishing communication to each of two or more apparatuses selected by the selection processor 4120 from among a plurality of apparatuses included in the ophthalmic system 1000. The selection processor 4120 will be described later.

The transfer controller 4012 is configured to perform control relating to exchange (transmission and reception) of information between two or more apparatuses between which communication has been established by the communication establishment processor 4100 (and the communication controller 4011). For example, the transfer controller 4012 may be configured to transfer information transmitted from one of the at least two apparatuses between which communication has been established by the communication establishment processor 4100 (and the communication controller 4011), to another apparatus.

As a specific example, in the case where communication between the ophthalmic imaging apparatus 2000-$i_t$ and the image interpretation computer terminal 5000m has been established, the transfer controller 4012 can transfer information transmitted from the ophthalmic imaging apparatus 2000-$i_t$ to the image interpretation computer terminal 5000m. This information transmitted from the ophthalmic imaging apparatus 2000-$i_t$ may include a plurality of cross sectional images. Conversely, the transfer controller 4012 can transfer information transmitted from the image interpretation computer terminal 5000m to the ophthalmic imaging apparatus 2000-$i_t$. This information transmitted from the image interpretation computer terminal 5000m may include an instruction to the ophthalmic imaging apparatus 2000-$i_t$, an interpretation report, or the like.

The transfer controller 4012 may have a function of processing information received from another apparatus. If this is the case, the transfer controller 4012 can transmit either one or both of the received information and information created using the processing function, to an apparatus that is a destination of transfer.

For example, the transfer controller 4012 may extract part of the information transmitted from an apparatus such as the ophthalmic imaging apparatus 2000-$i_t$, and transmit the extracted information to an apparatus such as the image interpretation computer terminal 5000m.

In some aspect examples, the server 4000 or another apparatus may be configured to analyze information transmitted from an apparatus such as the ophthalmic imaging apparatus 2000-$i_t$. This information to be analyzed may include a plurality of cross sectional images or information generated by processing the plurality of cross sectional images, for example. In addition, a result of this analysis of the information (and its original information) may be sent to an apparatus such as the image interpretation computer terminal 5000m. Some aspect examples may be configured to execute interpretation, using an artificial intelligence engine or the like, of the plurality of cross sectional images (or a three dimensional image constructed based on the plurality of images, or a rendered image of the three dimensional image) transmitted from the ophthalmic imaging apparatus 2000-$i_t$, and then transmit a result of this interpretation to the image interpretation computer terminal 5000m together with the plurality of cross sectional images.

In the case where a plurality of cross sectional images has been transmitted from the ophthalmic imaging apparatus 2000-$i_t$, the ophthalmic system 1000 may be configured in such a manner that the server 4000 or another apparatus constructs a three dimensional image (e.g., stack data, volume data, three dimensional crystalline lens image, etc.) from this plurality of cross sectional images, and that the transfer controller 4012 sends the constructed three dimensional image to the image interpretation computer terminal 5000m.

In the case where stack data has been transmitted from the ophthalmic imaging apparatus 2000-$i_t$, the ophthalmic system 1000 may be configured in such a manner that the server 4000 or another apparatus constructs volume data from this stack data, and that the transfer controller 4012 sends the constructed volume data to the image interpretation computer terminal 5000m.

Data processing executable by the server 4000 or another apparatus is not limited to the examples described above. Data processing executable by the server 4000 or another apparatus may include data processing of any kind. For example, the server 4000 or another apparatus may have any of the functions and/or any of the configurations of the data processor 8 of the first aspect example (see FIG. 4 to FIG. 14).

The communication establishment processor 4100 is configured to perform a process of establishing communication between at least two apparatuses that have been selected from among a plurality of apparatuses including the plurality of ophthalmic imaging apparatuses 2000-$i_t$, the plurality of computer terminals 3000-$t$, and the plurality of image interpretation computer terminals 5000m. In the present aspect example, "establishing communication" refers to a concept which includes, for example, one or more of the followings: (1) establishing unidirectional communication from a state in which communication is disconnected; (2) establishing bidirectional communication from a state in which communication is disconnected; (3) switching from a state in which only data reception is possible to a state in which both data reception and data transmission are possible; and (4) switching from a state in which only data transmission is possible to a state in which both data transmission and data reception are possible.

In addition, the communication establishment processor 4100 can perform a process of disconnecting the established communication. In the present aspect example, "disconnecting communication" refers to a concept which includes, for example, one or more of the followings: (1) disconnecting communication from a state in which unidirectional communication has been established; (2) disconnecting communication from a state in which bidirectional communication has been established; (3) switching from a state in which bidirectional communication has been established to unidirectional communication; (4) switching from a state in which data transmission and data reception are possible to a state in which only data reception is possible; and (5) switching from a state in which data transmission and data reception are possible to a state in which only data transmission is possible.

Each of the ophthalmic imaging apparatus 2000-$i_t$, the computer terminal 3000-$t$, and the image interpretation computer terminal 5000m can send one or more of the following communication requests to the server 4000: a communication request (a call request) for calling another apparatus or the user thereof; and a communication request (an interruption request) for interrupting communication between two other apparatuses. A call request is issued manually or automatically, and an interruption request is issued manually or automatically. The server 4000 (the communication device 4200 therein) receives a communication request transmitted from the ophthalmic imaging apparatus 2000-$i_t$, the computer terminal 3000-$t$, or the image interpretation computer terminal 5000m.

The communication establishment processor 4100 of the present aspect example may include the selection processor 4120. For example, based on a communication request sent from the ophthalmic imaging apparatus 2000-$i_t$, the computer terminal 3000-$t$, or the image interpretation computer terminal 5000$m$, the selection device 4120 selects one or more apparatuses other than the apparatus that has sent the communication request, from among the ophthalmic imaging apparatus 2000-$i_t$, the computer terminal 3000-$t$, and the image interpretation computer terminal 5000$m$.

A specific example of the processing executed by the selection processor 4120 will be described. When a communication request sent from the ophthalmic imaging apparatus 2000-$i_t$ or the computer terminal 3000-$t$ is received (e.g., when a request for interpretation of an image acquired by the ophthalmic imaging apparatus 2000-$i_t$ is received), the selection processor 4120 selects, for example, any apparatus from among the plurality of image interpretation computer terminals 5000$m$. The communication establishment processor 4100 establishes communication between the selected image interpretation computer terminal 5000$m$, and one or more of the ophthalmic imaging apparatus 2000-$i_t$ and the computer terminal 3000-$t$.

The selection of apparatus in response to a communication request is performed, for example, based on a preset attribute. Examples of the attribute include types of examination (e.g., types of imaging modalities, types of images, types of diseases, types of possible diseases), degrees of expertise required, levels of skills required, and types of languages. In the present example, for example, the specialized field and the level of skill of the person who conducts image interpretation are referred to. In order to implement the processing of the present example, the communication establishment processor 4100 may include the memory 4110 in which attribute information prepared in advance is stored. This attribute information includes attributes of the image interpretation computer terminals 5000$m$ and/or attributes of users (doctors, optometrists) of the image interpretation computer terminals 5000$m$.

The identification of users may be carried out using user identifiers (user IDs) respectively assigned to users in advance. Further, the identification of the image interpretation computer terminals 5000$m$ may be carried out using, for example, apparatus identifiers or network addresses respectively assigned to apparatuses in advance. In a typical example, the attribute information includes attributes of each user such as the user's specialized field (e.g., the department, the specialized disease), the user's degree of expertise, the user's level of skills, or the types of languages the user is able to use.

When the selection processor 4120 refers to the attribute information, a communication request to be sent from the ophthalmic imaging apparatus 2000-$i_t$, the computer terminal 3000-$t$, or the image interpretation computer terminal 5000$m$ may include information related to attributes. For example, an interpretation request (diagnosis request) to be transmitted from the ophthalmic imaging apparatus 2000-$i_t$ may include any of the followings: (1) information indicating the type of an imaging modality; (2) information indicating the type of images; (3) information indicating the name of a disease or the name of a possible disease; (4) information indicating the degree of difficulty in interpretation; and (5) information indicating a language used by a user of the ophthalmic imaging apparatus 2000-$i_t$ and/or a language used by a user of the computer terminal 3000-$t$.

Upon receiving such an interpretation request, the selection processor 4120 may select one or more of the image interpretation computer terminals 5000$m$ based on this interpretation request and the attribute information stored in the memory 4110. In this selection processing, the selection processor 4120 may compare the information related to attributes included in the interpretation request with information recorded in the attribute information stored in the memory 4110. With this comparison, the selection processor 4120 selects, for example, the image interpretation computer terminal(s) 5000$m$ corresponding to a doctor(s) (or an optometrist(s)) who satisfies any of the following attributes: (1) a doctor who is specializing in a corresponding imaging modality; (2) a doctor who is specializing in a corresponding type of images; (3) a doctor who is specializing in a corresponding disease (or a corresponding possible disease); (4) a doctor who is capable of conducting interpretation of a corresponding level of difficulty; and (5) a doctor who is capable of using a corresponding language.

The correspondence between doctors or optometrists and the image interpretation computer terminals 5000$m$ may be made by, for example, referring to user IDs input, at the time of logging in, to the image interpretation computer terminals 5000$m$ (or to the ophthalmic system 1000).

The communication device 4200 is configured to perform data communication with another apparatus such as any of the ophthalmic imaging apparatus 2000-$i_t$, the computer terminal 3000-$t$, and the image interpretation computer terminal 5000$m$. The system or method of the data communication and encryption may be performed in the same manner as in the communication device provided in the ophthalmic imaging apparatus 2000-$i_t$ (the communication device of the output unit 9 in the first aspect example).

The server 4000 includes the data processor 4300. The data processor 4300 is configured to execute various kinds of data processes. The data processor 4300 may be configured to process a plurality of cross sectional images or a three dimensional image acquired by the ophthalmic imaging apparatus 2000-$i_t$ (in particular, a slit lamp microscope). For example, the data processor 4300 may have any of the functions and/or any of the configurations of the data processor 8 of the first aspect example (see FIG. 4 to FIG. 14). The data processor 4300 includes a processor, a primary storage, a secondary storage, and the like. The secondary storage retains a data processing program or the like. The function of the data processor 4300 is implemented by cooperation of software such as the data processing program and hardware such as the processor.

The server 4000 may provide data obtained by the data processor 4300 to another apparatus. For example, in the case where the data processor 4300 constructs a three dimensional image from a plurality of cross sectional images acquired by the ophthalmic imaging apparatus 2000-$i_t$, the server 4000 can transmit the constructed three dimensional image to the image interpretation computer terminal 5000$m$ by using the communication device 4200. In the case where the data processor 4300 applies the rendering to a three dimensional image constructed by the ophthalmic imaging apparatus 2000-$i_t$ or the data processor 4300, the server 4000 can transmit the constructed rendered image to the image interpretation computer terminal 5000$m$ by using the communication device 4200. In the case where the data processor 4300 applies a measuring process to one or more cross sectional images or a three dimensional image, the server 4000 can transmit the obtained measurement data to the image interpretation computer terminal 5000$m$ by using the communication device 4200. In the case where the data processor 4300 applies the distortion correction to one or more cross sectional images or a three dimensional image, the server 4000 can transmit the corrected image to the image interpretation computer terminal 5000*m* by using the communication device 4200.

Figure 26:
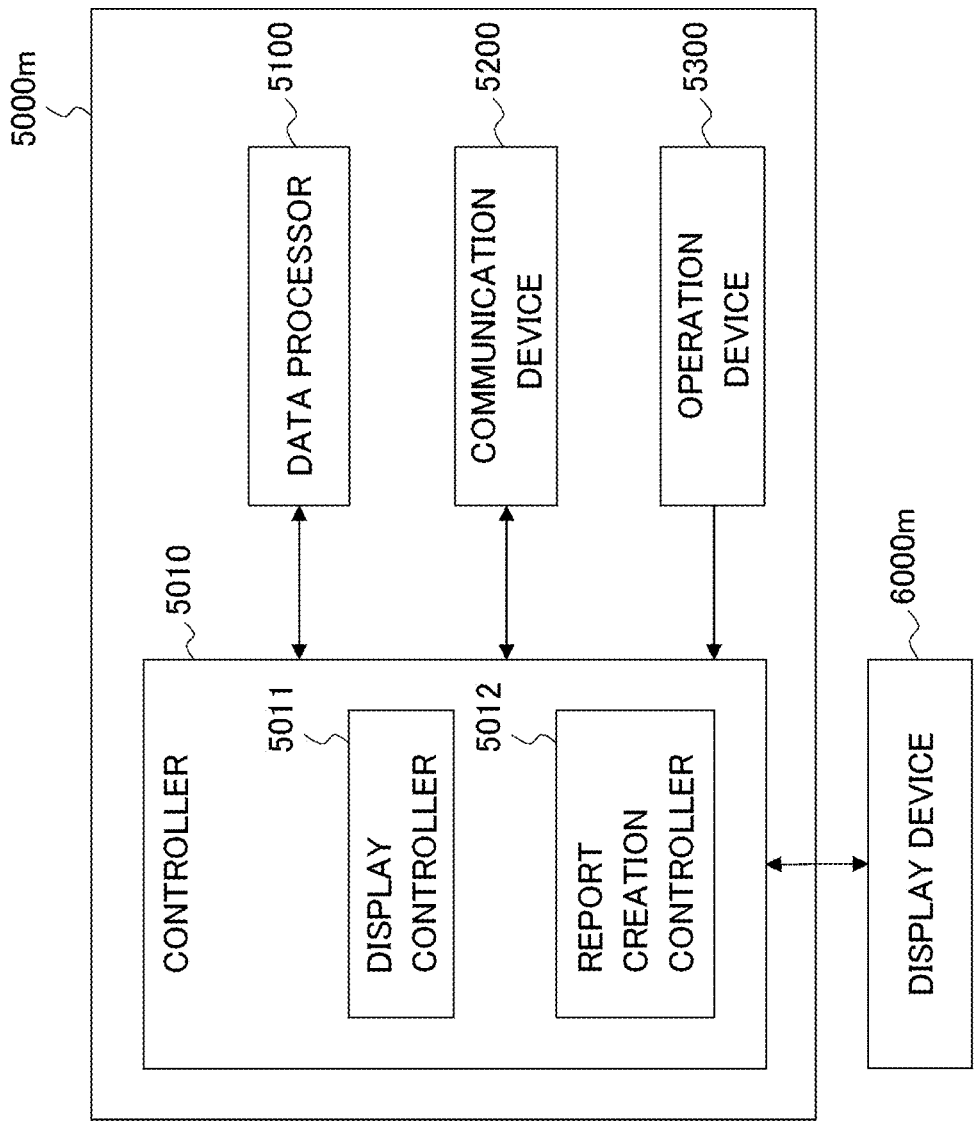
FIG. 26 is a schematic diagram illustrating the configuration of the ophthalmic system of the aspect example.

Next, a description is given of the image interpretation computer terminal 5000*m*. The image interpretation computer terminal 5000*m* illustrated in FIG. 26 includes the controller 5010, the data processor 5100, the communication device 5200, and the operation device 5300.

The data processor 5100 is configured to execute various kinds of data processing. The data processor 5100 may have any of the functions and/or any of the configurations of the data processor 8 of the first aspect example (see FIG. 4 to FIG. 14). For example, the data processor 5100 may be configured to generate opacity distribution information that represents a distribution of an opacity area in the crystalline lens of the subject's eye, based on a plurality of cross sectional images provided by the server 4000. Further, the data processor 5100 may be configured to acquire various kinds of information, such as a map, from the opacity distribution information generated. The data processor 5100 includes a processor, a primary storage, a secondary storage, and the like. A data processing program or the like is stored in the secondary storage. The function of the data processor 5100 is implemented by cooperation of software such as the data processing program and hardware such as the processor.

The controller 5010 executes control of each part of the image interpretation computer terminal 5000*m*. The controller 5010 may be capable of executing other processing such as arithmetic processing. The controller 5010 includes a processor, a RAM, a ROM, a hard disk drive, a solid state drive, etc.

The controller 5010 includes the display controller 5011. The display controller 5011 controls the display device 6000*m*. The display device 6000*m* may be included in the image interpretation computer terminal 5000*m* or may be a peripheral device connected to the image interpretation computer terminal 5000*m*. The display controller 5011 controls the display device 6000*m* to display an image of the anterior segment of the subject's eye E. For example, the display controller 5011 may control the display device 6000*m* to display a rendered image of a three dimensional image generated based on a plurality of cross sectional images of the anterior segment of the subject's eye. Further, the display controller 5011 may control the display device 6000*m* to display a map generated from the plurality of cross sectional images. Examples of the map created from the plurality of cross sectional images include an opacity distribution map, a transmissivity distribution map, and time dependent change information. Furthermore, the display controller 5011 may control the display device 6000*m* to display a result of evaluation of cataract executed based on either one or both of the plurality of cross sectional images and the opacity distribution information. In addition, the display controller 5011 may control the display device 6000*m* to display a result of measurement of an anterior segment parameter executed based on the plurality of cross sectional images.

The controller 5010 includes the report creation controller 5012. The report creation controller 5012 executes various kinds of controls for creating a report regarding the information displayed by the display controller 5011. For example, the report creation controller 5012 controls the display device 6000*m* to display a screen and a graphical user interface (GUI) used for report creation. Further, the report creation controller 5012 inputs or records, into or on a predetermined report template, information input by the user, an image of the anterior segment, measurement data, analysis data, and the like.

The communication device 5200 performs data communication with another apparatus. This another apparatus is, for example, any of the ophthalmic imaging apparatus 2000-$i_t$, the computer terminal 3000-$t$, and the server 4000. The system of the data communication and encryption may be performed in the same manner as in the communication device of the ophthalmic imaging apparatus 2000-$i_t$.

The operation device 5300 is used to operate the image interpretation computer terminal 5000*m* and input information to the image interpretation computer terminal 5000*m*. In the present aspect example, the operation device 5300 is used to create a report. The operation device 5300 includes an operation device and an input device. The operation device 5300 includes, for example, a mouse, a keyboard, a trackball, an operation panel, a switch, a button, a dial, or the like. The operation device 5300 may include a touch screen.

The ophthalmic system 1000 of the present aspect example is capable of performing the following operations.

To begin with, the ophthalmic imaging apparatus 2000-$i_t$ (a slit lamp microscope) performs scanning on the anterior segment of the subject's eye with slit light, thereby collecting a plurality of cross sectional images. The ophthalmic imaging apparatus 2000-$i_t$ transmits the first transmission information including the collected plurality of cross sectional images to the server 4000 via the communication line 1100. Such an operation of the ophthalmic imaging apparatus 2000-$i_t$ may be performed in the same manner as the operation of the first aspect example. In addition, the ophthalmic imaging apparatus 2000-$i_t$ may be capable of performing any of the processes described in the first aspect example.

The server 4000 receives the first transmission information sent from the ophthalmic imaging apparatus 2000-$i_t$ using the communication device 4200 (a reception device), and then stores the first transmission information in the memory 4110. Further, the server 4000 transmits, using the communication device 4200 (a transmission device), the second transmission information that includes at least the plurality of cross sectional images included in the first transmission information, to the image interpretation computer terminal 5000*m* via the communication line 1100.

The image interpretation computer terminal 5000*m* receives the second transmission information sent from the server 4000 using the communication device 5200 (a reception device). The user of the image interpretation computer terminal 5000*m* (the person who conducts image interpretation) performs interpretation based on the plurality of cross sectional images using a user interface (the operation device 5300, the display device 6000*m*, the report creation controller 5012, etc.). For example, the data processor 5100 generates opacity distribution information based on the plurality of cross sectional images. From the opacity distribution information generated, the data processor 5100 creates various kinds of information such as an opacity distribution map, a transmissivity distribution map, and time dependent change information. The various kinds of information generated by these processes may be displayed on the display device 6000*m* by the display controller 5011. Further, the data processor 5100 applies rendering to a three dimensional image constructed based on the plurality of cross sectional images. A rendered image constructed by this rendering is displayed on the display device 6000*m* by the display controller 5011. The rendered image is, for example, a front image analogous to a transillumination image. By conducting image interpretation of this front image and/or referring to the various kinds of information relating to the opacity distribution, the user can perform, for example, evaluation of the grade of cataract, and inputs a result of this evaluation to the image interpretation computer terminal 5000*m*. The image interpretation computer terminal 5000*m* transmits, using the communication device 5200 (a transmission device), the third transmission information that includes information (e.g., an image interpretation report) input using the user interface, to the server 4000 via the communication line 1100.

The server 4000 receives the third transmission information transmitted from the image interpretation computer terminal 5000*m* using the communication device 4200 (a reception device), associates the third transmission information with the first transmission information, and stores the third transmission information in the memory 4110.

As can be seen from the effects of the first aspect example, according to the ophthalmic system 1000 configured in this way, the user can appropriately conduct image interpretation based on the images of the anterior eye segment acquired in advance. The acquisition of the images of the anterior eye segment may be performed at a remote place. With a conventional technology, a doctor conducts a medical examination while operating a slit lamp microscope from a remote place; however, according to the present aspect example, a doctor only needs to conduct image interpretation based on images that have been acquired in advance. In other words, according to the present aspect example, a doctor can be made free from the time and effort required for conducting photography, which allows the doctor to concentrate on image interpretation. Therefore, the present aspect example contributes to expanding the area to which a slit lamp microscope examination of high quality can be provided.

Fourth Aspect Example

The information processing apparatus according to the third aspect example includes an image interpretation computer terminal for a doctor to perform image interpretation. On the other hand, the present aspect example gives a description of an ophthalmic system that includes an image interpretation apparatus as an information processing apparatus. This image interpretation apparatus has an image interpretation function. The difference in configurations from the third aspect is that the image interpretation apparatus is provided instead of the image interpretation computer terminal. Note that the third aspect example and the fourth aspect example may be combined to configure an ophthalmic system that includes both an image interpretation computer terminal and an image interpretation apparatus. Below, a description will be provided while referring accordingly to the elements, the configurations, and the reference characters of any of the aspect examples described above.

Figure 27:
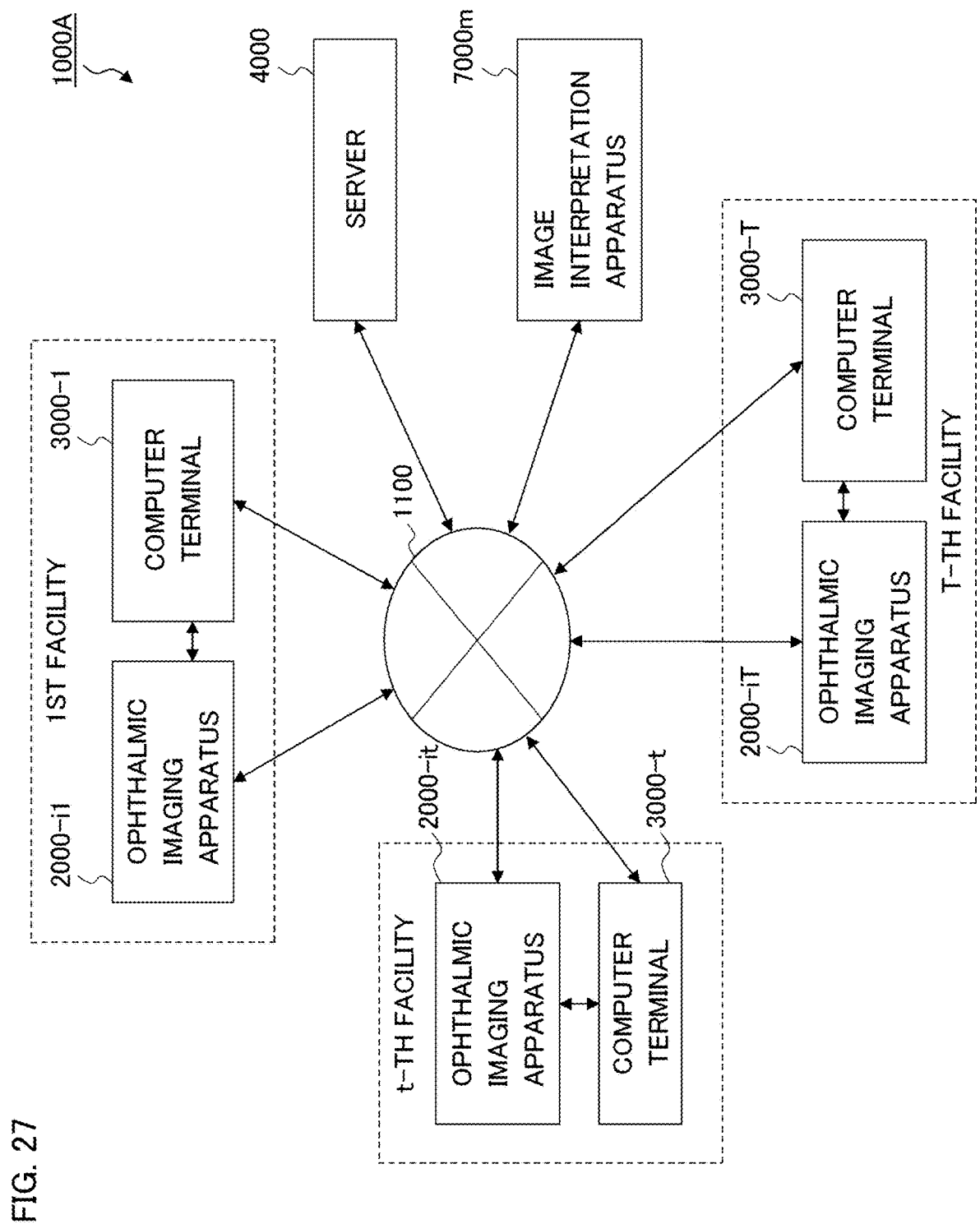
FIG. 27 is a schematic diagram illustrating the configuration of the ophthalmic system of the aspect example.

As mentioned above, the ophthalmic system 1000A illustrated in FIG. 27 has a configuration that includes the image interpretation apparatus 7000*m* in place of the image interpretation computer terminal 5000*m* of the ophthalmic system 1000 of the third aspect example. The image interpretation apparatus 7000*m* is a computer configured to execute interpretation of a plurality of cross sectional images acquired by the ophthalmic imaging apparatus 2000-$i_t$ (a slit lamp microscope) using an image processing processor and/or an artificial intelligence engine, for example.

Figure 28:
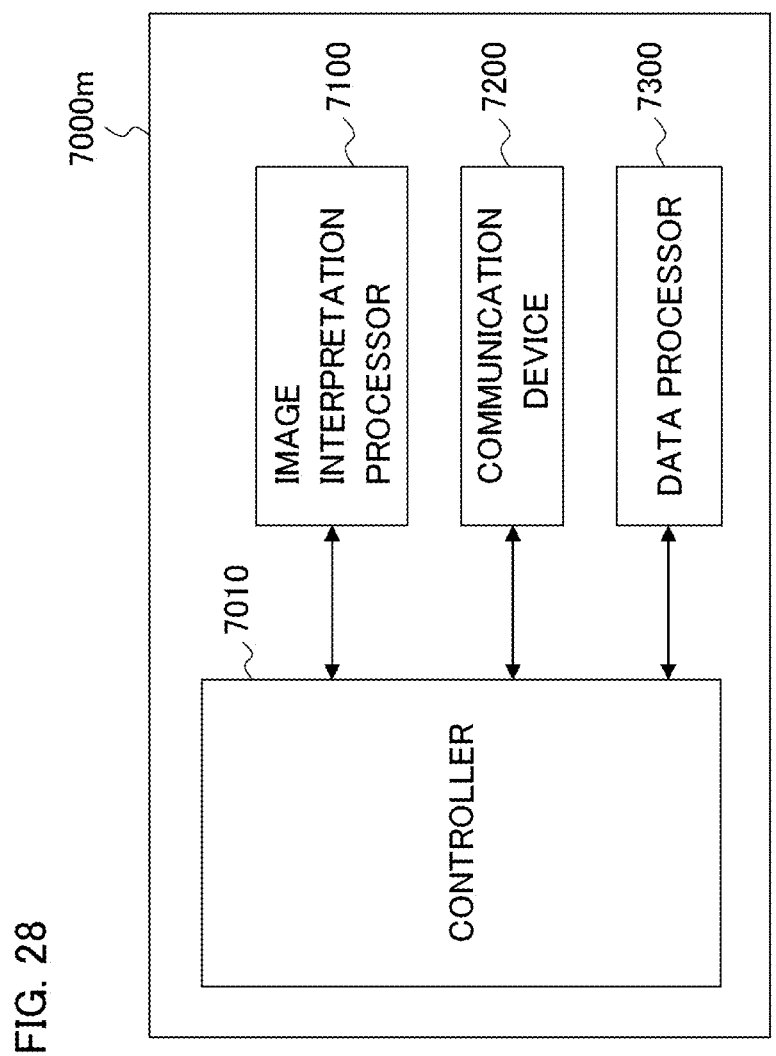
FIG. 28 is a schematic diagram illustrating the configuration of the ophthalmic system of the aspect example.

FIG. 28 shows a configuration example of the image interpretation apparatus 7000*m*. The image interpretation apparatus 7000*m* of the present example includes the image interpretation processor 7100, the communication device 7200, and the data processor 7300. The communication device 7200 is configured to perform data communication with other devices such as any of the ophthalmic imaging apparatus 2000-$i_t$, the computer terminal 3000-*t*, and the server 4000.

The data processor 7300 is configured to execute various kinds of data processing. The data processor 7300 may have any of the functions and/or any of the configurations of the data processor 8 of the first aspect example (see FIG. 4 to FIG. 14). For example, the data processor 7300 may be configured to generate opacity distribution information that represents a distribution of an opacity area in the crystalline lens of the subject's eye, based on a plurality of cross sectional images provided by the server 4000. Further, the data processor 7300 may be configured to acquire various kinds of information from the opacity distribution information generated. The data processor 7300 includes a processor, a primary storage, a secondary storage, and the like. A data processing program or the like is stored in the secondary storage. The function of the data processor 7300 is implemented by cooperation of software such as the data processing program and hardware such as the processor.

The image interpretation processor 7100 includes, for example, an image interpretation processor that operates in accordance with a program for image interpretation, and analyzes a plurality of cross sectional images (an image constructed based on the plurality of cross sectional images) to obtain findings. In some aspect examples, the image interpretation processor 7100 may include the artificial intelligence engine of the first aspect example, in order to obtain findings from a plurality of cross sectional images (an image constructed based on the plurality of cross sectional images). In the present aspect example, the data processor 7300 constructs a rendered image of a three dimensional image constructed based on a plurality of cross sectional images. Then, the image interpretation processor 7100 performs interpretation of this rendered image to obtain findings. In addition, the image interpretation processor 7100 may be configured to create a report based on findings obtained.

The ophthalmic system 1000A of the present aspect example is capable of performing the following operations.

To begin with, the ophthalmic imaging apparatus 2000-$i_t$ (a slit lamp microscope) performs scanning on the anterior segment of the subject's eye with slit light to collect a plurality of cross sectional images. The ophthalmic imaging apparatus 2000-$i_t$ transmits the first transmission information including the collected plurality of cross sectional images to the server 4000 via the communication line 1100. This operation of the ophthalmic imaging apparatus 2000-$i_t$ may be performed in the same manner as the operation of the first aspect example. In addition, the ophthalmic imaging apparatus 2000-$i_t$ may be capable of performing any of the processes described in the first aspect example.

The server 4000 receives the first transmission information sent from the ophthalmic imaging apparatus 2000-$i_t$ using the communication device 4200 (a reception device), and then stores the first transmission information in the memory 4110. Further, the server 4000 transmits, using the communication device 4200 (a transmission device), the second transmission information that includes at least the plurality of cross sectional images included in the first transmission information, to the image interpretation apparatus 7000*m* via the communication line 1100.

The image interpretation apparatus 7000*m* receives the second transmission information sent from the server 4000 using the communication device 7200 (a reception device). For example, the data processor 7300 generates opacity distribution information based on the plurality of cross sectional images included in the second transmission information. From the opacity distribution information generated, the data processor 7300 creates various kinds of information such as an opacity distribution map, a transmissivity distribution map, and time dependent change information. Further, the data processor 7300 applies rendering to a three dimensional image constructed based on the plurality of cross sectional images included in the second transmission information and then construct a rendered image. This rendered image is, for example, a front image analogous to a transillumination image. By applying image interpretation processing to the rendered image and/or analyzing the various kinds of information relating to the opacity distribution, the image interpretation processor 7100 performs evaluation of the grade of cataract, for example. The image interpretation apparatus 7000*m* transmits, using means of the communication device 7200 (a transmission device), the fourth transmission information that includes information generated by the image interpretation processor 7100, to the server 4000 via the communication line 1100.

The server 4000 receives the fourth transmission information transmitted from the image interpretation apparatus 7000*m* using the communication device 4200 (a reception device), associates the fourth transmission information with the first transmission information, and stores the fourth transmission information in the memory 4110.

As can be seen from the effects of the above aspect examples, the ophthalmic system 1000A thus configured is capable of appropriately performing automatic image interpretation based on the image of the anterior segment acquired in advance. The acquisition of the image of the anterior segment may be performed at a remote place. With a conventional technology, a doctor conducts a medical examination while operating a slit lamp microscope from a remote place; however, according to the present aspect example, a doctor only needs to conduct image interpretation while referring to a result of the automatic image interpretation performed based on the images acquired in advance. In other words, according to the present aspect example, a doctor can be made free from the time and effort required for conducting photography, and the result of the automatic image interpretation can be provided to the doctor, which can greatly improve the efficiency of the image interpretation task. In addition, the present aspect example is also expected to improve the accuracy of image interpretation. Therefore, the present aspect example contributes to expanding the area to which a slit lamp microscope examination of high quality can be provided.

<Some Additional Matters and Items>

The present disclosure provides a method of controlling a slit lamp microscope in accordance with any of the aspect examples described above. This slit lamp microscope includes a processor and a scanner. The scanner is configured to perform scanning on the anterior segment of a subject's eye with slit light, thereby collecting a plurality of cross sectional images. The control method of the present aspect example causes the processor to execute a process of generating opacity distribution information that represents a distribution of an opaque area in the crystalline lens based on the plurality of cross sectional images collected by the scanner.

The present disclosure provides a program that causes a computer to execute the control method described above. In addition, the present disclosure provides a computer-readable non-transitory recording medium that retains this program. The non-transitory recording medium may be in any form, and examples of the non-transitory recording medium include a magnetic disk, an optical disk, a magneto-optical disk, and a semiconductor memory.

Similarly, the present disclosure provides any control method described in any of the first to the fourth aspect examples. Further, the present disclosure provides any processing method (e.g., arithmetic method, calculating method, image processing method, image analysis method, etc.) described in any of the first to the fourth aspect examples. Furthermore, the present disclosure can provide a program that causes a computer to execute any of these methods. In addition, the present disclosure can provide a computer-readable non-transitory recording medium that records a program that causes the computer to perform any of these methods.

Some aspect examples described above are merely examples of the implementation of the present disclosure, and any modifications (e.g., omission, substitution, replacement, addition, etc.) may be made within the scope of the present disclosure to the above aspect examples.

What is claimed is:

1. A slit lamp microscope comprising:
a scanner configured to scan an anterior segment of a subject's eye with slit light to collect a plurality of cross sectional images; and
a data processor configured to generate opacity distribution information that represents a distribution of an opaque area in a crystalline lens, based on the plurality of cross sectional images,
wherein the data processor includes
a crystalline lens image construction processor configured to construct a three dimensional crystalline lens image from the plurality of cross sectional images, and
an opacity distribution information generation processor configured to analyze the three dimensional crystalline lens image to generate the opacity distribution information,
wherein the opacity distribution information generation processor includes a local distribution information generation processor configured to generate local distribution information that represents a distribution of an opaque area in a three dimensional partial region for each of a plurality of three dimensional partial regions in the three dimensional crystalline lens image,
wherein the data processor includes a transmissivity distribution information generation processor configured to generate transmissivity distribution information that represents a distribution of light transmissivity of the crystalline lens based on a plurality of pieces of local distribution information generated by the local distribution information generation processor,
wherein the data processor includes a time dependent change information generation processor configured to generate time dependent change information that represents a time dependent change in a distribution of light transmissivity of the crystalline lens based on the transmissivity distribution information, and the slit lamp microscope further comprises a display controller configured to display a graph that represents a time dependent change in light transmissivity of each of the plurality of three dimensional partial regions based on the time dependent change information on a display device, wherein the data processor includes an opacity distribution map creation processor configured to create an opacity distribution map based on a plurality of pieces of local distribution information generated by the local distribution information generation processor, wherein the opacity distribution map represents a depth position of an opaque area in each of the plurality of three dimensional partial regions and is represented using a two dimensional coordinate system in which a first coordinate axis represents a depth direction and a second coordinate axis represents a direction perpendicular to the depth direction, wherein the plurality of three dimensional partial regions is determined by applying equal angle division to the three dimensional crystalline lens image in a plane perpendicular to the depth direction, and the second coordinate axis represents an angle direction of the equal angle division.

2. The slit lamp microscope of claim 1, wherein the crystalline lens image construction processor includes:
a reconstruction processor configured to apply three dimensional reconstruction to the plurality of cross sectional images collected by the scanner; and
a segmentation processor configured to apply segmentation to a three dimensional reconstructed image constructed by the reconstruction processor to identify the three dimensional crystalline lens image.

3. The slit lamp microscope of claim 1, wherein the crystalline lens image construction processor includes:
a segmentation processor configured to apply segmentation to each of the plurality of cross sectional images collected by the scanner to identify a two dimensional crystalline lens image; and
a reconstruction processor configured to apply three dimensional reconstruction to a plurality of two dimensional crystalline lens images identified by the segmentation processor to construct the three dimensional crystalline lens image.

4. The slit lamp microscope of claim 1, wherein the data processor includes a transmissivity distribution map creation processor configured to create a transmissivity distribution map based on the transmissivity distribution information generated by the transmissivity distribution information generation processor.

5. The slit lamp microscope of claim 1, wherein the data processor includes a transmissivity distribution map creation processor configured to create a transmissivity distribution map that represents a distribution of light transmissivity of the crystalline lens based on the opacity distribution map created by the opacity distribution map creation processor.

6. The slit lamp microscope of claim 1, wherein the transmissivity distribution information generation processor is further configured to generate transmissivity distribution information that represents a distribution of light transmissivity of the crystalline lens by calculating, for each of the plurality of three dimensional partial regions, a quotient of a size of an opaque area in the three dimensional partial region defined by the two dimensional coordinate system over a size of the three dimensional partial region.

7. The slit lamp microscope of claim 6, wherein the data processor includes a transmissivity distribution map creation processor configured to create a transmissivity distribution map based on the transmissivity distribution information generated by the transmissivity distribution information generation processor.

8. The slit lamp microscope of claim 1, wherein the data processor includes a rendering processor configured to apply rendering to a three dimensional image that includes the three dimensional crystalline lens image.

9. The slit lamp microscope of claim 8, wherein the rendering processor is configured to apply projection onto a predetermined plane to the three dimensional image.

10. The slit lamp microscope of claim 9, wherein the predetermined plane is perpendicular to a depth direction.

11. The slit lamp microscope of claim 9, wherein the display controller is further configured to display a two dimensional image constructed by the projection and a distribution image based on the opacity distribution information on a display device in such a manner that one of the two dimensional image and the distribution image is displayed on the other.

12. The slit lamp microscope of claim 8, wherein the display controller is further configured to display a rendered image constructed by the rendering processor and information based on the opacity distribution information on a display device in such a manner that one of the rendered image and the information based on the opacity distribution information is displayed on the other.

13. The slit lamp microscope of claim 1, wherein the time dependent change information generation processor is further configured to generate another time dependent change information that represents a time dependent change in a distribution of an opaque area of the crystalline lens based on a plurality of pieces of opacity distribution information obtained for the anterior segment.

14. The slit lamp microscope of claim 1, wherein
the data processor includes a normalization processor configured to apply normalization to the plurality of cross sectional images collected by the scanner, and
the data processor is configured to perform generation of the opacity distribution information based on the plurality of cross sectional images with the normalization applied.

15. The slit lamp microscope of claim 14, wherein the normalization processor is configured to apply brightness normalization to the plurality of cross sectional images.

16. The slit lamp microscope of claim 15, wherein the normalization processor is configured to apply the brightness normalization to the plurality of cross sectional images based on brightness of an image corresponding to a posterior surface of cornea of the anterior segment.

17. The slit lamp microscope of claim 14, wherein
the slit light includes visible light, and
the normalization processor is configured to apply color normalization to the plurality of cross sectional images.

18. The slit lamp microscope of claim 1, wherein the data processor includes an evaluation processor configured to perform evaluation of a predetermined cataract score based on one or both of the opacity distribution information and the plurality of cross sectional images.

19. The slit lamp microscope of claim 18, wherein
the slit light includes white light, and
the evaluation processor is configured to perform evaluation of hardness of crystalline lens nucleus based on color information of the plurality of cross sectional images.

20. The slit lamp microscope of claim 18, wherein the evaluation processor is configured to perform cataract type inference based on the opacity distribution information.

21. The slit lamp microscope of claim 1, wherein the data processor includes a simulation processor configured to perform vision condition simulation of the subject's eye based on the opacity distribution information.

22. The slit lamp microscope of claim 1, wherein the data processor includes a measurement processor configured to perform measurement of a predetermined anterior segment parameter based on the plurality of cross sectional images.

23. The slit lamp microscope of claim 22, wherein the anterior segment parameter includes one or more of corneal thickness, corneal curvature, anterior chamber depth, crystalline lens thickness, crystalline lens curvature, crystalline lens diameter, crystalline lens tilt angle, and positional difference between corneal center and crystalline lens center.

24. The slit lamp microscope of claim 1, wherein the scanner includes:
an illumination system configured to project the slit light onto the anterior segment;
a photography system configured to perform photography of the anterior segment from a direction different from the illumination system; and
a movement mechanism configured to move the illumination system and the photography system.

25. The slit lamp microscope of claim 24, wherein the photography system includes:
an optical system configured to direct light coming from the anterior segment onto which the slit light is projected; and
an image sensor including a light detecting plane configured to receive the light directed by the optical system,
wherein a subject plane along an optical axis of the illumination system, the optical system, and the light detecting plane satisfy a Scheimpflug condition.

26. The slit lamp microscope of claim 1, wherein the display controller is further configured to display information on a display device based on an output from the data processor.

27. The slit lamp microscope of claim 1, wherein the second coordinate axis is represented in a linear shape in the opacity distribution map.

28. An ophthalmic information processing apparatus comprising:
a reception device that receives a plurality of cross sectional images collected by scanning an anterior segment of a subject's eye with slit light; and
a data processor configured to generate opacity distribution information that represents a distribution of an opaque area in a crystalline lens, based on the plurality of cross sectional images,
wherein the data processor includes
a crystalline lens image construction processor configured to construct a three dimensional crystalline lens image from the plurality of cross sectional images, and
an opacity distribution information generation processor configured to analyze the three dimensional crystalline lens image to generate the opacity distribution information,
wherein the opacity distribution information generation processor includes a local distribution information generation processor configured to generate local distribution information that represents a distribution of an opaque area in a three dimensional partial region for each of a plurality of three dimensional partial regions in the three dimensional crystalline lens image,
wherein the data processor includes a transmissivity distribution information generation processor configured to generate transmissivity distribution information that represents a distribution of light transmissivity of the crystalline lens based on a plurality of pieces of local distribution information generated by the local distribution information generation processor,
wherein the data processor includes a time dependent change information generation processor configured to generate time dependent change information that represents a time dependent change in a distribution of light transmissivity of the crystalline lens based on the transmissivity distribution information, and
the ophthalmic information processing apparatus further comprising a display controller configured to display a graph that represents a time dependent change in light transmissivity of each of the plurality of three dimensional partial regions based on the time dependent change information on a display device,
wherein the data processor includes an opacity distribution map creation processor configured to create an opacity distribution map based on a plurality of pieces of local distribution information generated by the local distribution information generation processor,
wherein the opacity distribution map represents a depth position of an opaque area in each of the plurality of three dimensional partial regions and is represented using a two dimensional coordinate system in which a first coordinate axis represents a depth direction and a second coordinate axis represents a direction perpendicular to the depth direction,
wherein the plurality of three dimensional partial regions is determined by applying equal angle division to the three dimensional crystalline lens image in a plane perpendicular to the depth direction, and
the second coordinate axis represents an angle direction of the equal angle division.

29. An ophthalmic system comprising a slit lamp microscope and an information processing apparatus, wherein the slit lamp microscope includes:
a scanner configured to scan an anterior segment of a subject's eye with slit light to collect a plurality of cross sectional images; and
a transmission device that transmits the plurality of cross sectional images collected by the scanner to the information processing apparatus via a communication line, and
the information processing apparatus includes:
a reception device that receives the plurality of cross sectional images; and
a data processor configured to generate opacity distribution information that represents a distribution of an opaque area in a crystalline lens, based on the plurality of cross sectional images,
wherein the data processor includes
a crystalline lens image construction processor configured to construct a three dimensional crystalline lens image from the plurality of cross sectional images, and
an opacity distribution information generation processor configured to analyze the three dimensional crystalline lens image to generate the opacity distribution information,
wherein the opacity distribution information generation processor includes a local distribution information generation processor configured to generate local distribution information that represents a distribution of an opaque area in a three dimensional partial region for each of a plurality of three dimensional partial regions in the three dimensional crystalline lens image, wherein the data processor includes a transmissivity distribution information generation processor configured to generate transmissivity distribution information that represents a distribution of light transmissivity of the crystalline lens based on a plurality of pieces of local distribution information generated by the local distribution information generation processor, wherein the data processor includes a time dependent change information generation processor configured to generate time dependent change information that represents a time dependent change in a distribution of light transmissivity of the crystalline lens based on the transmissivity distribution information, and the ophthalmic system further comprising a display controller configured to display a graph that represents a time dependent change in light transmissivity of each of the plurality of three dimensional partial regions based on the time dependent change information on a display device, wherein the data processor includes an opacity distribution map creation processor configured to create an opacity distribution map based on a plurality of pieces of local distribution information generated by the local distribution information generation processor, wherein the opacity distribution map represents a depth position of an opaque area in each of the plurality of three dimensional partial regions and is represented using a two dimensional coordinate system in which a first coordinate axis represents a depth direction and a second coordinate axis represents a direction perpendicular to the depth direction, wherein the plurality of three dimensional partial regions is determined by applying equal angle division to the three dimensional crystalline lens image in a plane perpendicular to the depth direction, and the second coordinate axis represents an angle direction of the equal angle division.

30. A method of controlling a slit lamp microscope that includes a processor, and a scanner that scans an anterior segment of a subject's eye with slit light to collect a plurality of cross sectional images, the method comprising:

causing the processor to execute a process of generating opacity distribution information that represents a distribution of an opaque area in a crystalline lens based on the plurality of cross sectional images collected by the scanner, wherein the process of generating the opacity distribution information includes
  a process of constructing a three dimensional crystalline lens image from the plurality of cross sectional images, and
  a process of analyzing the three dimensional crystalline lens image to generate the opacity distribution information, wherein the process of generating the opacity distribution information includes a process of generating local distribution information that represents a distribution of an opaque area in a three dimensional partial region for each of a plurality of three dimensional partial regions in the three dimensional crystalline lens image, the method further comprising:

causing the processor to execute a process of generating transmissivity distribution information that represents a distribution of light transmissivity of the crystalline lens based on a plurality of pieces of local distribution information for the plurality of three dimensional partial regions;

causing the processor to execute a process of generating time dependent change information that represents a time dependent change in a distribution of light transmissivity of the crystalline lens based on the transmissivity distribution information;

causing the processor to execute a process of displaying a graph that represents a time dependent change in light transmissivity of each of the plurality of three dimensional partial regions based on the time dependent change information on a display device;

causing the processer to create an opacity distribution map based on a plurality of pieces of local distribution information, wherein the opacity distribution map represents a depth position of an opaque area in each of the plurality of three dimensional partial regions and is represented using a two dimensional coordinate system in which a first coordinate axis represents a depth direction and a second coordinate axis represents a direction perpendicular to the depth direction; and causing the processor to determine the plurality of three dimensional partial regions by applying equal angle division to the three dimensional crystalline lens image in a plane perpendicular to the depth direction, wherein the second coordinate axis represents an angle direction of the equal angle division.

31. A computer-readable non-transitory recording medium storing a program configured to cause a computer to execute the method of claim 30.

\* \* \* \* \*